(12) United States Patent
Goh et al.

(10) Patent No.: US 10,050,717 B2
(45) Date of Patent: Aug. 14, 2018

(54) MULTI-STAGE INTERFEROMETER CIRCUIT WITH WAVEFORM SHAPING FUNCTION

(71) Applicant: NIPPON TELEGRAPH AND TELEPHONE CORPORATION, Tokyo (JP)

(72) Inventors: Takashi Goh, Atsugi (JP); Mikitaka Itoh, Atsugi (JP); Kiyofumi Kikuchi, Atsugi (JP)

(73) Assignee: NIPPON TELEGRAPH AND TELEPHONE CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/551,168

(22) PCT Filed: Feb. 19, 2016

(86) PCT No.: PCT/JP2016/000909
§ 371 (c)(1),
(2) Date: Aug. 15, 2017

(87) PCT Pub. No.: WO2016/132747
PCT Pub. Date: Aug. 25, 2016

(65) Prior Publication Data
US 2018/0034555 A1 Feb. 1, 2018

(30) Foreign Application Priority Data
Feb. 19, 2015 (JP) .................................. 2015-031156

(51) Int. Cl.
*G02F 1/21* (2006.01)
*G02F 1/225* (2006.01)
(Continued)

(52) U.S. Cl.
CPC ............. *H04B 10/69* (2013.01); *G02B 6/122* (2013.01); *G02F 1/225* (2013.01); *G02B 2006/12164* (2013.01); *G02F 2001/212* (2013.01)

(58) Field of Classification Search
CPC .................... H04B 10/69; G02B 6/122; G02B 2006/12164; G02F 1/225; G02F 2001/212
(Continued)

(56) References Cited

U.S. PATENT DOCUMENTS

2002/0106147 A1* 8/2002 Kitoh ................. G02B 6/12007
385/24
2003/0012479 A1* 1/2003 Kitou ................. G02B 6/12004
385/14
(Continued)

FOREIGN PATENT DOCUMENTS

| JP | 2005-195889 A | 7/2005 |
| JP | 2009-15156 A | 1/2009 |
| JP | 2014-59542 A | 4/2014 |

OTHER PUBLICATIONS

International Search Report dated May 24,206, issued in PCT Application No. PCT/JP2016/000909, filed Feb. 19, 2016.
(Continued)

*Primary Examiner* — Dalzid Singh
(74) *Attorney, Agent, or Firm* — Workman Nydegger

(57) ABSTRACT

A multi-stage interferometer circuit of the present invention includes: a multiplexing port; (N−1) stages of lattice type two-beam interferometers, wherein each stage includes a two-beam delay circuit having a path length difference of an integral multiple of M·Δ L/2, and wherein the two-beam delay circuit of the lattice type two-beam interferometer of the first stage is connected to the multiplexing port; an M-beam interferometer including: two sets of 1×(M/2) optical couplers connected to the first optical coupler of the
(Continued)

lattice type two-beam interferometer at the final stage; an M-array delay circuit, each delay circuit of which has a delay length different from each other by ΔL; and M×M optical couplers; and M demultiplexing ports, wherein one or more transversal filters are arranged inside the multi-stage interferometer circuit so that the light guided between the demultiplexing port and the multiplexing ports passes therethrough at least once.

15 Claims, 70 Drawing Sheets

(51) Int. Cl.
  *G02B 6/12* (2006.01)
  *G02B 6/122* (2006.01)
  *H04B 10/69* (2013.01)
(58) Field of Classification Search
  USPC .......................................................... 398/43
  See application file for complete search history.

(56) References Cited

U.S. PATENT DOCUMENTS

| | | | | |
|---|---|---|---|---|
| 2003/0053167 A1* | 3/2003 | Xu | ........................ | G02B 6/2935 398/79 |
| 2005/0058398 A1* | 3/2005 | Doerr | ................. | G02B 6/12007 385/39 |
| 2005/0276539 A1* | 12/2005 | Fukuda | .............. | G02B 6/29353 385/24 |
| 2006/0039704 A1* | 2/2006 | Nara | ................... | H01S 3/10007 398/161 |
| 2013/0322809 A1* | 12/2013 | Goh | ................... | H04B 10/5161 385/3 |
| 2013/0330076 A1* | 12/2013 | Liboiron-Ladouceur | .......... | H04J 14/0223 398/47 |

OTHER PUBLICATIONS

International Preliminary Report on Patentability dated Aug. 31, 2017, issued in PCT Application PCT/JP2016/000909, filed Feb. 19, 2016.
K. Roberts et al., *Flexible Transceivers*, in Proc. ECOC, 2012, paper We.3.A.3.
Y. Huang et al., *Real-Time 400G Superchannel Transmission Using 100-GbE Based 37.5-GHz Spaced Subcarriers with Optical Nyquist Shaping Over 3,600-km DMF Link*, in Proc. OFC/NFOEC 2013, paper NW4E.1.
C. Pulikkaseril et al., *Spectral Modeling of Channel Band Shapes in Wavelength Selective Switches*, Optics Express, vol. 19, No. 9, pp. 8458-8470 (2011).
K. Jinguji, et al., *Mach-Zehnder Interferometer Type Optical Waveguide Coupler With Wavelength-Flattened Coupling Ratio*, Electronics Letter, vol. 26, No. 17, pp. 1326-1327, 1990.
T. Goh et al., *Optical Nyquist-Filtering Multi/Demultiplexer with PLC for 1-Tb/s Class Super-Channel Transceiver*, Optical Fiber Communications Conference and Exhibition, 2015, Mar. 22, 2015, Tu3A.5, 1-3.

* cited by examiner

DESIGN EXAMPLE WITH N=4 STAGES, M=8 PORTS

| ELEMENT NUMBER $i$ | PARAMETER DESIGN VALUES | |
|---|---|---|
| | MULTIPLE OF DELAY LENGTH $k_i$ | OPTICAL COUPLER COUPLING-PHASE ANGLE $\theta_i$ [rad] (VALUES IN PARENTHESES ARE CALCULATED IN COUPLING RATE) | PHASE OF PHASE SHIFTER $\varphi_i$ [rad] |
| 0 | | 0.0710π (4.9%) | |
| 1 | −8 | 0.0129π (0.2%) | π |
| 2 | 4 | 0.1409π (18.3%) | π |
| 3 | −2 | 0.1587π (22.9%) | 0 |
| 4 | 1 | 0.25π (50%) | 0 (NORMAL GDR DESIGN) WHEN MULTIPLEXING PORT 1 IS USED π (REVERSE GDR DESIGN) WHEN MULTIPLEXING PORT 2 IS USED |

| PHASE OF PHASE SHIFTER $\psi_{x,y}$ | | |
|---|---|---|
| | x=1 | x=2 |
| y=1 | 0 | 1.75π |
| y=2 | 0 | 0 |
| y=3 | 0 | 0.25π |
| y=4 | 0 | 0 |
| y=5 | 0.5π | 0 |
| y=6 | 0.5π | 0 |
| y=7 | 0 | 0.5π |
| y=8 | 0 | 0 |

FIG.3

DETAILED CHARACTERISTICS IN PASSBAND

------- POWER TRANSMITTANCE (811) OF
MULTIPLEXER/DEMULTIPLEXER (WITHOUT TF)

——— POWER SPECTRUM DENSITY (812) OF
OPTICAL SIGNAL OUTPUT FROM OPTICAL MODULATOR

— - — POWER SPECTRUM DENSITY (813) OF
TRANSMISSION OPTICAL SIGNAL HAVING PASSED
THROUGH MULTIPLEXER/DEMULTIPLEXER (WITHOUT TF)

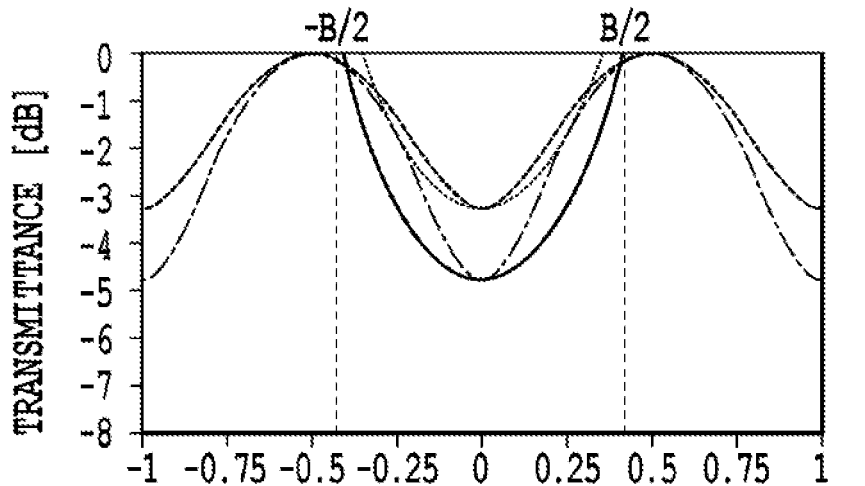

POWER TRANSMITTANCE
CHARACTERISTICS

RELATIVE FREQUENCY NORMALIZED WITH
MULTIPLEXING/DEMULTIPLEXING SPACING

------- DESIGN CHARACTERISTIC 1
$\xi_1 = 0.1518\pi\,(21.1\%)$

——— TARGET CORRECTION CHARACTERISTIC 1
(RAISED-COSINE WAVE SIGNAL,
WHEN DRIVEN WITH $2V\pi$ AMPLITUDE)

——— DESIGN CHARACTERISTIC 2
$\xi_1 = 0.1292\pi\,(15.6\%)$

·········· TARGET CORRECTION CHARACTERISTIC 2
(RAISED-COSINE WAVE SIGNAL,
WHEN DRIVEN WITH $2V\pi$ AMPLITUDE)

FIG.10A

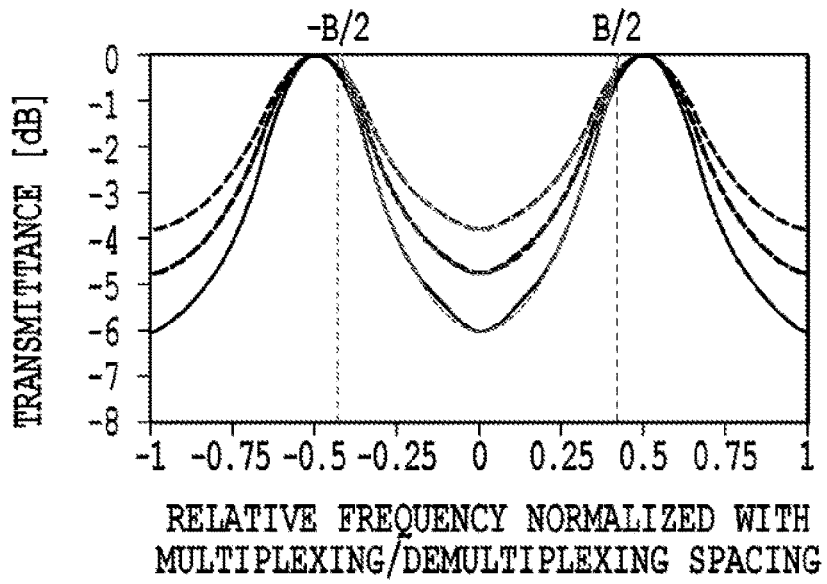

RELATIVE FREQUENCY NORMALIZED WITH
MULTIPLEXING/DEMULTIPLEXING SPACING

---- DESIGN CHARACTERISTIC 1
$\xi_1=0.1380\pi(17.6\%), \xi_2=0.075\pi(5.5\%)$

······ TARGET CORRECTION CHARACTERISTIC 1
(RECTANGULAR WAVE SIGNAL)

—— DESIGN CHARACTERISTIC 2
$\xi_1=0.1518\pi(21.1\%), \xi_2=0.088\pi(7.5\%)$

------ TARGET CORRECTION CHARACTERISTIC 2
(RAISED-COSINE WAVE SIGNAL,
WHEN DRIVEN WITH $2V\pi$ AMPLITUDE)

—— DESIGN CHARACTERISTIC 3
$\xi_1=0.1668\pi(25.0\%), \xi_2=0.104\pi(10.3\%)$

------ TARGET CORRECTION CHARACTERISTIC 3
(RAISED-COSINE WAVE SIGNAL,
WHEN DRIVEN WITH $0.5V\pi$ AMPLITUDE)

FIG.12

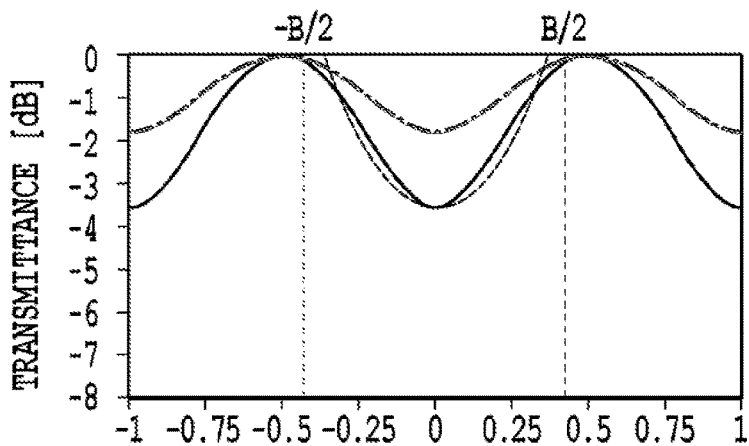

POWER TRANSMITTANCE CHARACTERISTICS

RELATIVE FREQUENCY NORMALIZED WITH MULTIPLEXING/DEMULTIPLEXING SPACING

——— DESIGN CHARACTERISTIC
$\xi_1 = \xi_2 = 0.0984\pi (9.3\%)$

- - - TARGET CORRECTION CHARACTERISTIC
(RAISED-COSINE WAVE SIGNAL,
WHEN DRIVEN WITH $2V\pi$ AMPLITUDE)

—·—·— MZI DESIGN CHARACTERISTIC OF
FIRST STAGE IN MULTI-STAGE CONNECTION CONFIGURATION
$\xi_1 = 0.0984\pi (9.3\%)$

·········· MZI DESIGN CHARACTERISTIC OF
SECOND STAGE IN MULTI-STAGE CONNECTION CONFIGURATION
$\xi_2 = 0.0984\pi (9.3\%)$

FIG.14A

— NORMAL GDR DESIGN, MULTIPLEXING PORT 1(2001)

----- REVERSE GDR DESIGN, MULTIPLEXING PORT 2(2002)

--- TF ITSELF(2003)

— NORMAL GDR DESIGN, MULTIPLEXING PORT 1(2301)

----- REVERSE GDR DESIGN, MULTIPLEXING PORT 2(2302)

--- TF ITSELF(2303)

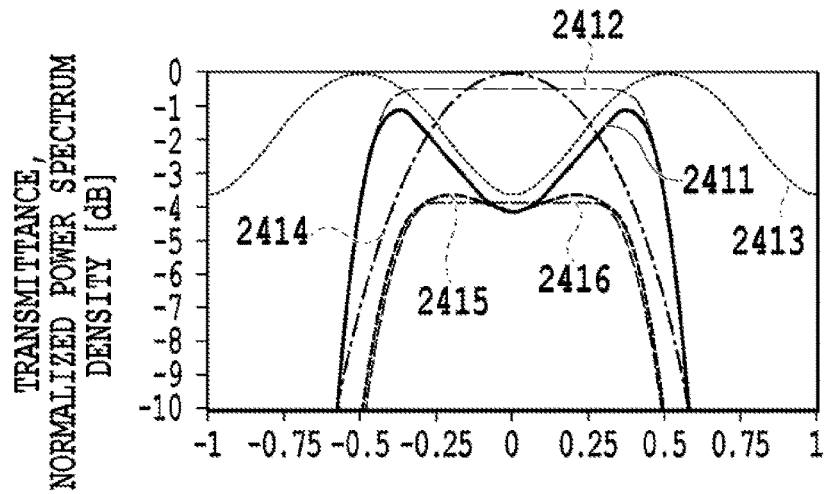

DETAILED CHARACTERISTICS IN PASSBAND

RELATIVE FREQUENCY NORMALIZED WITH MULTIPLEXING/DEMULTIPLEXING SPACING

—— POWER TRANSMITTANCE OF MULTIPLEXER/DEMULTIPLEXER (WITH TF) (2411)

— — POWER TRANSMITTANCE OF MULTIPLEXER/DEMULTIPLEXER (WITHOUT TF) (FOR REFERENCE) (2412)

······ POWER TRANSMITTANCE OF TF ITSELF (FOR REFERENCE) (2413)

—··— POWER SPECTRUM DENSITY OF OPTICAL SIGNAL OUTPUT FROM OPTICAL MODULATOR (2414)

------ POWER SPECTRUM DENSITY OF TRANSMISSION OPTICAL SIGNAL HAVING PASSED THROUGH MULTIPLEXER/DEMULTIPLEXER (WITH TF) (2415)

— — — POWER SPECTRUM DENSITY OF ROOT NYQUIST SIGNAL ($\alpha=0.36$) (2416)

FIG.24B

MULTI-STAGE INTERFEROMETER CIRCUIT WITH WAVEFORM SHAPING FUNCTION

TECHNICAL FIELD

The present invention relates to a multi-stage interferometer circuit having an optical multiplexer/demultiplexer function or an optical filter function, and more specifically relates to a multi-stage interferometer circuit having a waveform-shaping filtering function such as Nyquist shaping.

BACKGROUND ART

At present, in the long-distance 100 G transmission in practical use, high-speed transmission of 128 G bps per channel is realized by setting the modulation symbol rate to approximately 32 G baud, by the use of a quadrature phase-shift keying (QPSK modulation) that is one type of multi-value modulation techniques and a polarization multiplexing that is one type of multiplexing techniques. (The transmission rate 28 G bps of the transmission rate 128 G bps is for the bits used for the information and error correction which are required for transmission control and thus the net data transmission rate becomes 100 G bps). In the further higher speed transmission, for example, the next-generation high-speed transmission such as 400 G or 1 T transmission, the introduction of a transmission technique for an optical multicarrier system using a plurality of optical transmission carriers is promising, in addition to the multi-valuing of a modulation symbol and an increase in the modulation symbol rate. The optical multicarrier system is one type of wavelength division multiplexing technique or frequency division multiplexing technique, and achieves an increase in the channel capacity by handling each of a plurality of optical transmission carriers as a subchannel (subcarrier) and parallelizing the same. Therefore, a total channel transmission rate can be relatively easily enhanced from the viewpoint of easiness of realization, although there is a disadvantage that a plurality of devices is required in order to parallelize a plurality of optical transmission carriers. A large-capacity channel combining a plurality of such optical subcarriers is referred to also as a super channel.

In the multicarrier system, a multi-stage interferometer circuit serving as a multiplexer/demultiplexer for multiplexing/demultiplexing each subcarrier is required together with the parallelization of modulator/demodulator. This multi-stage interferometer circuit needs to satisfy the requirements such as low loss, a fully-circulating operation, a flat passband, multiport, and narrow channel spacing. The present examples of the multi-stage interferometer circuit that satisfies these requirements include a multi-stage interferometer circuit described in Patent Literature 1.

In recent years, there has attracted attention a Nyquist-shaping technique capable of performing the waveform shaping of a signal and narrowing a signal occupying bandwidth in order to enhance the spectrum usage efficiency of optical fiber transmission. In the ordinary modulation technique without performing waveform shaping, the width of signal light spectrum becomes twice the modulation symbol rate in terms of the width of a main lobe occupying the main power, and becomes twice or more the modulation symbol rate in terms of the width including the side lobe. In contrast, when the Nyquist-shaping technique is used, the width of a signal spectrum results in a highly rectangular spectrum that is narrow to the extent of the modulation symbol rate. Accordingly, as compared with the ordinary modulation technique, in a modulation signal using the Nyquist-shaping technique, carriers can be densely arranged and the spectrum usage efficiency of a transmission line can be enhanced. The same also applies to the arrangement of subcarriers in the above-described super channel. Namely, when the Nyquist-shaping technique is used in each subcarrier, the spectrum usage efficiency further increases since subcarriers can be more densely arranged and a total occupied bandwidth of a channel can be reduced.

Examples of the Nyquist-shaping techniques mainly include a method of using a digital signal processor (DSP) and a method of using an optical filter. The method using a DSP includes the steps of: calculating, in a digital domain, a signal waveform Nyquist-shaped by a transmitter; generating, with a digital-to-analog converter (DAC), the waveform thereof as an electric signal; and converting the electric signal to signal light with an optical modulator, thereby generating Nyquist-shaped signal light (for example, see Non-Patent Literature 1). The method of using an optical filter includes the step of band-limiting, in an analog manner, with an optical filter, signal light generated by an ordinary modulation technique, and correcting the spectrum shape thereof, thereby obtaining Nyquist-shaped signal light (for example, see Non-Patent Literatures 2 and 3).

The method of performing Nyquist-shaping with a DSP has, first of all, a problem that the power consumption of the DSP simply increases. Furthermore, a DSP in the transmitter is expected to have many functions such as multi-valuing of a signal and linear/non-linear prediction equalization of a transmission device and transmission line, other than the Nyquist-shaping function. On the other hand, in a high-speed DAC, the number of effective bits is approximately five, which cannot be said to be a sufficient number of bits for the purpose of waveform shaping. Accordingly, in particular, when all of the above-described functions are included, there is a problem that a sufficient feature of the waveform shaping function cannot be extracted. Moreover, in the method of using a DSP, the waveform shaping is to be performed for each signal light to be generated. Therefore, when there is a plurality of subcarrier signals as in the multicarrier system, there is a problem that, naturally, a DSP with the Nyquist-shaping function is required for each subcarrier and the power consumption increases.

In the method of using an optical filter, a steep and slightly complicated frequency characteristic is required for an optical filter to be used for Nyquist-shaping, and the characteristic adapted to the center wavelength of each channel is also required. Accordingly, a high-resolution variable filter using a spatial optical technique has been used for the optical filter, but such an optical filter has problems that it is expensive and the device size thereof is large, resulting in an increase in the scale of transmission equipment.

The present invention has been made in view of the above problems and the object thereof is to provide a multi-stage interferometer circuit, having a waveform-shaping optical filter function by the use of a waveguide-type technique, which is inexpensive and the size of which is small. Furthermore, the object thereof is also to provide a multi-stage interferometer circuit which has integrated therein multiplexing/demultiplexing functions required in the multicarrier system, and which is capable of multiplexing/demultiplexing and collectively waveform-shaping each subcarrier.

CITATION LIST

Patent Literature

PTL 1: Japanese Patent Application No. 2013-054098

Non Patent Literature

NPL 1: K. Roberts et al., "Flexible Transceivers," in Proc. ECOC 2012, paper We.3.A.3.

NPL 2: Y. Huang et al., "Real-Time 400 G Superchannel Transmission using 100-GbE based 37.5-GHz Spaced Subcarriers with Optical Nyquist Shaping over 3, 600-km DMF link, " in Proc. OFC/NFOEC 2013, paper NW4E.1.

NPL 3: C. Pulikkaseril et al., "Spectral modeling of channel band shapes in wavelength selective switches," Optics Express, Vol . 19, No. 9, pp. 8458-8470 (2011).

NPL 4: K. Jinguji, et al., "Mach-Zehnder interferometer type optical waveguide coupler with wavelength-flattened coupling ratio," electronics letter, vol. 26, no. 17, pp. 1326-1327, 1990.

SUMMARY OF INVENTION

In order to achieve such objectives, according to a first aspect of the present invention, there is provided a multi-stage interferometer circuit, the multi-stage interferometer circuit including: at least one multiplexing port; (N−1) stages (N is a natural number) of lattice type two-beam interferometers, wherein the lattice type two-beam interferometer at each stage includes a two-lightpath delay circuit having a path length difference of an integral multiple of M·Δ L/2 (M is a natural number) and a first optical coupler, and wherein the two-lightpath delay circuit of the lattice type two-beam interferometer of the first stage is connected to the at least one multiplexing port via a second optical coupler; an M-beam interferometer including: two sets of 1×(M/2) optical couplers whose inputs are connected to two outputs of the first optical coupler of the lattice type two-beam interferometer of the (N−1)th stage; an M-array delay circuit, each delay circuit of which has a delay length different from each other by ΔL, the M-array delay circuit being connected to the 1×(M/2) optical couplers; and M×M optical couplers connected to the M-array delay circuit; and M demultiplexing ports connected to the M×M optical couplers, wherein one or more transversal filters are arranged inside the multi-stage interferometer circuit so that the light guided between the demultiplexing port and the multiplexing ports passes therethrough at least once.

According to the present invention, a multi-stage interferometer circuit having a waveform-shaping optical filter function can be realized by the use of a waveguide-type technique which is inexpensive and the device size of which is small, and furthermore a multi-stage interferometer circuit capable of multiplexing/demultiplexing and collectively waveform-shaping each subcarrier can be realized.

BRIEF DESCRIPTION OF DRAWINGS

FIG. 3 is a diagram illustrating an example of design parameters when the number of demultiplexing ports is eight (M=8) and the number of stages of the interferometer is four (N=4);

FIG. 7B is caused to pass through the multi-stage interferometer circuit without a TF, in the transmitter of FIG. 5;

FIG. 7B is caused to pass through the multi-stage interferometer circuit without a TF, in the transmitter of FIG. 5;

FIG. 9I is a diagram illustrating a specific configuration example of the TF used in the present invention;

FIG. 10A is a diagram illustrating a power transmittance characteristics of the TF of FIG. 9B;

FIG. 12 is a diagram illustrating the calculated transmission characteristics of the TF of the FIG. 9C when the parameter of a four-tap TF is slightly changed;

FIG. 14A is a diagram illustrating the power transmittance characteristics of the TF of FIG. 9I;

FIG. 24B illustrates the characteristics in the vicinity of the main lobe/passband of a transmission signal light spectrum or the like when the multi-stage interferometer circuit of the fourth embodiment is used for the multiplexer of the transmitter;

DESCRIPTION OF EMBODIMENTS

Figure 1:
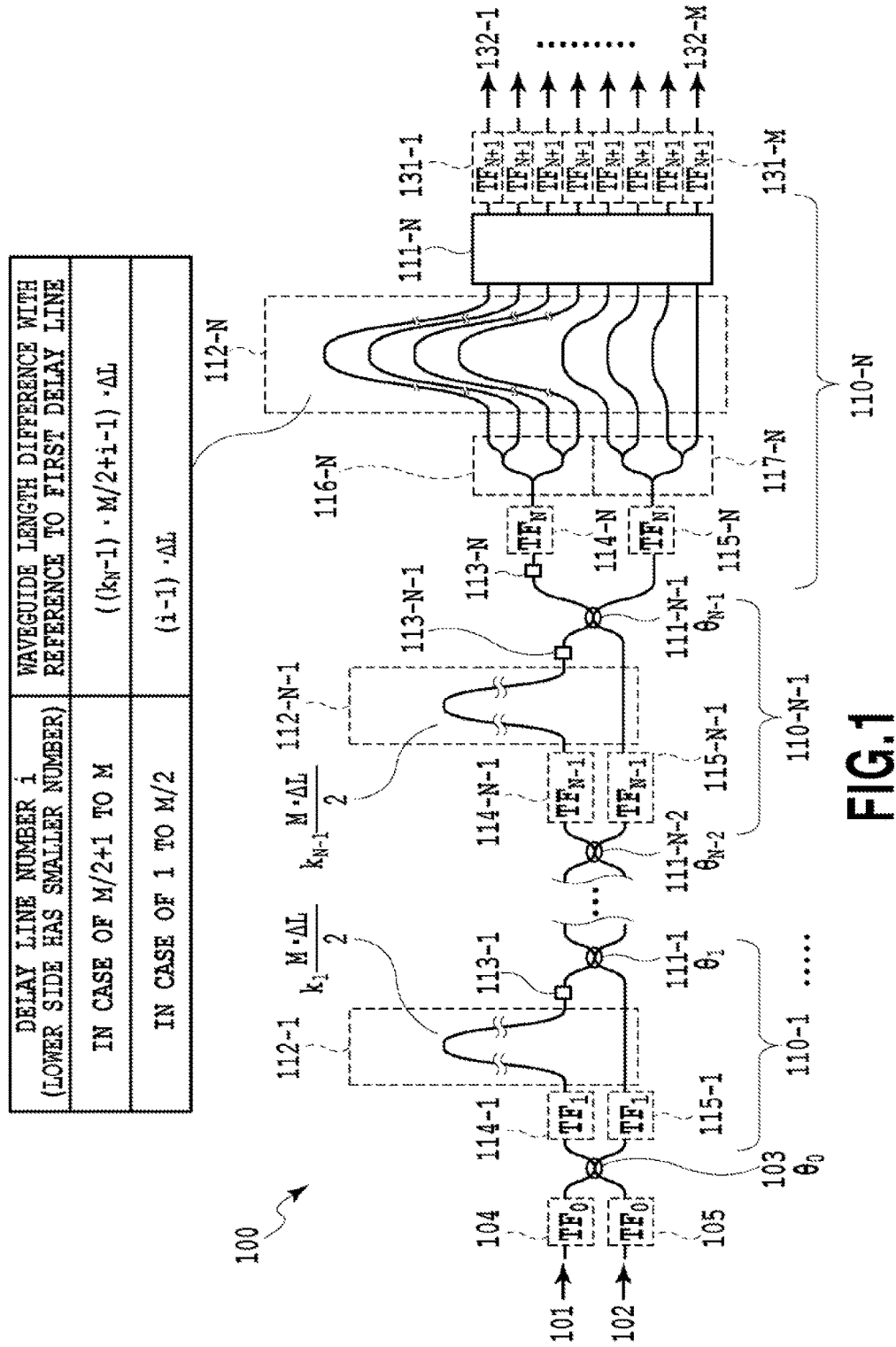
FIG. 1 is a diagram illustrating the basic configuration of a multi-stage interferometer circuit of the present invention.

The forms of several constituent elements will be described in advance before explaining the present embodiments of the present invention.

First, there are known, as the configuration of an optical coupler, several configurations such as a directional coupler, a multimode interferometer (MMI) type optical coupler, or an optical coupler constituted by one type of MZI referred to as a wavelength insensitive coupler (WINC) used in the examples described later (see Non-Patent Literature 4). Any configuration may be basically used as the optical coupler used for the multi-stage interferometer circuit according to the present invention. These optical couplers differ in the detailed points such as the fact that the relative phase of a cross path with respect to a bar path lags by $\pi/2$ in the directional coupler, whereas in the multimode interferometer type optical coupler it leads by $\pi/2$. However, as detailed in Patent Literature 1, by making correction, such as providing $\pm\pi/2$ phase shifters in front of or after the optical coupler, mutual replacement of a directional coupler between these optical couplers is possible. In the present embodiment, there will be basically explained a case where a directional coupler is used, unless otherwise specifically stated.

Furthermore, in the following embodiments, there will be explained a case where a Y-branch circuit is mainly used for a 1×2 splitter or for a 2×1 combiner, but a configuration using a 2×2 coupler with one port being unconnected may be employed. However, since a relative phase shift $\pi/2$ is generated between ports when a 2×2 coupler is used, as described above, correction will be made, such as providing a $\pi/2$ phase shifter on the cross path side, as detailed in Patent Literature 1. Note that an unnecessary port may be naturally utilized as a monitor port or a test port, when a 2×2 coupler is used. Naturally, the same also applies to not only an optical coupler with a fixed coupling ratio but also a variable optical coupler with a variable coupling ratio.

The variable optical coupler consists of an MZI having two 3 dB 2×2 couplers connected via two variables phase shifters. The coupling ratio when the whole MZI is regarded as an optical coupler can be dynamically varied by varying the phase shift amount of this variable phase shifter. Note that the detail of the equivalent transformation law when an ordinary optical coupler is replaced with this variable optical coupler is described in Patent Literature 1. Naturally, the variable optical coupler may employ not only such an MZI configuration, but also other configurations such as a configuration in which the coupling ratio as a coupler is varied by varying the refractive index of a coupling portion of a directional coupler.

Furthermore, since a phase shifter provided in an interferometer is for setting the relative phase change of the light propagating on each path of the interferometer, the absolute value is not important but a relative value between the respective paths is important. Accordingly, for example, in an interferometer having two paths A, B, namely, in a two-beam interferometer, when the phase change of the propagating light on the path A is increased by $\varphi$ with respect to the phase change of a propagating light on the path B, a $+\varphi$ phase shifter maybe provided only on the path A, or a $+\varphi/2$ phase shifter may be provided on the path A and a $-\varphi/2$ phase shifter on the path B. Furthermore, the phase shift amount is arbitrary within a period of $2\pi$. In summary, for setting a relative phase change amount $\varphi$, a phase shifter providing the phase change of $+\varphi+\psi+2\pi\cdot a$ may be provided on the path A and a phase shifter providing the phase change of $+\psi+2\pi\cdot b$ may be provided on the path B. Here, $\psi$ is an arbitrary value, and a and b are arbitrary integers. In the following explanation, these arbitrariness will not be described in particular, but for example a description easy to understand, such as "a phase shifter of $+\varphi$ is provided only on the path A" will be given. However, note in advance that the arbitrariness is included. Furthermore, since the phase change amount which the propagating light receives on one certain path results in a total sum of the phase change amounts received from the elements on the path, the total phase change amount does not depend on the order of the respective elements. Accordingly, note in advance that the orders of the phase shifter, delay line, and the like present in one path can be changed. The relativity of phase shift amounts in these phase shifters and the changeability of the orders of the phase shifters are naturally true of not only a phase shifter with a fixed phase shift amount but also a variable phase shifter with a variable phase shift amount.

In addition, examples of the device configured to realize a phase shifter include several devices, such as use of a shorter length delay line or change of the effective refractive index of a waveguide medium, but either one may be used. The device configured to change the effective refractive index of a waveguide medium may utilize a physical phenomenon, such as a thermooptic effect, an electro-optical effect, or a photoelastic effect, which changes the refractive index of the substance constituting a waveguide medium, and when a waveguide medium is a waveguide, the device may utilize a change in the structure refractive index caused by changing the size of a waveguide, such as the width of the waveguide, and/or by changing the structure of the waveguide.

Furthermore, the embodiments and examples described below will be illustrated/explained assuming that the number M of the wavelength-multiplexed/demultiplexed channel of a multi-stage interferometer circuit is mainly the power of 2 (M=2m; m is a natural number). This is because the whole configuration becomes conveniently not excessive or not insufficient in terms of the configuration of the multi-stage interferometer circuit of the present invention when the number of ports is the power of 2. However, even when the number of ports is other than the power of 2, the configuration of the present invention can be applied, when a configuration the number of ports of which is M'=2m' (here, m' is the minimum natural number under the condition M<2m') is used as a basic configuration and some ports and circuit elements related to the some ports are omitted.

Moreover, for convenience of explanation, the configurations (input/output directions and the like of light) of various embodiments and examples will be illustrated/explained mainly as a demultiplexer, but can be used as a multiplexer by exchanging the input and output. Note that the multiplexer and demultiplexer have an essentially identical configuration except that only the input and output are reversed. In addition, a port on the input side for a demultiplexer may be generally described as a multiplexing port and a port on the output side may be generally described as a demultiplexing port. Furthermore, the ordinal number of a stage of a multi-stage interferometer is assumed to be a smaller number on the input side for a demultiplexer.

Basic Configuration

FIG. 1 illustrates the basic configuration of a multi-stage interferometer circuit of the present invention. A multi-stage interferometer circuit 100 of FIG. 1 is the interferometer circuit having N stages of interferometers (110-1 to 110-N), in which 2×2 couplers 103, 111-1 to 111-N−1 and delay circuits 112-1 to 112-N are connected in series alternately and finally an M×M coupler 111-N is connected in series. The multi-stage interferometer circuit 100 includes: multiplexing ports 101 and 102; the 2×2 coupler 103 connected to multiplexing ports 101 and 102; N stages of interferometers 110-1 to 110-N; and demultiplexing ports 132-1 to 132-M connected to the interferometer 110-N of the Nth stage.

The interferometer 110-1 of the first stage includes the delay circuit 112-1 connected to the 2×2 coupler 103 and the 2×2 coupler 111-1 connected to the delay circuit 112-1. The interferometer 110-2 of the second stage to the interferometer 110-N−1 of the (N−1)th stage also include the delay circuit (112-2 to 112-N−1) connected to the 2×2 coupler (111-1 to 111-N−2) of the interferometer (110-1 to 110-N−2) of the previous stage and the 2×2 coupler (111-2 to 111-N−1) connected to the delay circuit (112-2 to 112-N−1). The interferometer 110-N of the Nth stage includes 1×(M/2) couplers 116-N, 117-N connected to two waveguides of the 2×2 coupler 111-N−1, respectively, the M-array delay circuit 112-N connected to the 1×(M/2) couplers 116-N, 117-N, and the M×M coupler 111-N connected to the M-array delay circuit 112-N. The demultiplexing ports 132-1 to 132-M are connected to the ports of the M×M coupler 111-N, respectively.

Here, when the multi-stage interferometer circuit 100 is used as a demultiplexer, the multiplexing port 101 or 102 is used as the input port of signal light, whereas when the multi-stage interferometer circuit 100 is used as a multiplexer, the multiplexing port 101 or 102 is used as the output port of signal light. Furthermore, when the multi-stage interferometer circuit 100 is used as a multiplexer, the demultiplexing ports 132-1 to 132-M are used as the input ports of signal light, whereas when the multi-stage interferometer circuit 100 is used as a demultiplexer, the demultiplexing ports 132-1 to 132-M are used as the output ports of signal light.

Furthermore, transversal filters (TF: 104, 105, 114-1 to 114-N, 115-1 to 115-N, 131-1 to 131-M) consisting of multiple beam interferometers are inserted in the optical path of the multi-stage interferometer circuit 100. The insertion position of the TF is arranged in the multi-stage interferometer circuit 100 so that the light guided between the demultiplexing ports 101 and 102 and the multiplexing ports 132-1 to 132-M passes therethrough at least once. Namely, the insertion position of the TF may be either a position where the light entering from the multiplexing ports 101 and/or 102 passes through the TF at least once before reaching the multiplexing ports 132-1 to 132-M, when the multi-stage interferometer circuit 100 is used as a demultiplexer, or a position where the light entering from the multiplexing ports 132-1 to 132-M passes through the TF at least once before reaching the demultiplexing ports 101 and/or 102, when the multi-stage interferometer circuit 100 is used as a multiplexer. Note that a specific insertion position of the TF will be described later. Furthermore, the phase shifter (113-1 to 113-N) is arranged in front of or after the delay circuit (112-1 to 112-N) of the interferometer (110-1 to 110-N) of each stage in accordance with design. Note that, in FIG. 1, the phase shifter after the M-array delay circuit is not arranged, but may be arranged as in the first example described later.

Note that FIG. 1 illustrates, as an example, a case of the demultiplexer with the number of demultiplexing ports M=8 in which the multiplexing ports 101 and 102 are used as the input ports and the demultiplexing ports 132-1 to 132-M are used as the output ports. However, a multiplexer may be employed in which the demultiplexing ports 132-1 to 132-M are used as the input ports and the multiplexing ports 101 and 102 are used as the output ports, and the number of ports is not limited to M=8.

The delay circuits 112-1 to 112-N−1 of the interferometer 110-1 of the first stage to the interferometer 110-N−1 of the (N−1)th stage include two arm waveguides of a shorter length arm waveguide and a longer arm waveguide, and constitutes, as a basic configuration, a two-beam interferometer, in which a path length difference between the shorter length arm waveguide and the long arm waveguide, namely, a delay length, is an integral multiple kq of M·ΔL/2. Where ΔL is expressed with Formula below.

$$\Delta L = c/(n \cdot M \cdot \Delta f) \quad \text{Formula 1}$$

Where c is the velocity of light, n is the effective refractive index of a waveguide, and Δf is the multiplexing/demultiplexing frequency spacing.

Furthermore, the M-array delay circuit 112-N of the interferometer 110-N of the Nth stage constitutes an M-beam interferometer as the basic configuration. Here, when the arm waveguides of the M-array delay circuit 112-N are numbered as 1, 2, . . . , M in order from the shortest one, the path length difference of an arm waveguide of the number i (1≤i≤M) with respect to the shortest arm waveguide is:

$$(i-1)\cdot\Delta L \quad (1 \leq i \leq M/2) \quad \text{Formula 2}$$

$$((k_N-1)\cdot M/2 + i - 1)\cdot \Delta L \quad (M/2+1 \leq i \leq M) \quad \text{Formula 3.}$$

Note that, designs may be basically possible in which $k_q$ (q is an integer between 1 to N) takes various integers. However, when $k_q$ is designed so as to differ in the power ($k_q$ is the power of 2) for each stage as in the present embodiments described later, there is no duplication in the path length which can be taken by the light propagation path from an input port to an output port, and a plurality of path lengths can be efficiently obtained, and a design close to a desired characteristic can be obtained with smaller number of stages.

The M×M coupler 111-N consists of a M/2 array of the 2×2 couplers connected in m stages, and is connected so that the u-th 2×2 coupler of the t-th stage (t is an integer between 1 to m and u is a natural number between 1 to M/2) couples the x-th path and the y-th path. Where $m=\log_2(M)$, x and y are expressed by Formula below.

Math. 1

$$x = 2^{m-t+1} \cdot \{(u-1) \text{div } 2^{m-t}\} + \{(u-1) \text{mod } 2^{m-t}\} + 1 \quad \text{Formula 4}$$

$$y = 2^{m-t+1} \cdot \{(u-1) \text{div } 2^{m-t}\} + \{(u-1) \text{mod } 2^{m-t}\} + 1 + 2^{m-t} \quad \text{Formula 5}$$

Figure 2A:
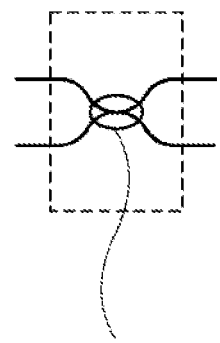
FIG. 2A is a diagram illustrating a configuration example of an M×M coupler for M=2 of the multi-stage interferometer circuit of FIG. 1.
Figure 2B:
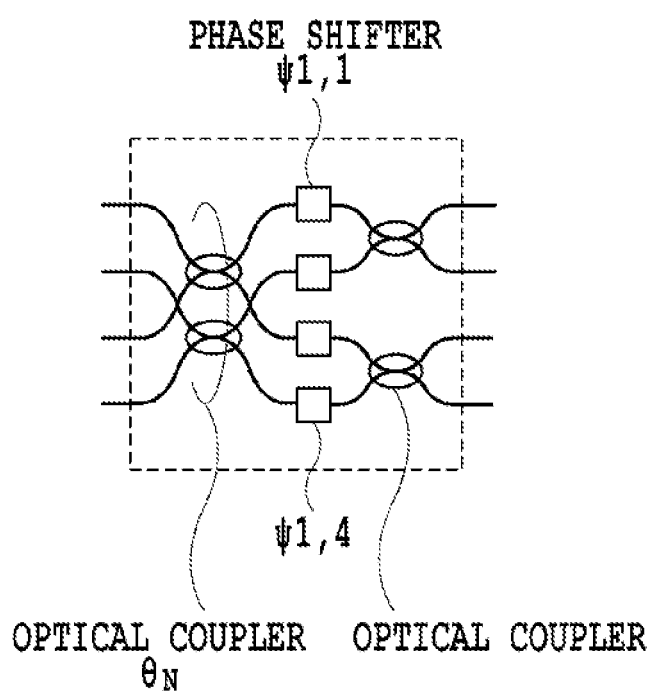
FIG. 2B is a diagram illustrating a configuration example of the M×M coupler for M=4 of the multi-stage interferometer circuit of FIG. 1.
Figure 2C:
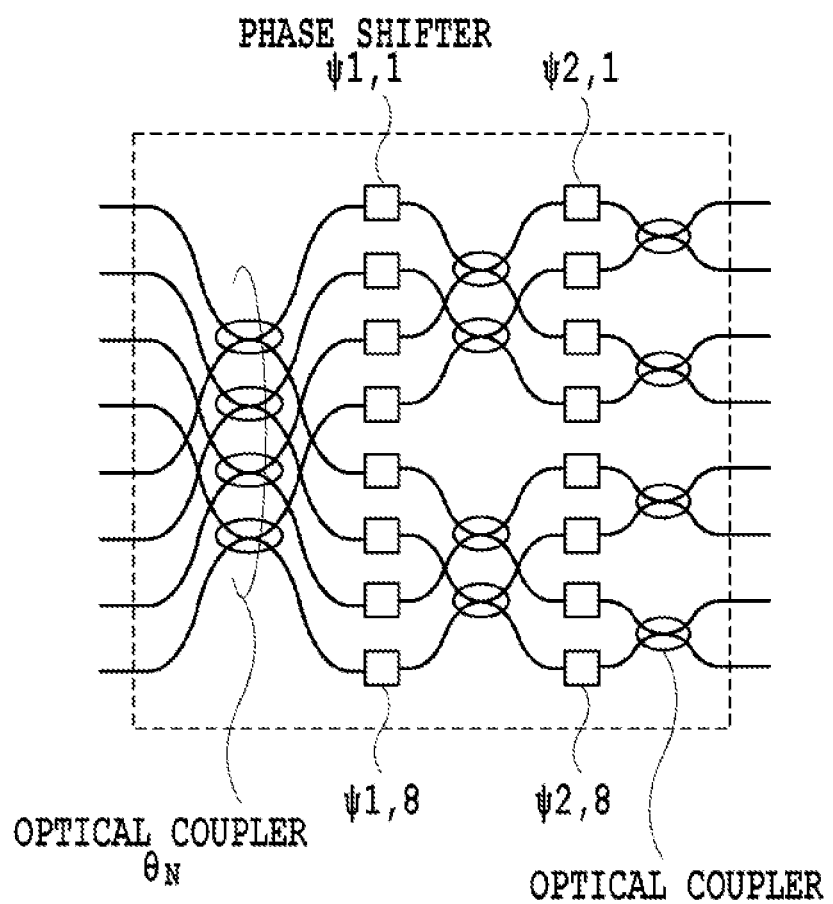
FIG. 2C is a diagram illustrating a configuration example of the M×M coupler for M=8 of the multi-stage interferometer circuit of FIG. 1.

Note that, (u−1) div $2^{m-t}$ and (u−1) mod $2^{m-t}$ represent the quotient and remainder when (u−1) is divided by $2^{m-t}$, respectively. FIG. 2A illustrates a configuration example of the M×M coupler 111-N of the multi-stage interferometer circuit 100 of FIG. 1 for M=2, FIG. 2B illustrates a configuration example of the M×M coupler for M=4, and FIG. 2C illustrates a configuration example of the M×M coupler for M=8.

The M-array delay circuit is based on the fact that, in the x-th delay path and y-th delay path specified by the above formula with the above-described u and t as the parameters, the path length difference between the both delay paths results in a relationship of $2^{m-t} \cdot \Delta L$. Furthermore, in the M-array delay circuit, the path length of an integral multiple of M·ΔL/2 may be added to the upper-half delay paths. Note that FIG. 1 illustrates, as a representative example, a configuration in which the path lengths of the delay circuits 112-1 to 112-N−1 are longer on the upper side of the page, and the path length of the M-array delay circuit 112-N increases by ΔL sequentially from the lower side toward upper side of the page, but the arrangement of the delay circuits depends on the layout of the circuit. The above both delay lines may become longer on the lower side of the page, or there may be adopted a configuration in which these are mixed as in the present embodiments described later.

Furthermore, in FIG. 1, the 1×(M/2) coupler consists of a plurality of 1×2 couplers connected in the shape of a binary tree, but other configurations such as an MMI type 1×(M/2) coupler may be naturally employed.

Figure 4A:
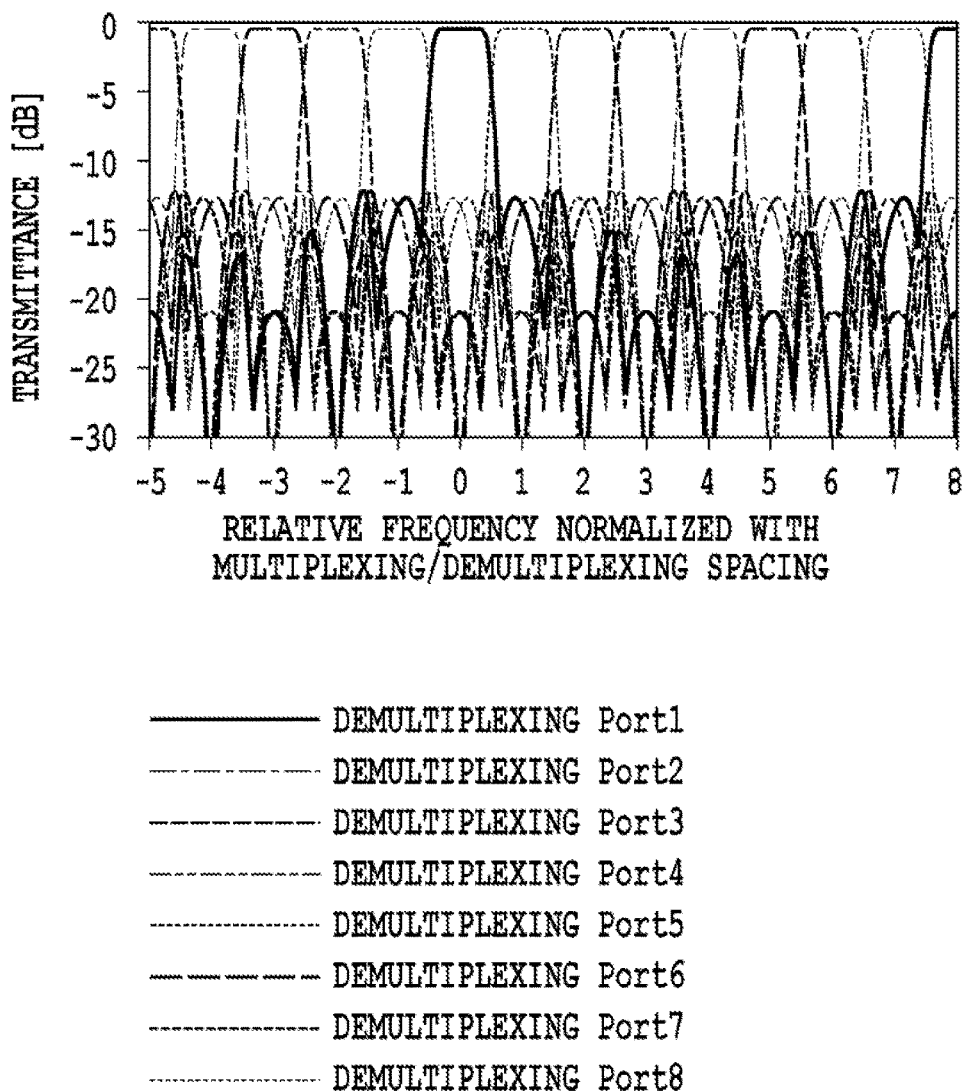
FIG. 4A is a diagram illustrating a power transmittance characteristic of the multi-stage interferometer circuit without a TF, when design parameters given in FIG. 3 are used.
Figure 4B:
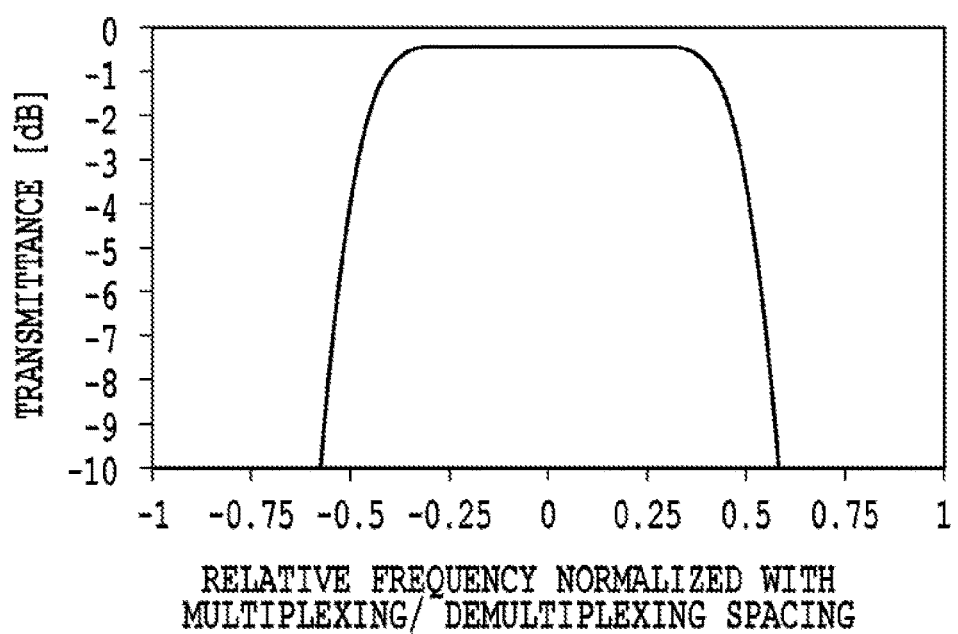
FIG. 4B is a diagram illustrating the power transmittance characteristic in a passband of the multi-stage interferometer circuit without a TF, when design parameters given in FIG. 3 are used.
Figure 4C:
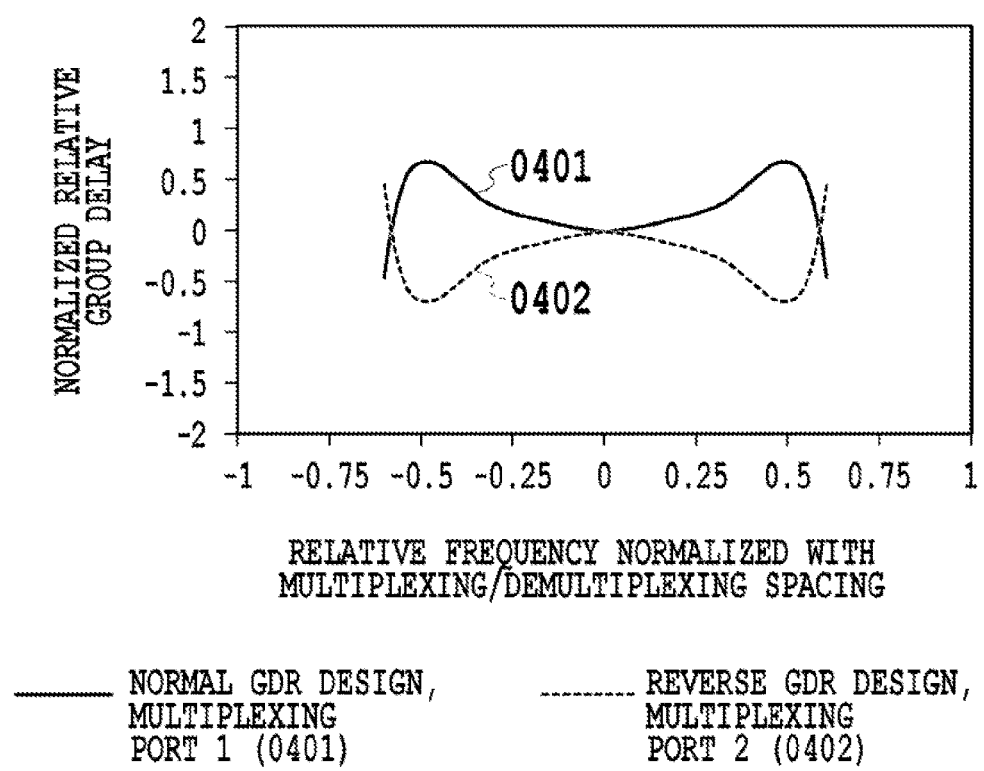
FIG. 4C is a diagram illustrating the group delay characteristics in the passband of the multi-stage interferometer circuit without a TF, when design parameters given in FIG. 3 are used.

In the present configuration, the configurations other than the transversal filters 104, 105, 114-1 to 114-N, 115-1 to 115-N, and 131-1 to 131-M are the same as the configurations described in Patent Literature 1. Namely, the configuration of the present invention differs significantly from the configuration described in Patent Literature 1 in that TFs 104, 105, 114-1 to 114-N, 115-1 to 115-N, and 131-1 to 131-M are inserted, in all the interference light paths in at least one or more stages of interferometers, and/or at least either one of the multiplexing ports, and/or demultiplexing ports. In order to explain the effect of this insertion of TFs, first, there will be briefly described the characteristics in a configuration in which a TF is not inserted (multi-stage interferometer circuit without a TF: see Patent Literature 1).
Characteristics without TF FIG. 3 gives an example of the design parameters when the number of demultiplexing ports is eight (M=8) and the number of stages of interferometers is four (N=4). Here, it indicates that when a delay length multiple $k_i$ is negative, the path length of a delay circuit in FIG. 1 is larger on the lower side path. Furthermore, a parameter $\theta_i$ of an optical coupler is what is the called coupling phase angle that expresses, in angle, the optical coupling ratio of an optical coupler. Here, $(\sin(\theta_i))^2$ is the power ratio of the coupling ratio, namely, is a power distribution ratio to a cross path. Note that the phase value $\varphi_4$ of the phase shifter of the final stage and the multiplexing port to be used differ between a normal group delay ripple design (normal GDR design) and a reverse group delay ripple design (reverse GDR design). Note that, in the present configuration, there is employed a design in which $k_i$ differs by the power of 2 for each stage and which allows a desired highly-rectangular transmission characteristic to be obtained with a fewer number of stages, as described above. However, it is to be noted that as described in Patent Literature 1, designs may be possible in which $k_i$ takes various integers. FIG. 4A illustrates the power transmittance characteristics of all the demultiplexing ports of a multi-stage interferometer circuit without a TF when design parameters given in FIG. 3 are used, FIG. 4B illustrates the power transmittance characteristic in the passband of the multi-stage interferometer circuit without a TF, and FIG. 4C illustrates the group delay characteristics in the passband of the multi-stage interferometer circuit without a TF. In these views, the horizontal axis represents the relative frequency normalized with the multiplexing/demultiplexing spacing. Note that the characteristics in the passband illustrated in FIG. 4B and FIG. 4C are the same in all the demultiplexing ports. Furthermore, the power transmittance characteristics illustrated in FIG. 4A and FIG. 4B are completely the same between the normal GDR design and the reverse GDR design. On the other hand, the group delay characteristic is reversed upside down between the normal GDR design (0401) and the reverse GDR design (0402), as illustrated in FIG. 4C. As can be seen from the views of the illustrated power transmittance characteristics, a multi-stage interferometer circuit without a TF has a small theoretical loss, a low loss, and a wide passband, and is excellent in the flatness of the passband. As described in Patent Literature 1, this flatness can be further enhanced by increasing the number of stages of interferometers. The number of demultiplexing ports also can be further increased without increasing the number of stages of interferometers by increasing the number M of interference path arrays of the M-beam interferometer, namely, without significantly increasing the circuit size. Furthermore, since the path length difference among all the interferometers used in the circuit is an integral multiple of ΔL, fully circulating operation at FSR=c/(n·ΔL) is assured.

The group delay characteristic has a group delay ripple in the passband as illustrated in FIG. 4C. Note that, in these views, the frequency on the horizontal axis is normalized as described above, and thus the group delay amount is also normalized accordingly. In order to convert the normalized group delay amount to an actual numerical value, the unit of group delay may be regarded as 1/funit [s] when the unit of frequency is funit [Hz]. For example, when the unit of frequency is 37.5 GHz, the unit of group delay becomes 26.6 ps, and thus the ripple amount in the passband in this view becomes approximately 18 ps. Generally, in communication systems, a multiplexer and demultiplexer are used, in many cases, as a pair. In a multicarrier system, a multiplexer is used in the transmitter and a demultiplexer is used in the receiver. As described above, the group delay characteristic is reversed upside down between the normal GDR design and the reverse GDR design. Accordingly, a multiplexer based on the normal GDR design is used in the transmitter and a demultiplexer based on the reverse GDR design is used in the receiver, and thus the group delay ripple of each multi-stage interferometer circuit can be canceled and set to zero in the characteristic of a whole transceiver system.

As described above, a multi-stage interferometer circuit without a TF has a rectangular transmission characteristic excellent in the passband flatness. Accordingly, a Nyquist signal having a highly rectangular spectrum may be able to be generated when signal light is caused to pass through this multi-stage interferometer circuit without a TF. However, this is not true because the output signal light from a modulator, namely, original signal light entering a multi-stage interferometer circuit, actually does not have a flat spectrum. Hereinafter, the reason will be explained in detail.

Figure 5:
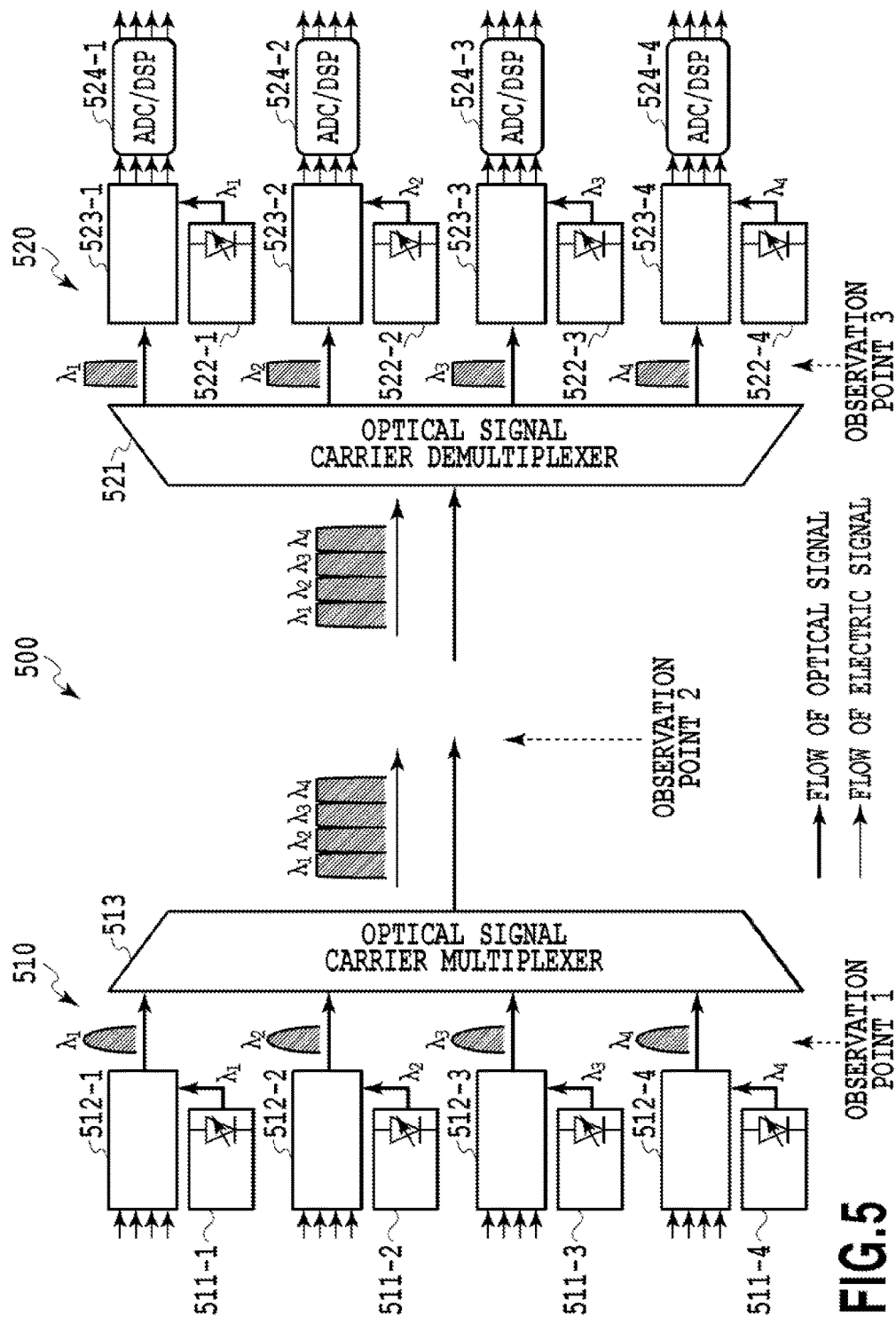
FIG. 5 is a configuration diagram illustrating an example of a multicarrier transceiver using the multi-stage interferometer circuit of FIG. 1.

FIG. 5 illustrates a configuration example of a multicarrier transceiver 500 which is an example of the multicarrier transceiver using the multi-stage interferometer circuit 100 of FIG. 1. Note that FIG. 5 illustrates a case where the number of subcarriers is four. The multicarrier transceiver 500 of FIG. 5 includes a transmitter 510 and a receiver 520. The transmitter 510 includes: carrier-wave light sources 511-1 to 511-4 prepared for each subcarrier; polarization-multiplexing vector modulators (polarization-multiplexing IQ modulators) 512-1 to 512-4 into which a binary electric signal for each subcarrier and the light from the carrier-wave light sources 511-1 to 511-4 are input; and a multiplexer 513 which multiplexes respective subcarrier signal lights into a multicarrier signal. The receiver 520 includes: a demultiplexer 521 which demultiplexes the multicarrier signal from the transmitter 510 into respective subcarrier signals; local light sources 522-1 to 522-4 prepared for each subcarrier; coherent demodulators 523-1 to 523-4 into which respective subcarrier signals and the lights from the local light sources 522-1 to 522-4 are input; and analog-to-digital converters (ADC)/digital signal processors (DSP) 524-1 to 524-4 into which the demodulated electric signals from the coherent demodulators 523-1 to 523-4 are input, respectively.

Figure 6A:
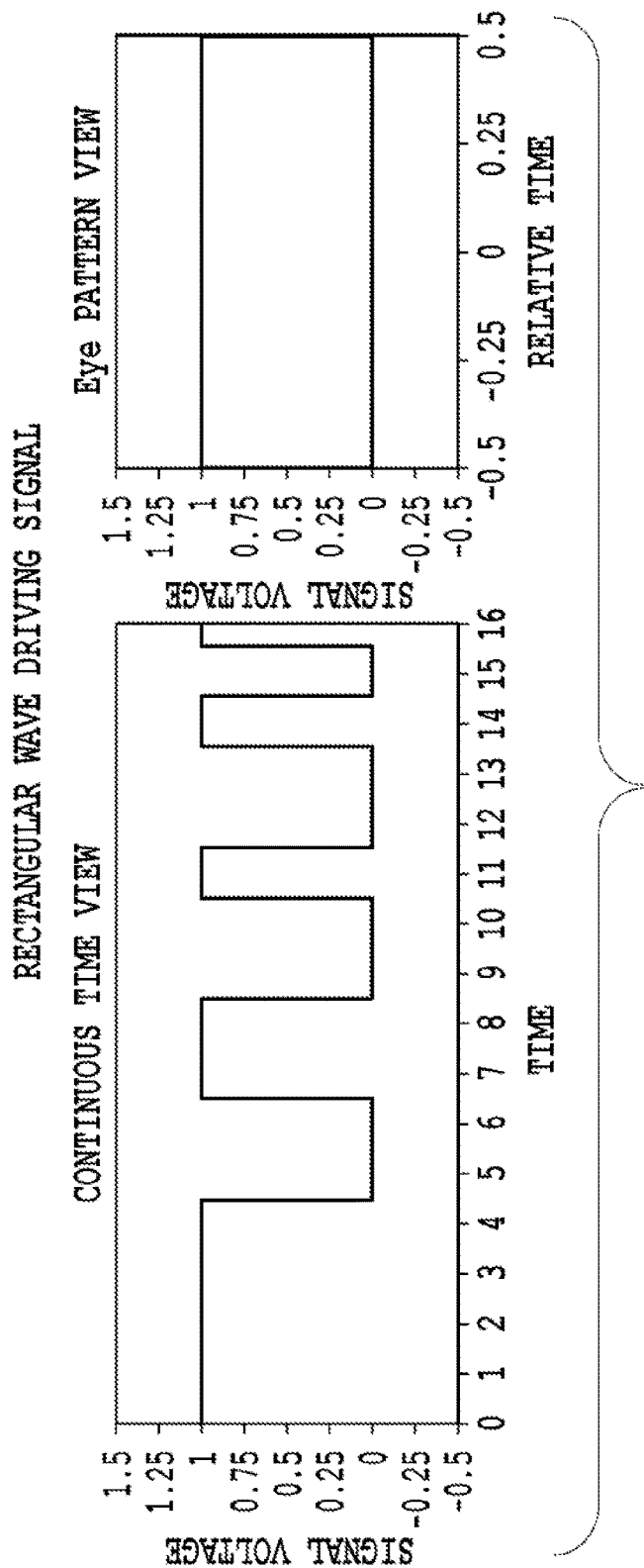
FIG. 6A is a diagram illustrating a signal waveform of a rectangular wave which drives a polarization-multiplexing IQ modulator of FIG. 5 and which is an ideal electric signal waveform assuming QPSK modulation.
Figure 6B:
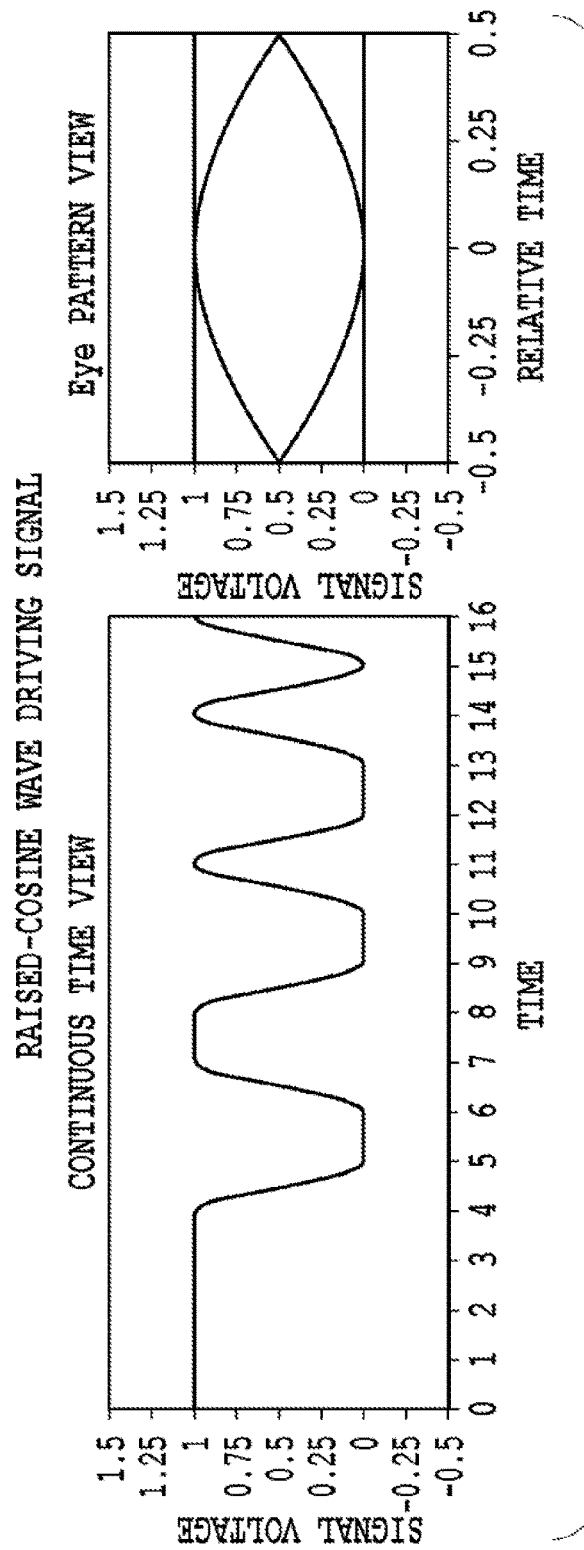
FIG. 6B is a diagram illustrating a signal waveform of a raised-cosine wave which drives the polarization-multiplexing IQ modulator of FIG. 5 and which is an actual electric signal waveform assuming QPSK modulation.

Since it is assumed that in the transmitter 510, Nyquist-shaping is not performed in the stage of an electric signal but is performed in the stage of signal light, an electric signal for driving the modulator is a rectangular wave signal. Here, FIG. 6A illustrates a binary ideal electric signal for driving the modulator, assuming QPSK modulation, and FIG. 6B illustrates an actual binary electric signal waveform from an electric data signal source usually used, the electric signal being for driving the modulator, assuming QPSK modulation. The electric signal for driving the modulator is ideally a rectangular wave based waveform signal, as illustrated in FIG. 6A. However, the actual driving waveform results in a waveform, referred to as a raised-cosine waveform, whose transitional level becomes dull since the bandwidth of an electrical device is finite, as illustrated in FIG. 6B. Also in multi-level modulation such as 16-level quadrature amplitude modulation (16 QAM modulation), a rectangular wave is the basis of the driving waveform although the number of levels of an electric signal just increases to four or the like, and a waveform whose transitional level becomes dull is again the actual driving waveform.

Figure 7A:
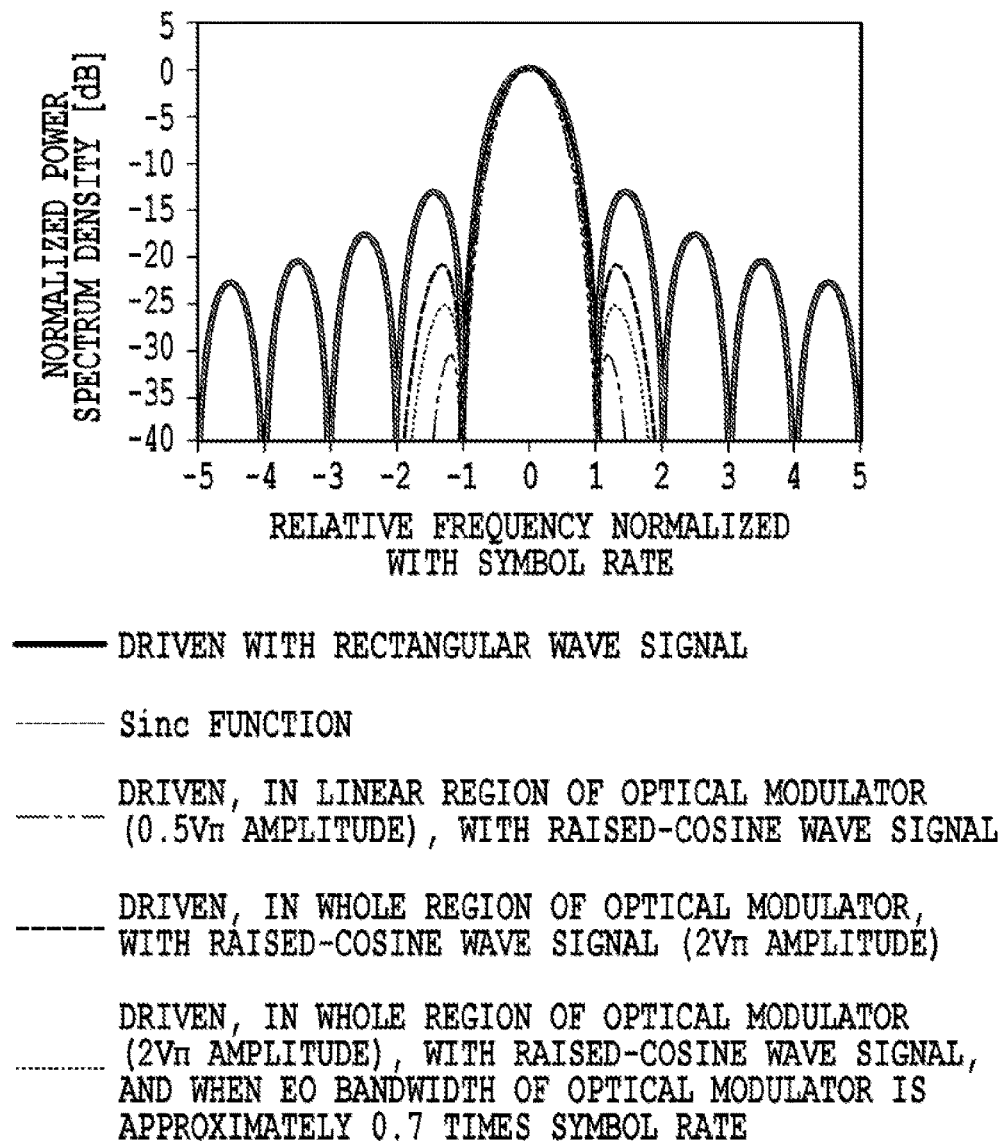
FIG. 7A is a diagram illustrating a whole spectrum characteristic of signal light from the polarization-multiplexing IQ modulator of FIG. 5.
Figure 7B:
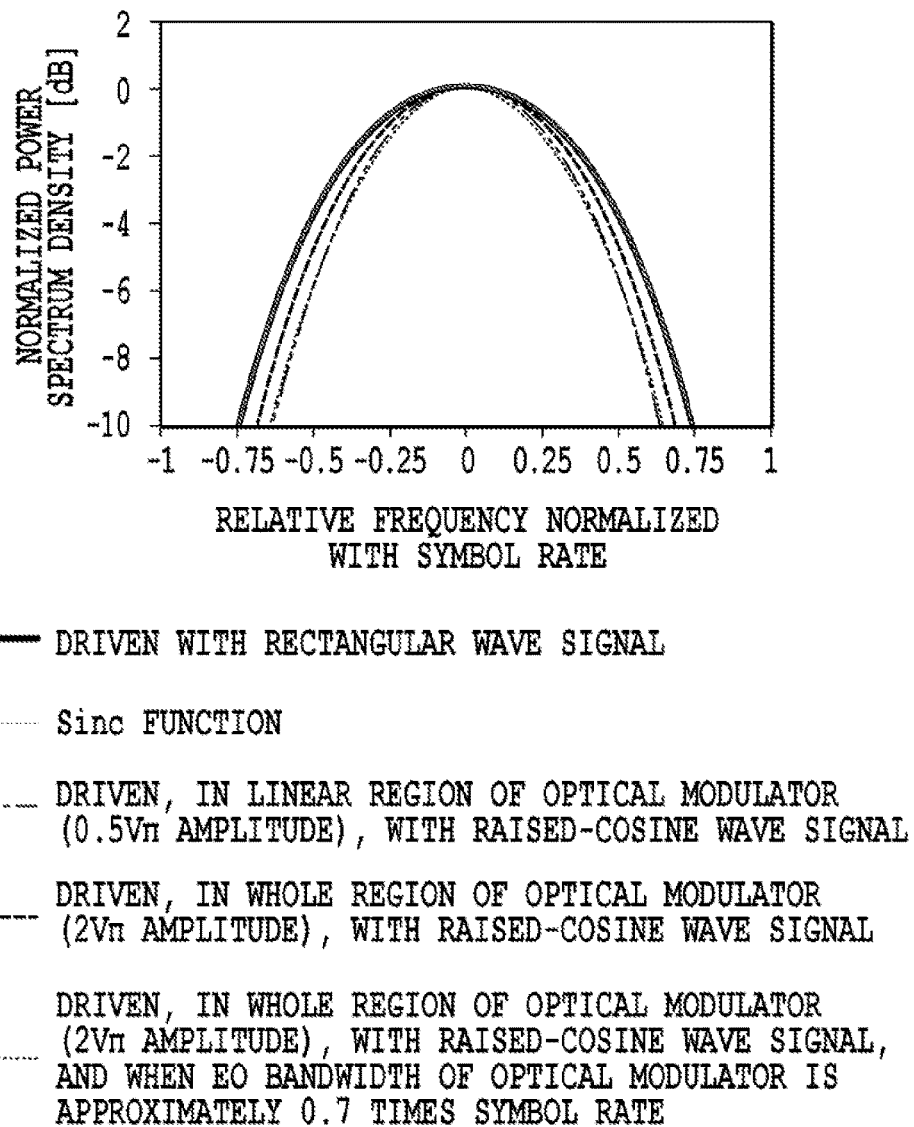
FIG. 7B is a diagram illustrating the detail characteristics in the main lobe of the spectrum of signal light from the polarization-multiplexing IQ modulator of FIG. 5.

FIG. 7A illustrates a whole spectrum characteristic of polarization-multiplex QPSK modulation signal light from the polarization-multiplexing IQ modulators 512-1 to 512-4 of FIG. 5, and FIG. 7B illustrates the detail characteristics in the main lobe of the spectrum of the polarization-multiplex QPSK modulation signal light. The spectrum of the polarization-multiplex QPSK modulation signal light from the polarization-multiplexing IQ modulator driven by the electric signal waveform of FIG. 6A or FIG. 6B has a spectrum shape on the basis of the shape expressed by a Sinc function, as illustrated in FIG. 7A. The spectrum has a Sinc shape when the modulator is driven by an electric signal of a perfect rectangular wave illustrated in FIG. 6A. When the modulator is driven by an electric signal of the raised-cosine waveform illustrated in FIG. 6B, the side lobes further attenuate and the main lobe has a slightly sharper shape as compared with the case of a pure Sinc shape. These shapes delicately vary depending on the driving amplitude and/or the frequency characteristics of a modulator itself, as can be seen from the spectra calculated under various conditions given in FIG. 7A and FIG. 7B.

Figure 8A:
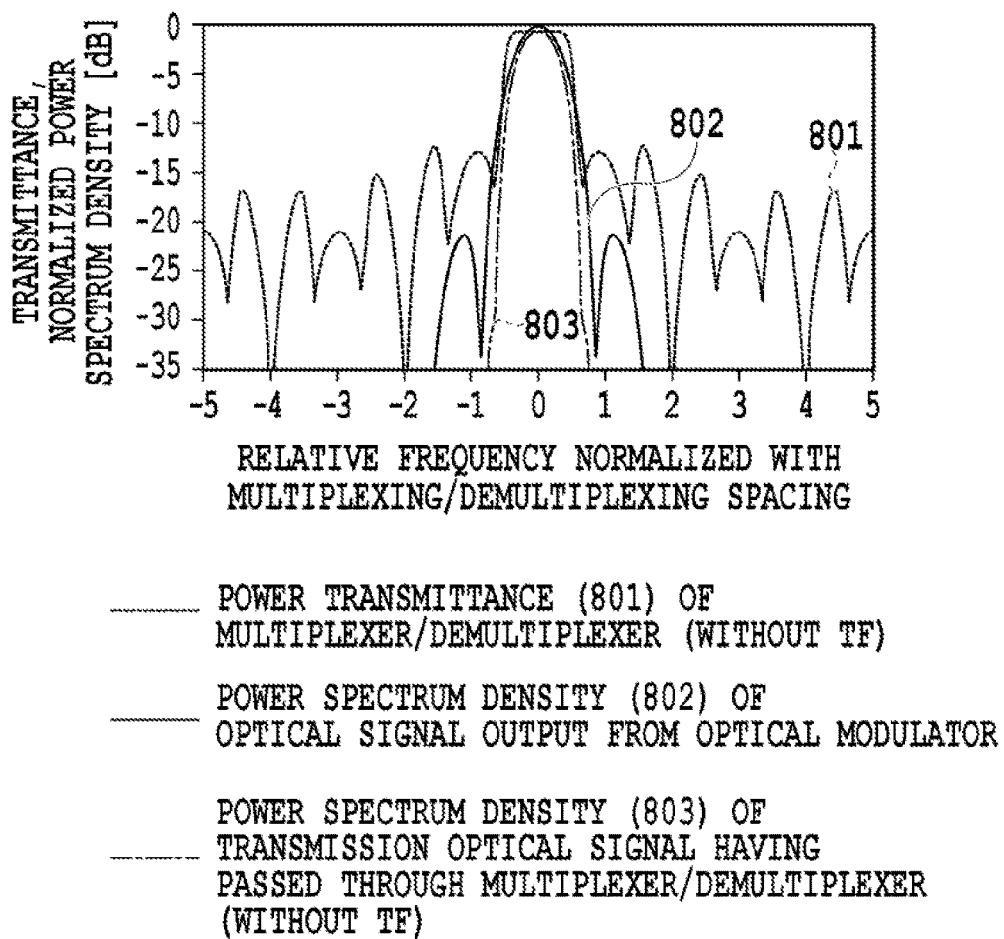
FIG. 8A is a diagram illustrating the characteristics in all regions of the calculated spectrum or the like of the signal light when the signal light having the spectrum shapes of FIG. 7A
Figure 8B:
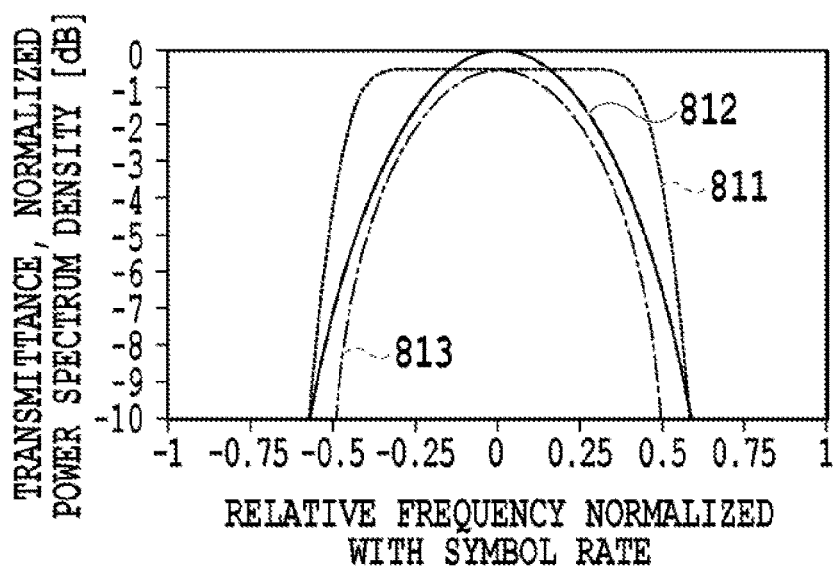
FIG. 8B is a diagram illustrating the detailed characteristics in the vicinity of the main lobe/passband of the calculated spectrum or the like of the signal light when the signal light having the spectrum shapes of FIG. 7A

FIG. 8A illustrates the characteristics in all regions of the calculated spectrum or the like of the signal light when the signal light having the spectrum shape of FIG. 7A and FIG. 7B passes through the multi-stage interferometer circuit (to be used as a multiplexer because it is inside a transmitter) without a TF, in the transmitter 510; and FIG. 8B illustrates the detail characteristics in the vicinity of the main lobe/passband. In FIG. 8A and FIG. 8B, the followings are assumed: the ratio of the subcarrier spacing of the multiplexer 513 and a symbol rate of the subcarrier signal light is about 1.17 (corresponding to the subcarrier spacing=37.5 GHz and the symbol rate=32 G baud), the modulation format of the subcarrier signal is polarization-multiplex QPSK modulation, the driving condition of the modulator is driving with an amplitude of $2V\pi$ by a raised-cosine wave electric signal, and the bandwidth of the modulator is nonlimiting. In the first place, the power spectral density (802, 812) of output signal light from the modulator, namely, original signal light input to the multiplexer, is not flat but lobbed-shaped. As can be seen from this calculation result, even when the transmittance characteristic (801, 811) of the multiplexer 513 has a highly rectangular shape excellent in passband flatness, the power spectral density (803, 813) of signal light having passed through the multiplexer, namely, of the transmission signal light as a transmitter, becomes also lobbed-shaped. Naturally, from just the viewpoint of bandwidth, the side lobe is removed and the width of the main lobe is also narrowed, and thus the signal becomes close to the Nyquist signal.

Therefore, in order to set the spectrum shape of the transmission signal light also to a highly rectangular shape like the Nyquist signal, the passband of the multiplexer 513 is required to have a dip-shaped characteristic for correcting the Sinc spectrum shape of the original signal. The methods of simply imparting a dip characteristic to the passband include a method of boosting the higher band by adequately adjusting the parameter $\theta i$ of an optical coupler as described in Patent Literature 1. However, this method of adjusting the parameter $\theta i$ has a problem that the extinction ratio of an adjacent channel is deteriorated. For the use as the multiplexer of the transmitter, a decrease in extinction ratio of an adjacent channel leads to the leaking of a side lobe part of an adjacent subcarrier signal light into the corresponding subcarrier, namely, leads to crosstalk. This is not preferable because of resulting in a decrease in signal quality.

The operation as a demultiplexer will be explained below in order to easily understand the cause of this crosstalk. For a multi-stage interferometer circuit without a TF, signal light input to the multiplexing port is output to either one of the demultiplexing ports. Namely, when a dip-shaped characteristic is imparted to the passband of a corresponding channel, the light causing a loss as a dip does not disappear to somewhere but is output to other demultiplexing ports without fail, and thus the method of adjusting the parameter $\theta i$ essentially causes crosstalk.

Configuration of TF

Figure 9A:
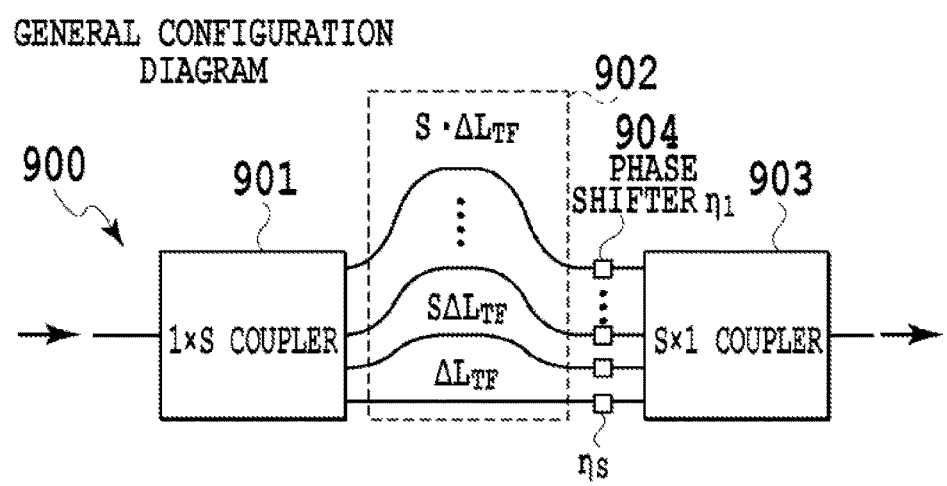
FIG. 9A is a diagram illustrating a general configuration example of a TF used in the present invention.

In order to impart a dip-shaped characteristic without causing crosstalk, a configuration is indispensable in which the light resulting in a dip is discarded to a place other than the demultiplexing ports. In the configuration of the multi-stage interferometer circuit of the present invention, impartment of a dip-shaped characteristic without causing crosstalk is realized with a TF. FIG. 9A to FIG. 9J are diagrams illustrating the configuration examples of a TF in the present invention. FIG. 9A illustrates a general configuration of a TF, whereas FIG. 9B to FIG. 9J illustrate the detailed configuration examples of the TF. A TF 900 of FIG. 9A is a multiple beam interferometer which includes: a one-input/S-output coupler (1×S coupler) 901; an S-array delay circuit 902 connected to the S outputs of the 1×S coupler 901; and an S-input/one-output coupler (S×1 coupler) 903 to which S outputs of S arm waveguides of the S-array delay circuit 902 are connected, respectively. Furthermore, phase shifters (ηi) 904-1 to 904-s are inserted in several arm waveguides of the S-array delay circuit 902 as necessary.

The path length difference between the adjacent arm waveguides of arm waveguides (delay lines) of the S-array delay circuit 902 is $\Delta L_{TF}$. (Therefore, the path length difference between the shortest arm waveguide and longest arm waveguide of the S-array delay circuit 902 is $(S-1) \cdot \Delta L_{TF}$.) At this time, the TF has a transmission characteristic repeated in cycles determined by $\Delta L_{TF}$. A repetition cycle FSRTF is expressed by $$FSR_{TF} = c/(n \cdot \Delta L_{TF}) \quad \text{Formula 6}$$

Where c is the velocity of light and n is the effective refractive index of a waveguide. Usually, $\Delta L_{TF}$ is set as the formula below.

$$\Delta L_{TF} = M \cdot \Delta L \quad \text{Formula 7}$$

However, this may be not applicable when a TF is inserted in the output port of the multi-stage interferometer circuit. Substituting Formula 6 into Formula 7 and using Formula 1, then $FSR_{TF} = \Delta f$ is established. Therefore, when $\Delta L_{TF}$ satisfies the relationship of Formula 7, the characteristic repetition cycle of the TF is the same as the multiplexing/demultiplexing spacing of the multi-stage interferometer circuit, and the same correction characteristic can be collectively imparted to the subcarrier signal of each port. Generally, in the transversal filter, the transmission characteristic can be determined, with the strength/phase value of each tap, in a defined frequency range determined by the FSR, and the larger the number of taps becomes, the further the degree of freedom for design of the transmission characteristic increase. Therefore, also with the TF 900 of the present configuration, a dip characteristic which substantially corrects the Sinc characteristic can be obtained by appropriately setting the branching ratio of the 1×S coupler 901, the merging ratio of the S×1 coupler 903, and the phase shift amount of the phase shifter.

Figure 9B:
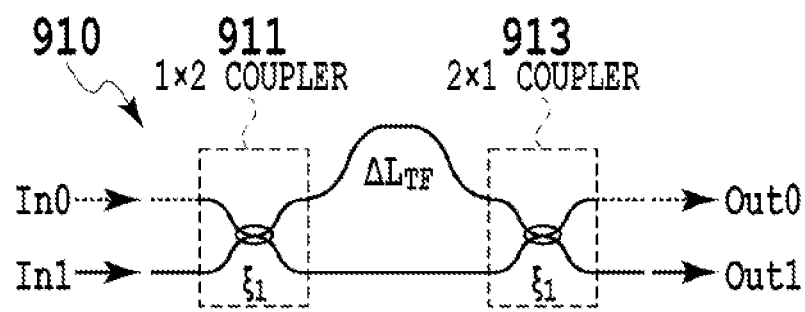
FIG. 9B is a diagram illustrating a specific configuration example of the TF used in the present invention.
Figure 10B:
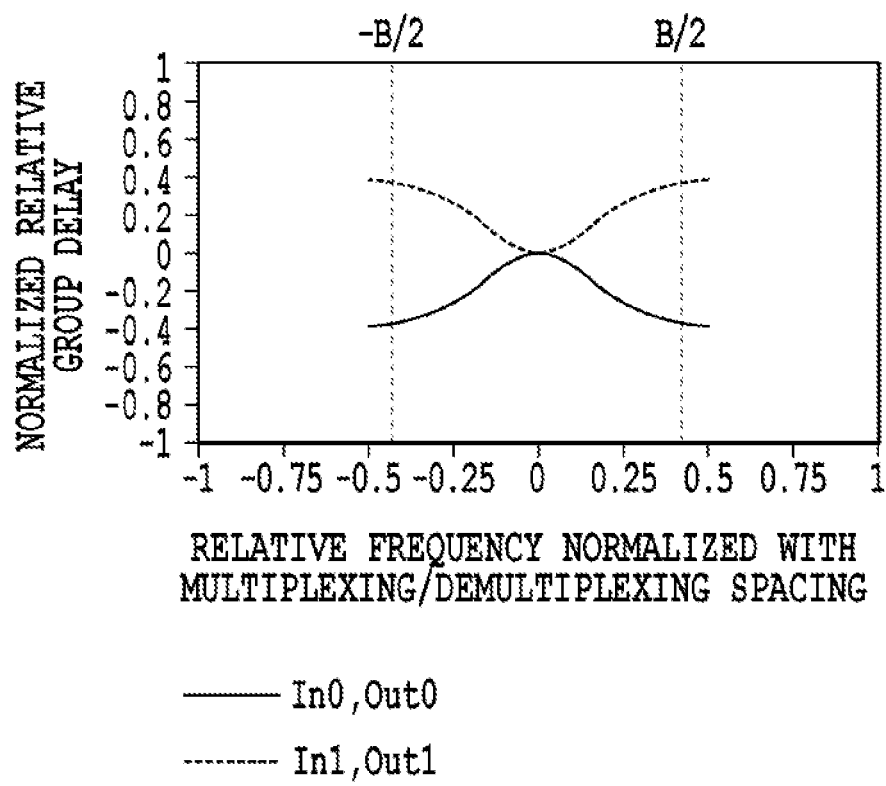
FIG. 10B is a diagram illustrating the group delay characteristics in a design characteristic 2 of the TF of FIG. 9B.

A TF 910 of FIG. 9B is a two-tap TF as a two-beam interferometer having path lengths different from each other by $\Delta L_{TF}$. There is used, as a 1×2 couplers 911 and 2×1 coupler 913, a 2×2 coupler whose unnecessary input/output ports are set not to be used. FIG. 10A illustrates the power transmittance characteristics of the TF 910, whereas FIG. 10B illustrates the group delay characteristics in a design characteristic 2 of the TF 910. In the power transmittance characteristics of FIG. 10A, the design value of the coupling phase angle (coupling ratio) $\xi 1$ of each of the 2×2 couplers 911 and 913 is calculated as $0.1518\pi$ (21.1%) in a design 1 and $0.1292\pi$ (15.6%) in a design 2, whereas the group delay characteristics illustrated in FIG. 10B are calculated with the parameters of the design 2. Note that FIG. 10A also illustrates a target characteristic which corrects the spectrum shape of signal light when the modulator is driven by a raised-cosine wave signal with an amplitude of $2V\pi$. A target correction characteristic 1 assumes a case where correction is made in all ranges of the Nyquist bandwidth $\pm B/2$, whereas target correction characteristic 2 assumes a case where correction is made within a range narrower than the above all ranges. Here, B is the symbol rate of signal light. As can be seen in FIG. 10A, even a two-tap TF can roughly correct the Sinc-shaped spectrum. However, in the design 1, an in-band ripple on the order of 1 dB is calculated to remain, whereas in the design 2, the range capable of being corrected becomes slightly smaller than the Nyquist bandwidth although the ripple amount decreases. Note that the power transmission characteristics of FIG. 10A become the same as each other in either case where an input port 0 (In0)/output port 0 (Out0) are used or where an input port 1 (In1)/output port 1 (Out1) are used. However, as illustrated in FIG. 10B, the group delay characteristics are reversed upside down when the input port 0/output port 0 are used and when the input port 1/output port 1 are used.

Figure 9C:
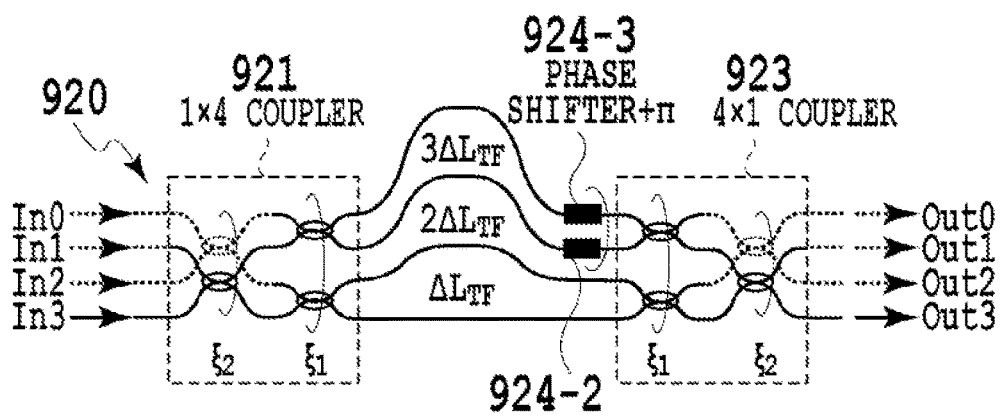
FIG. 9C is a diagram illustrating a specific configuration example of the TF used in the present invention.
Figure 11A:
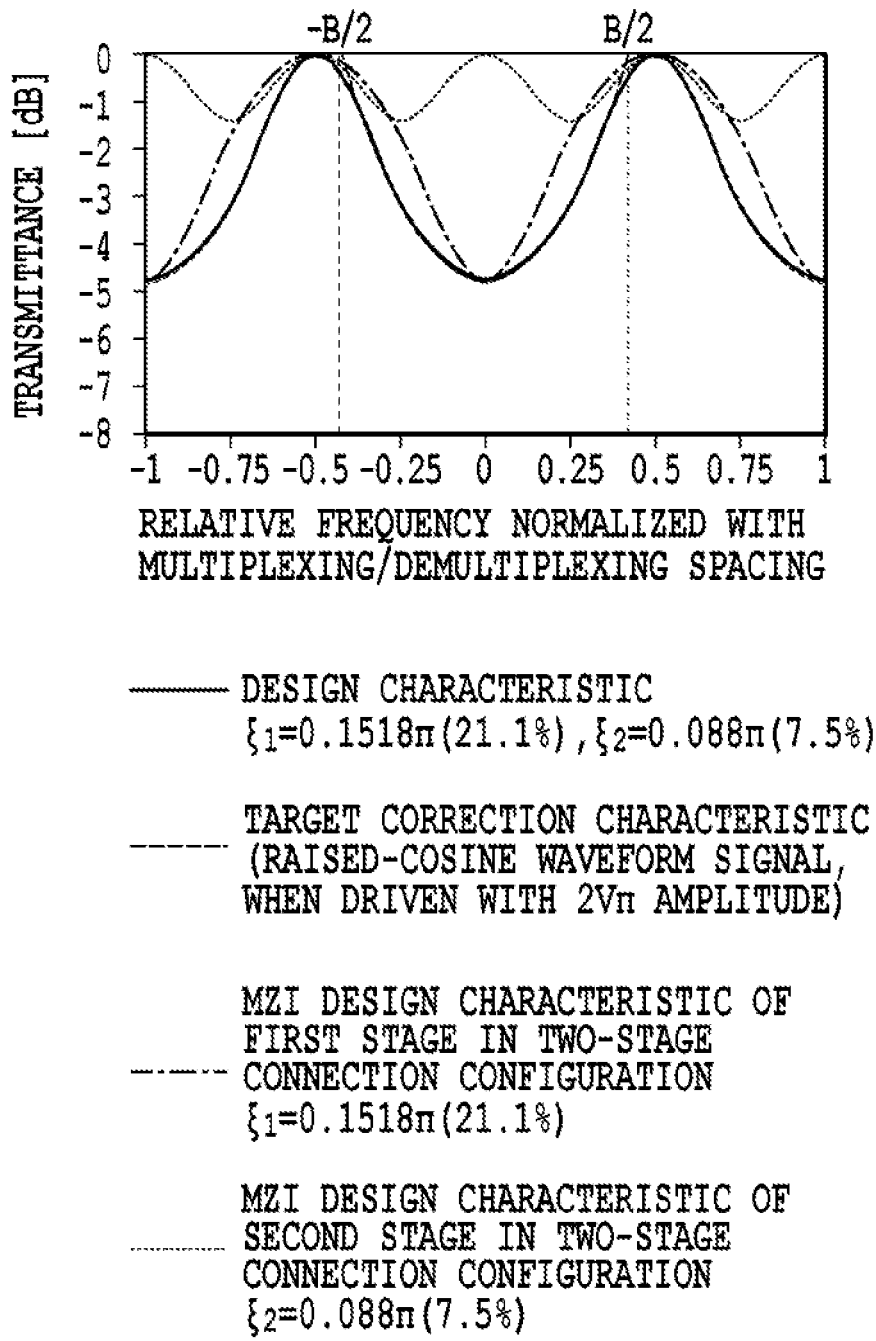
FIG. 11A is a diagram illustrating the power transmittance characteristics of the TF of FIG. 9C.
Figure 11B:
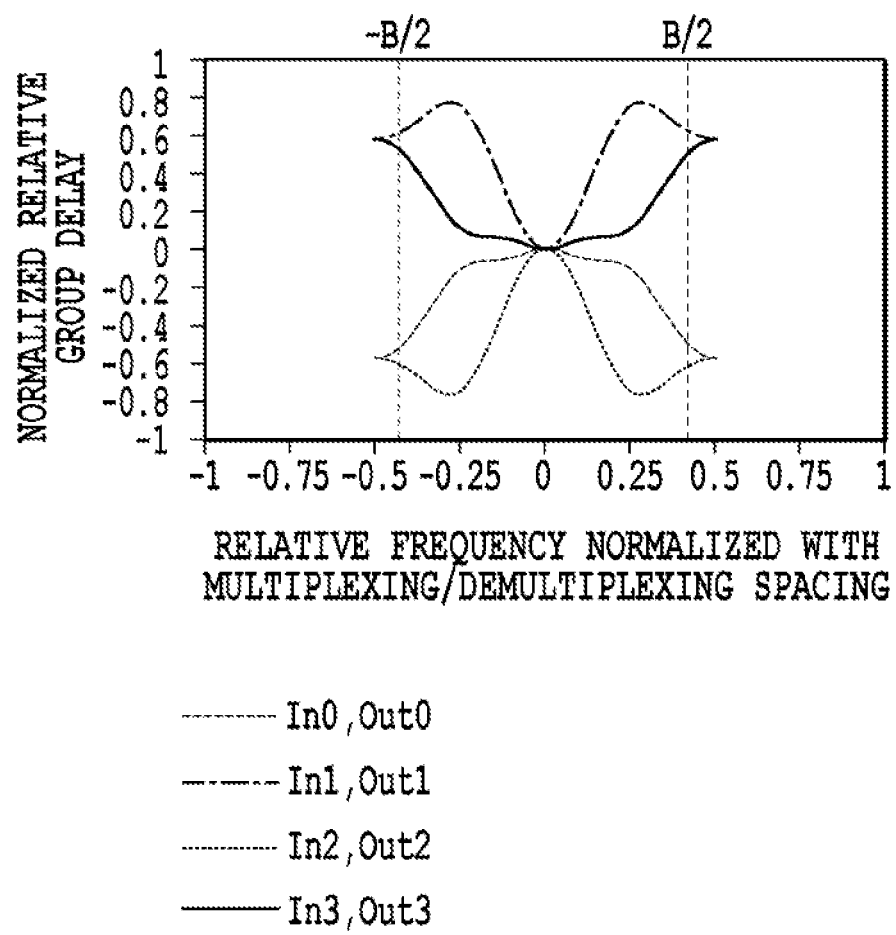
FIG. 11B is a diagram illustrating the group delay characteristics of the TF of FIG. 9C.

FIG. 9C illustrates a configuration example of a four-tap TF 920 as a four-beam interferometer having path lengths different from each other by $\Delta L_{TF}$. A 1×4 coupler 921 and a 4×1 coupler 923 use a configuration in which the 2×2 couplers are combined and the unnecessary input/output ports are set not to be used. $\pi$ phase shifters 924-2 and 924-3 are inserted in paths having a path length difference of $3\Delta L_{TF}$ and paths having a path length difference of $2\Delta L_{TF}$. FIG. 11A illustrates the power transmittance characteristics of the TF 920, whereas FIG. 11B illustrates the group delay characteristics of the TF 920. The transmission characteristics of FIG. 11A are calculated under the conditions that the coupling phase angles (coupling ratios) of the respective 2×2 couplers 921 and 923 are $\xi 1=0.1518\pi$ (21.1%) and $\xi 2=0.0088\pi$ (7.5%). Note that FIG. 11A also illustrates a target characteristic which corrects, in all ranges of Nyquist bandwidth $\pm B/2$, the spectrum shape of signal light when the modulator is driven by the use of a raised-cosine wave signal with an amplitude of $2V\pi$. As can be seen in FIG. 11A, with the four-tap TF, the Sinc-shaped spectrum can be corrected with a dip-shaped characteristic substantially close to the target characteristic. Note that, this power transmittance characteristic becomes the same as each other when any of a set of input port/output ports of the same number, namely, any of input port p (Inp)/output port p (Outp) (p is an integer from 0 to 3) is used. However, as illustrated in FIG. 11B, the group delay characteristic differs depending on a set of input port/output port, and is reversed upside down for p=0, 3 or for p=1, 2.

Figure 9D:
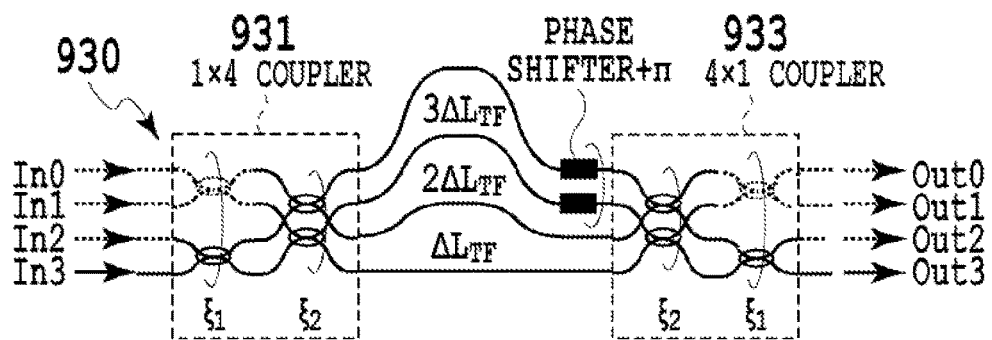
FIG. 9D is a diagram illustrating a specific configuration example of the TF used in the present invention.
Figure 9E:
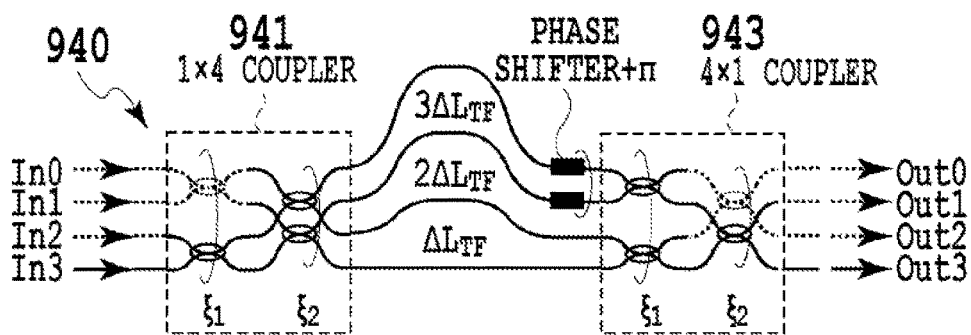
FIG. 9E FIG. 9E is a diagram illustrating a specific configuration example of the TF used in the present invention.
Figure 9F:
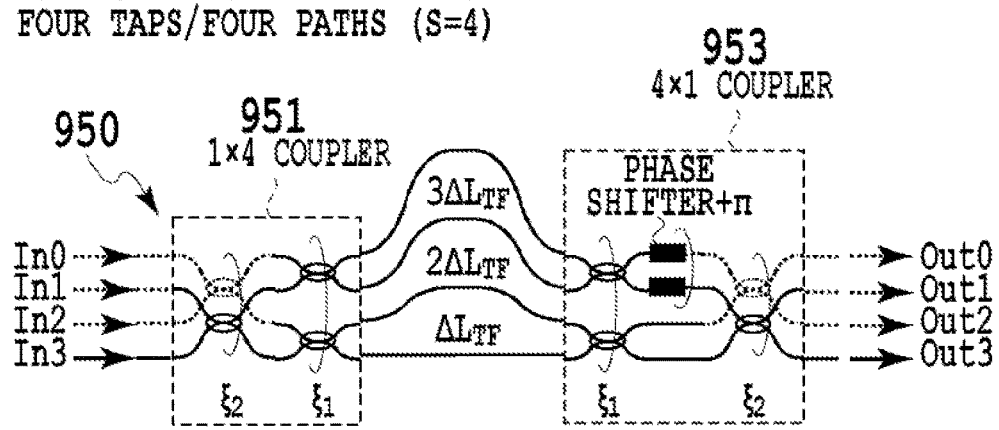
FIG. 9F is a diagram illustrating a specific configuration example of the TF used in the present invention.

Although FIG. 9D to FIG. 9F illustrate a configuration example of a four-tap TF as a four-beam interferometer having path lengths different from each other by $\Delta L_{TF}$, the configurations of the 1×4 coupler and 4×1 coupler and the position of the phase shifter differ from the configuration of FIG. 9C. The power transmittance characteristics and group delay characteristics of these four-tap TFs become completely the same as the characteristics illustrated in FIG. 11B. Note that, among these configurations, the configurations of FIG. 9C and FIG. 9F are not required to use a cross waveguide in the 1×4 coupler (921, 951) and 4×1 coupler (923, 953) when they are used as a TF having one input and one output, and thus these configurations can be said to be slightly advantageous in terms of layout design and in terms of loss characteristic as compared with the configurations of FIG. 9D and FIG. 9E.

Figure 9G:
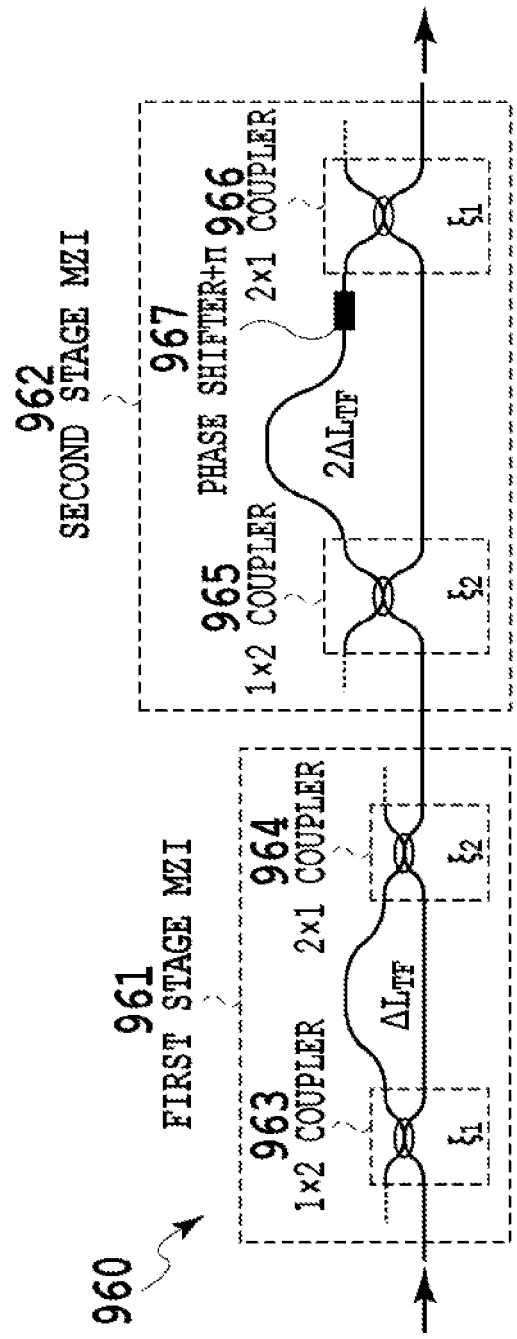
FIG. 9G is a diagram illustrating a specific configuration example of the TF used in the present invention.

A TF 960 illustrated in FIG. 9G includes two-stages of two-beam interferometers (MZI) connected in cascade, in which a path length difference of an MZI 961 of the first stage is $\Delta L_{TF}$, a path length difference of an MZI 962 of the second stage is $2\Delta L_{TF}$, and a $\pi$ phase shifter 967 is inserted in one of the paths of the MZI 962 of the second stage. The characteristics of this TF 960 connected in two stages also become completely the same as the characteristics in the input port 3/output port 3 illustrated in FIG. 11A.

The reason why the characteristics of the TF 920 illustrated in FIG. 9C to the TF 960 illustrated in FIG. 9G become the same as one another will be briefly described. A TF 930 of a configuration example 2 illustrated in FIG. 9D includes MZIs (referred to as MZI 2) having a path length difference $2\Delta L_{TF}$ nested in both interference paths of an MZI (referred to as MZI 1) having a path length difference ΔLTF. Since the MZIs 2 having the same configuration are included in all the paths of the MZI 1, namely, the light in all the paths is affected by the transmission characteristic of the same MZI 2, and thus even when this MZI 2 is taken out of the MZI 1 and the transmission characteristic of the MZI 2 is imparted collectively outside the MZI 1, a total transmission characteristic does not vary. The configuration having the MZI 2 taken out of the MZI 1 is the configuration itself of the TF 960 connected in two stages illustrated in FIG. 9G. Therefore, the TF 930 of the configuration example 2 illustrated in FIG. 9D and the TF 960 connected in two stages illustrated in FIG. 9G have the same transmission characteristic as each other. Note that "which input/output ports (on the upper side or lower side) of the MZI of each stage are used in the TF 960 connected in two stages?" directly corresponds to "which set of input/output ports are used in the TF 930 of the configuration example 2 of FIG. 9D?"

It can be seen that, also with regard to a TF 950 illustrated in FIG. 9F, since the MZI 1 is nested into the MZI 2, the same transmission characteristic can be obtained for the same reason. With regard to the TF 920 of the configuration example 1 illustrated in FIG. 9C, since the both positions of the phase shifters at both outputs of a 2×2 coupler of a coupling ratio ξ1 in a 4×1 coupler of a configuration example 4 just move to both the inputs of this optical coupler, the same transmission characteristic can be still obtained. A TF 940 of a configuration example 3 illustrated in FIG. 9E differs from the TF 920 of configuration example 1 only in the weaving orders of the 2×2 couplers inside the 4×1 coupler, the merging ratio from each path and the phase relationship from each path become the same in either 4×1 coupler, and thus the same transmission characteristic can be still obtained.

Various detail configurations for a two-beam interferometer and a four-beam interferometer have been explained, but a TF can be configured by the same idea in further multi-beam interferometer of eight-beam interferometer or the like. So far, an increase in the number of interferences means that the degree of freedom for design will increase accordingly, and thus a characteristics closer to a target characteristic can be obtained. FIG. 11A also illustrates the power transmittance characteristics of a single MZI 1 and single MZI 2 of a TF connected in two stages. As can be seen from the fact that the characteristics of the respective MZIs expressed in decibel and summed in decibel agree with the whole design characteristic, an increase in the number of stages in a multi-stage configuration which is an equivalent circuit means that a transmission characteristic having a higher order ripple can be set and that a characteristic further matched with a target characteristic can be designed.

Meanwhile, as previously described in FIG. 7A and FIG. 7B, the spectrum of signal light to be corrected has a basically Sinc shape, but the shape subtly varies with a driving condition and/or the like. Therefore, the target correction characteristic also varies with a driving condition and/or the like. FIG. 12 illustrates target correction characteristics different in the representative driving conditions, and the power transmission characteristics of the TF 920 when the parameters of a four-tap TF are subtly varied in accordance with these target correction characteristics. For each target correction characteristic, the parameters of the four-tap TF, for example, the coupling phase angle (coupling ratio) of each of the 2×2 couplers 921 and 923, are calculated as a design 1 (ξ1=0.1380π (17.6%), ξ2=0.075π (5.5%)), a design 2 (ξ1=0.1518π (21.1%), ξ2=0.088π (7.5%)), and a design 3 (ξ1=0.1668π (25.0%), ξ2=0.104π (10.3%)), respectively. AS illustrated in FIG. 12, it can be seen that with a TF of as low as four taps, a generally targeted correction dip characteristic can be realized with regard to any of the target correction characteristics of the respective driving conditions. Note that, even when the ratio between the subcarrier spacing of the multiplexer 513 and the symbol rate of a subcarrier signal light differs from the above-mentioned 1.17, the design parameters may be fitted by appropriately selecting the number of necessary taps as described above.

In the TF 910 of FIG. 9B to the TF 960 of FIG. 9G, a ripple is generated in the group delay characteristics, namely, group velocity dispersion is caused. When signal light passes through a medium with a group velocity dispersion, waveform distortion is caused. At present, in the transmission using a higher order modulation format, such as a QPSK modulation format, a method of performing demodulation by the use of a coherent detector and a digital signal processing (DSP) technique is mainstream. The signal waveform distortion caused by the group velocity dispersion can be corrected to some extent by this digital signal processing technique. However, for example, when the group velocity dispersion has large frequency dependence, namely, when the group delay ripple is large, there is a problem that the scale of a circuit for performing correction increases. Furthermore, for a signal system in which direct detection reception is performed without use of any digital signal processing technique, the system is directly affected by the group velocity dispersion/group delay ripple. Therefore, it is preferable that the multi-stage interferometer circuit allowing a transmission signal to pass therethrough has zero group velocity dispersion, namely, the group delay is constant in the passband and does not have a ripple.

Figure 9H:
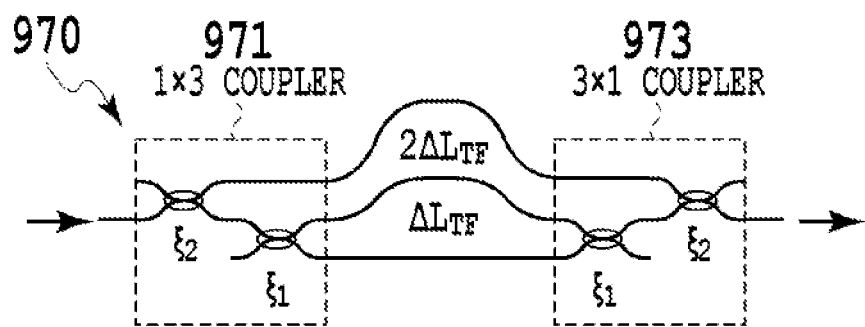
FIG. 9H is a diagram illustrating a specific configuration example of the TF used in the present invention.
Figure 91:
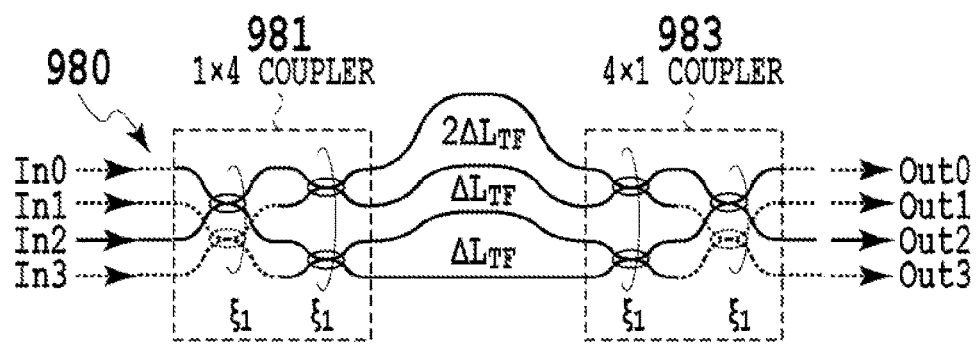
Figure 13A:
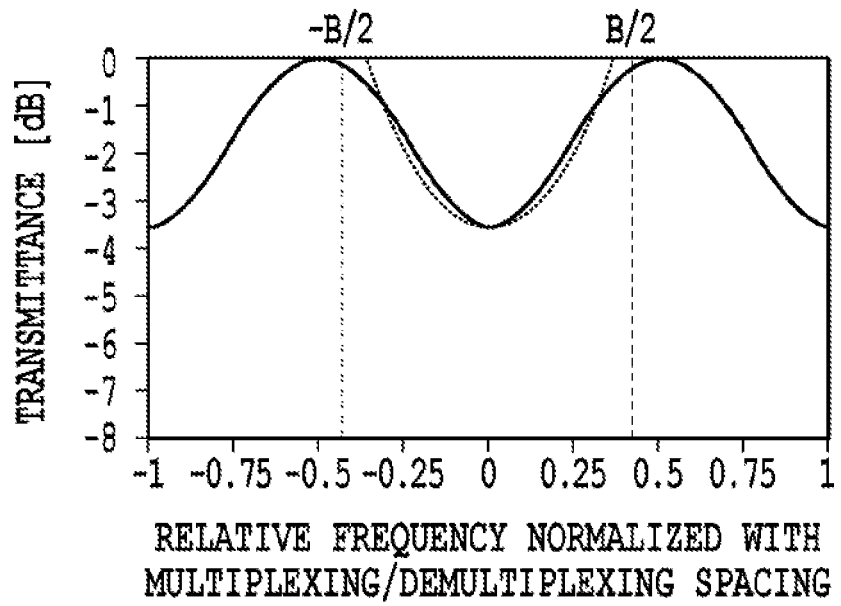
FIG. 13A is a diagram illustrating the power transmittance characteristics of the TF of FIG. 9H.
Figure 13B:
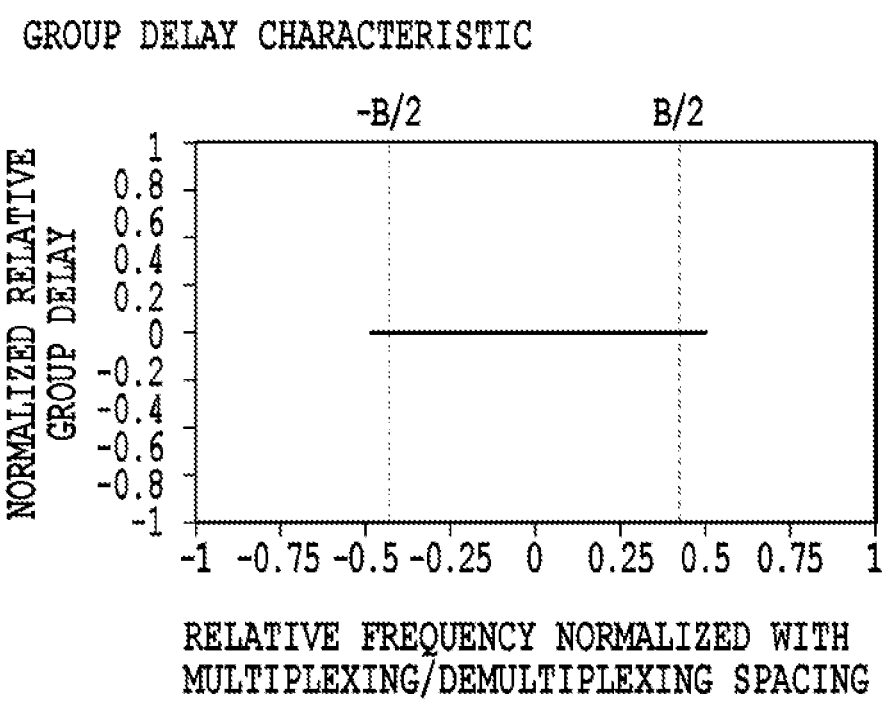
FIG. 13B illustrates the group delay characteristic of the TF of FIG. 9H.
Figure 13C:
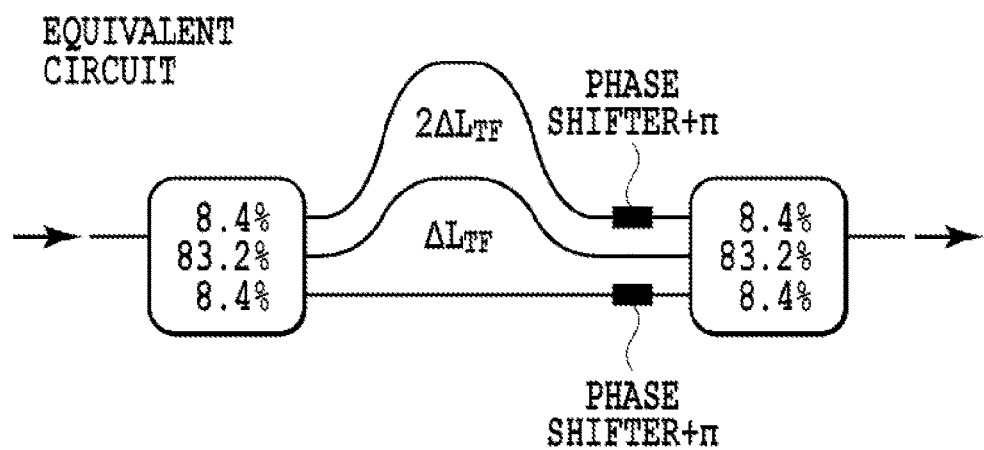
FIG. 13C is a diagram illustrating an equivalent circuit of the TF of FIG. 9H.
Figure 13D:
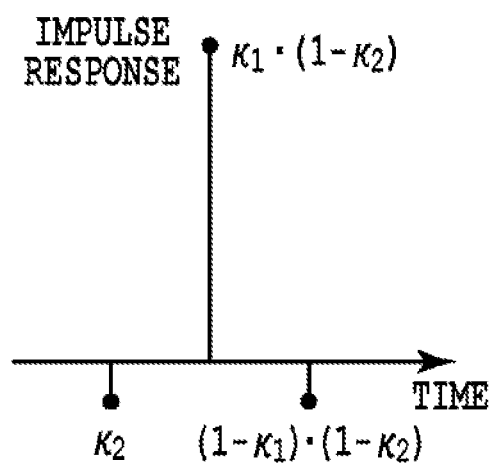
FIG. 13D illustrates the impulse response of the TF of FIG. 9H.

FIG. 9H illustrates a configuration example of a three-tap TF 970 as a three-beam interferometer having path lengths different from each other by ΔLTF. There is used, for a 1×3 coupler 971 and 3×1 coupler 972, a configuration in which 2×2 couplers are combined and unnecessary input/output ports are set not to be used. The coupling phase angle (coupling ratio) of each of the 2×2 couplers 971 and 972 is set as ξ1=0.0978π (9.1%) and ξ2=0.0930π (8.4%). FIG. 13A illustrates the power transmittance characteristics of the TF 970, FIG. 13B illustrates the group delay characteristic of the TF 970, FIG. 13C illustrates the equivalent circuit of the TF 970, and FIG. 13D illustrates the impulse response of the TF 970. The power transmittance characteristics have a degree of approximation of correction nearly equal to the above-described two-tap TF. On the other hand, the group delay characteristic is flat and does not have any ripple. The configuration of the TF 970 is schematically depicted as in FIG. 13C. Namely, the power ratio among the signal lights passing through the respective delay lines is symmetric with respect to a delay line having a middle path length. This indicates that the impulse response of this circuit becomes symmetric with respect to time as illustrated in FIG. 13D. Accordingly, the characteristic of zero group velocity dispersion can be obtained. In FIG. 13D, ki is the coupling ratio corresponding to ξi of each 2×2 coupler.

Figure 14B:
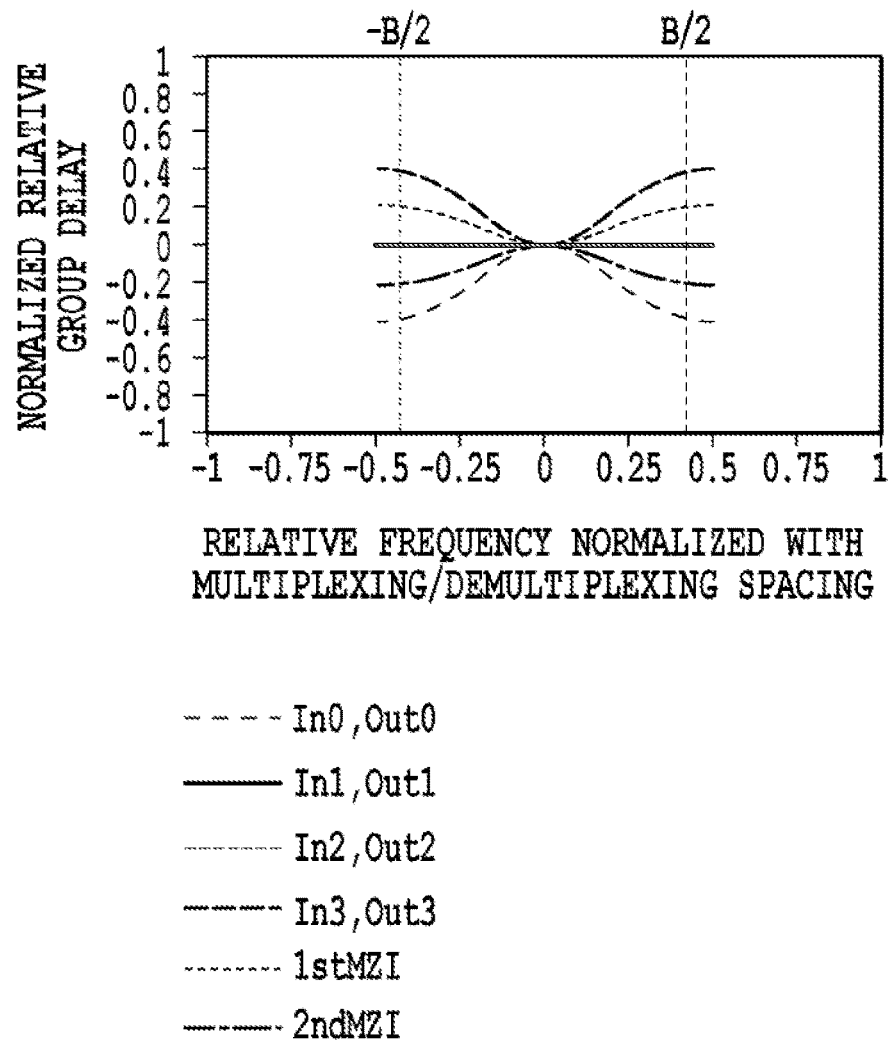
FIG. 14B illustrates the group delay characteristics of the TF of FIG. 9I.

In a TF 980 of FIG. 9I, the path length basically differs from each other by ΔLTF, but some of the paths have the same path length. Specifically, the second and third paths from the bottom have the same path length, and the both are designed to have a path length which is longer by ΔLTF than the path length of the bottom path. The coupling phase angle (coupling ratio) of 2×2 optical couplers 981 and 983 are set as ξ1=ξ2=0.0984π (9.3%). FIG. 14A illustrates the power transmittance characteristics of the TF 980, while FIG. 14B illustrates the group delay characteristics of the TF 980. The TF 980 also has the power transmittance characteristics of the degree of approximation of correction nearly equal to the above-described two-tap TF. Although the group delay characteristic differs depending on a set of input/output ports, it is flat and does not have any ripple for p=1 and P=2 are established. The TF 980 can be equivalently converted to the TF 990 of the two-stage connection configuration illustrated in FIG. 9J for the same reason as the equivalent conversion to the above-described multi-stage configuration. The TF 990 of a two-stage connection configuration illustrated in FIG. 9J has a configuration in which two-tap TFs as a two-beam interferometer (MZI) having path lengths different from each other by ΔLTF are connected in cascade. Here, an input port 1 (lower side port) of a 1×2 coupler 993 and an output port 1 (lower side port) of a 2×1 coupler 994 are used in an MZI 991 of the first stage, and an input port 0 (upper port) of a 1×2 coupler 995 and an output port 0 (upper port) of a 2×1 coupler 996 are used in an MZI 992 of the second stage. Since the coupling phase of the 2×2 coupler of each of the MZI 991 and MZI 992 is the same, i.e., ξ1=ξ2, the group delay characteristic becomes reversed upside down between the MZI 991 of the first stage and the MZI 992 of the second stage as described above. Therefore, as a total, the group delay ripple is cancelled out each other between the MZI 991 of the first stage and the MZI 992 of the second stage, and has a characteristic of being flat and not having any ripple. For reference, the power transmittance characteristic and group delay characteristic of a single MZI of each stage in the two-stage connection configuration are also illustrated in FIG. 14A and FIG. 14B. Note that, also when the coupling phase angles (coupling ratios) of the TF 980 illustrated in FIG. 9I are set as ξ1=0.0984π (9.3%); ξ2=π/2−ξ1 (90.7%), a set of input/output ports without a group delay ripple are simply switched between P=0 and p=3 and there is no difference in the other characteristics, and the characteristic without a group delay ripple can be similarly obtained.

Also in the TF 900 to TF 990 of any of these configurations of the above FIG. 9A to FIG. 9J, the light that causes a loss as a dip is output to unused ports and is discarded. Alternatively, when a Y-branch coupler is used for the optical coupler, the above light is discarded as a radiation mode. For example, when the input port 1 and output port 1 are used in the two-tap TF 910 of FIG. 9B, the light that causes a loss as a dip is output to the output port 0 that is an unused port. Therefore, even if the TF 900 to TF 990 are incorporated into the multi-stage interferometer circuit of the present invention to thereby impart a dip characteristic, the light that causes a loss as a dip is not output to the port of another channel of the multi-stage interferometer circuit. Accordingly, a dip-shaped characteristic which corrects the Sinc spectrum shape can be imparted purely to the passband transmission characteristic of the multi-stage interferometer circuit without causing excessive crosstalk, and the original signal can be shaped into a highly rectangular spectrum which is the characteristic of the Nyquist signal and can be output.

Note that this dip characteristic is basically required only in the multiplexer 513 of the transmitter 510 of FIG. 5. When signal light transmitted from the transmitter 510 is a multicarrier signal (super channel) obtained by multiplexing a subcarrier signal of a highly rectangular spectrum, the demultiplexer 521 of the receiver 520 may demultiplex the signal light while only keeping high rectangularity of each subcarrier signal, and thus the characteristic in the passband is required to be only a low loss, flat, and rectangular transmission characteristic. Accordingly, a multi-stage interferometer circuit without a TF can be used for the demultiplexer 521 used in the receiver 520, basically with no problem. However, when the frequency characteristic of the optical detector and/or ADC of the coherent demodulators 523-1 to 523-4 of the receiver 520 is not sufficiently flat in a necessary bandwidth, and for example, when the gain in a higher band is low due to a limitation of bandwidth, a dip-shaped characteristic is imparted to the characteristic in the passband, as with the multiplexer 513 of the transmitter 510, and the high-frequency component of a reception signal is relatively increased, and thereby the usage of compensating a limitation of bandwidth of these devices may not naturally cause no problem. Other than this, when the gain in a mid-band is low, the characteristic shape of a passband may be formed to have a compensation characteristic adapted to the frequency characteristic of a device to be compensated for so as to relatively increase the mid-band component of a reception signal. In either case, the light in a frequency region to be attenuated by the compensation characteristic is discarded by a TF and thus is not output to any port of another channel. Therefore, the signal characteristic in a passband can be corrected without causing excessive crosstalk.

Note that, in the TF 900 to TF 990 illustrated in FIG. 9A to FIG. 9J, the branching ratio of the 1×S coupler (branching coupler) and merging ratio of the S×1 coupler (merging coupler) with respect to each delay path of the S-array delay circuit are set the same. This is because matching of these ratios allows a theoretical excess loss to be suppressed to be low. When an excess loss is allowed to be caused, the ratios may not necessarily be the same. For example, for S=2, a TF, in which both the branching ratio and merging ratio with respect to each delay path are set to x:y, and a TF, in which the branching ratio of a branching coupler with respect to each delay path is set to 1:1 and the merging ratio of a merging coupler with respect to each delay path is set to x2:y2, have the same electric field amplitude ratio of the light through each delay path, and thus the shape of the frequency characteristic of the transmission characteristic is the same. However, the transmittance of the latter is (x+y)/√(2(x2+y2)) times the former, and an excess loss is caused for x≠y.

Incorporation of TF into Multi-Stage Interferometer Circuit

There are several methods of incorporating a TF into a multi-stage interferometer circuit. A first method is of incorporating a TF into the multiplexing ports 101 and/or 102 in the configuration of the multi-stage interferometer circuit 100 illustrated in FIG. 1, namely, into the position (TF0) of the TF 104 and/or TF 105 of FIG. 1. Transmission signal light is affected by the characteristic of a TF in addition to the multiplexing/demultiplexing characteristics illustrated in FIG. 4A to FIG. 4C. Note that signal light is often input by the use of only one of two ports when the multi-stage interferometer circuit 100 is used as a demultiplexer, and thus a TF may be incorporated only into one of the multiplexing ports 101 and 102, the one that inputs signal light. Furthermore, signal light is often output from only either one of two ports even when the multi-stage interferometer circuit 100 is used as a multiplexer, a TF may be incorporated only into any one of the multiplexing ports 101 and 102, the one that outputs signal light. For this incorporating method, since a TF is outside the multi-stage interferometer circuit, there is an advantage that the circuit design and/or circuit adjustment can be easily made, and additionally when a TF is incorporated only into one of the multiplexing ports 101 and 102, there is an advantage that the required number of TFs to be incorporated is only one.

As will be described in detail in the following specific embodiment, a second method is a method of incorporating a TF into the interferometer circuits 110-1 to 110-N in the configuration illustrated in FIG. 1, namely, into the positions of the TFs 114-1 to 114-N, 115-1 to 115-N (TF1 to TFN) of FIG. 1. Although at which stage of the interferometer a TF is to be incorporated is arbitrary, a TF is incorporated into all the optical paths at the arbitrary stage the TF is incorporated. For example, when a TF is incorporated into the interferometer 110-1 of the first stage, the TF (TF 114-1, 115-1) of the same transmission characteristic is incorporated into the longer arm waveguide (the upper-side path in the view) of the interferometer 110-1 and the shorter arm waveguide (the lower side path in the view), respectively. In this way, a TF is incorporated into both the paths of the interferometer, and thus the light in all optical paths will be affected by the same transmission characteristic of the TF, with the result that this configuration can be regarded as the one equivalent to the configuration in which a TF is taken out of the multi-stage interferometer circuit, and the same characteristic as in the first method of incorporating a TF into the multiplexing port can be obtained. The same also applies to the cases where a TF is incorporated into the interferometer 110-2 of the second stage to the interferometer 110-N-1 of the (N-1)th stage.

Furthermore, as a modification of the second method, a TF may be incorporated into a delay circuit of a multi-stage interferometer circuit to thereby form a delay circuit section having a delay length of the delay circuit of the multi-stage interferometer incorporated into a delay circuit of the TF. The modification of the second method has, from the viewpoint of the number of stages of delay circuits, an advantage that the number of stages does not increase even when a TF is incorporated into the interferometer. Accordingly, an increase in the waveguide length of the actual circuit can be suppressed, and thus an increase in circuit size can be avoided and an increase of the loss can be suppressed. This second method will be specifically described in the following embodiment.

Note that, as to the interferometer of the Nth stage, a TF of the same characteristic may be inserted between the first output of the 2×2 coupler 111-N-1 of the interferometer of the (N-1)th stage and the input of the 1×(M/2) coupler 116-N and between the second output of the 2×2 coupler 111-N-1 of the interferometer of the (N-1)th stage and the input of the 1×(M/2) coupler 117-N (at the positions of 114-N and 115-N (TFN) of FIG. 1). When a TF is inserted in each arm waveguide of the M-array delay circuit 112-N, the number of TFs becomes M, the space of the M-array delay circuit 112-N increases, and the circuit scale of the multi-stage interferometer circuit 100 increases. This case is disadvantageous in terms of a reduction in the size of a device into which the multi-stage interferometer circuit 100 is incorporated.

A third method is of incorporating a TF into the positions of the multiplexing ports 132-1 to 132-M in the configuration illustrated in FIG. 1, namely, into the positions of the TF 131-1 to TF 131-M (TF$_{N+1}$) of FIG. 1. As with the first method, transmission signal light is affected by the characteristic of a TF incorporated into each demultiplexing port, in addition to the multiplexing/demultiplexing characteristics illustrated in FIG. 4A to FIG. 4C. If light is not output from some of the multiplexing ports when the multi-stage interferometer circuit 100 is used as a demultiplexer, a TF may be incorporated only into a demultiplexing port, from which light is output, among the demultiplexing ports 131-1 to 131-M. Furthermore, if some of demultiplexing ports do not input light when the multi-stage interferometer circuit 100 is used as a multiplexer, a TF may be incorporated only into a demultiplexing port, to which light is input, among the demultiplexing ports 131-1 to 131-M. For this third incorporating method, since a TF is individually present in each demultiplexing port, $\Delta L_{TF}$ is not necessarily required to satisfy the relationship of Formula 7 even when a large number of subcarriers are multiplexed/demultiplexed, and there is an advantage that the design freedom for the correction characteristic increases. Furthermore, there is also an advantage that the design parameter can be changed for each demultiplexing port.

When a TF is arranged by the use of at least one method of the above-described first to third methods, the light guided between the demultiplexing ports 101, 102 and the multiplexing ports 132-1 to 132-M can pass therethrough the TF at least once and the output light from the demultiplexing port 101 or 102 or the output light from the multiplexing ports 132-1 to 132-M passes through the TF, and thus the waveform of the output light can be shaped. Note that, when the number of subcarriers to be multiplexed/demultiplexed in the first and second methods is two or more, each subcarrier signal to be multiplexed/demultiplexed is collectively corrected with the incorporated TF, and thus $\Delta L_{TF}$ of the TF is required to satisfy the relationship of Formula 7. Furthermore, there may be plural types of TFs to be incorporated, and a TF of a type A may be incorporated in the first stage and a TF of a type B may be incorporated in the second stage, for example.

First Embodiment

Figure 15:
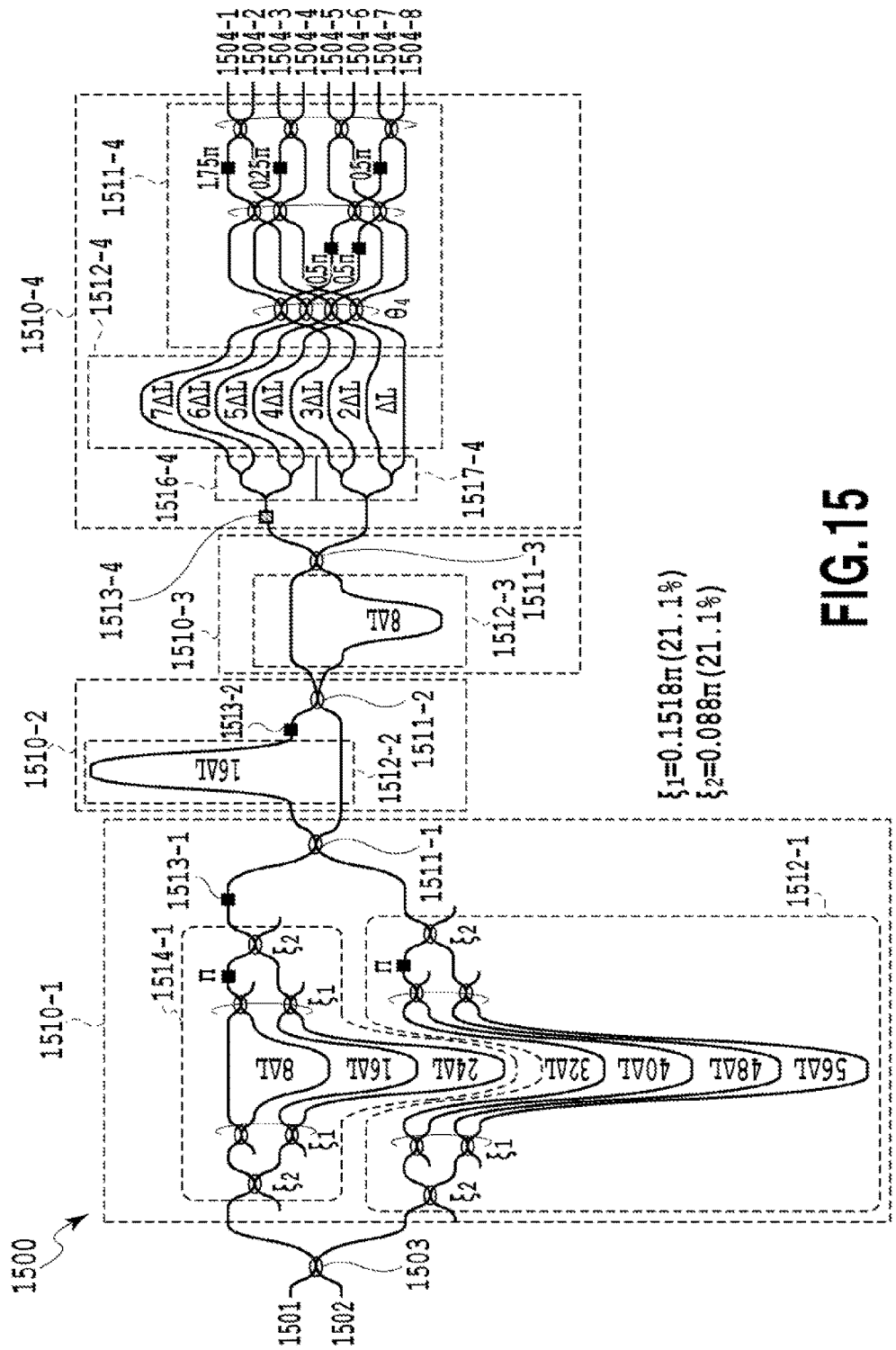
FIG. 15 is a configuration diagram illustrating a multi-stage interferometer circuit according to a first embodiment of the present invention.

FIG. 15 is a configuration diagram illustrating a multi-stage interferometer circuit 1500 according to a first embodiment of the present invention. The multi-stage interferometer circuit 1500 of FIG. 15 is an example when the number of the wavelength-multiplexed/demultiplexed channel, namely, the number of demultiplexing ports, is eight (M=8). The number of stages of interferometers is set to four (N=4), and the design parameters other than the TF are the same as the parameters given in FIG. 3.

In the multi-stage interferometer circuit 1500, interferometers 1510-1 to 1510-4 are arranged in series between a 2×2 coupler 1503 that couples the input light coming from input ports 1501 (corresponding to the multiplexing port 101 of FIG. 1), 1502 (corresponding to the multiplexing port 102 of FIG. 1) and output ports 1504-1 to 1504-8 (corresponding to the demultiplexing ports 132-1 to 132-M of FIG. 1). Here, the interferometer 1510-1 of the first stage has a configuration (1512-1, 1514-1) in which the four-tap TF 950 illustrated in FIG. 9F is incorporated, as a TF1 (TF 114-1, TF 115-1), into the interferometer 110-1 of the first stage of the multi-stage interferometer circuit 100 illustrated in FIG. 1. Specifically, the four-tap TF 950 is incorporated into the shorter arm waveguide (1514-1) of the delay circuit of the interferometer 1510-1 of the present embodiment. On the other hand, the four-tap TF 950 is also incorporated into the longer arm waveguide (1512-1) of the delay circuit of the interferometer 1510-1 to impart a delay difference of the interferometer 1510-1 to these two TFs. Namely, the delay length of the longer arm waveguide of the delay circuit 112-1 of the interferometer 110-1 of the first stage of FIG. 1 is incorporated, as a basic delay length, into each arm waveguide of the TF 114-1 (TF1) and thus the longer arm waveguide of the interferometer 1510-1 of the first stage is set to the four-tap TF 1512-1 with a basic delay. Therefore, the delay length of each path of the four-tap TF 1512-1 with a basic delay is 32ΔL, 40ΔL, 48ΔL, and 56ΔL, respectively, with reference to the path length of the shortest path of the four-tap TF 1514-1 arranged on the shorter length arm path side of the interferometer 1510-1. As described above, by combination of the delay circuit and TF, an increase in a total number of stages of the interferometers can be avoided and an increase in circuit size can be suppressed. ΔLTF of each of the four-tap TF 1514-1 and the four-tap TF 1512-1 with a basic delay is 8ΔL, and satisfies the relationship (ΔLTF=M·ΔL) of Formula 7. Furthermore, $\xi1=0.1518\pi$ (21.1%) and $\xi2=0.0088\pi$ (7.5%) described above are used for the coupling phase angle (coupling ratio) of each 2×2 coupler of the four-tap TF 1514-1 and the four-tap IF 1512-1 with a basic delay.

Note that the light from the four-tap TF 1514-1 and the light from the four-tap TF 1512-1 with a basic delay are coupled with each other by a 2×2 coupler 1511-1, and a phase shifter 1513-1 of a phase shift amount π is inserted between the four-tap TF 1514-1 and the 2×2 coupler 1511-1.

An interferometer 1510-2 of the second stage includes a delay circuit 1512-2 and a 2×2 coupler 1511-2 that couples the light from the delay circuit 1512-2, and a phase shifter 1513-2 of a phase shift amount π is inserted into the longer arm waveguide of the interferometer 1520-2. An interferometer 1510-3 of the third stage includes a delay circuit 1512-3 and a 2×2 coupler 1511-3 that couples the light from the delay circuit 1512-3. An interferometer 1510-4 of the fourth stage includes: 1×4 couplers 1516-4 and 1517-4 which further branch the light from the 2×2 coupler 1511-3 into eight outputs; an eight-array delay circuit 1512-4 that inputs the light from the 1×4 couplers 1516-4 and 1517-4; and an 8×8 coupler 1511-4 that inputs the light from the eight array delay circuit 1512-4. Each of the output ports 1504-1 to 1504-8 are connected to each output of the 8×8 coupler 1511-4. A phase shifter 1513-4 is inserted between the 2×2 coupler 1511-3 and the 1×4 coupler 1516-4. For the normal GDR design, the phase shift amount of the phase shifter 1513-4 is set to zero and the input port 1501 is used. For the reverse GDR design, the phase shift amount of the phase shifter 1513-4 is set to π and the input port 1502 is used.

Note that, the multi-stage interferometer circuit 1500 of FIG. 15 illustrates an example of the demultiplexer in which the input port 1501 or 1502 inputs light and the output ports 1504-1 to 1504-8 output demultiplexed light. However, the multi-stage interferometer circuit 1500 of FIG. 15 may serve as a multiplexer in which the output ports 1504-1 to 1504-8 receive light and the input port 1501 or 1502 outputs multiplexed light. Furthermore, the multi-stage interferometer circuit 1500 also has the function as an optical filter.

Furthermore, although in the present embodiment a four-tap TF is arranged at the first stage (1510-1) of the multi-stage interferometer, it may be arranged at another stage, for example, the second stage (1510-2) or the like of the multi-stage interferometer. However, in the arrangement at the second stage (1510-2) or the third stage (1510-3) of the multi-stage interferometer, the layout of the delay path is slightly difficult to be performed. This is because it is difficult to combine the delay circuit of the four-tap TF and the delay circuit of the multi-stage interferometer since the delay length of the delay circuit 1512-2 of the second stage being 16ΔL and the delay length of the delay circuit 1512-3 of the third stage being 8ΔL, whereas the maximum delay length of the delay circuit of the four-tap TF is 24ΔL. Moreover, arrangement at the fourth stage (1510-4) of the multi-stage interferometer has a layout problem as with arrangement at the second stage or third stage. In addition, since a four-tap TF is required to be incorporated into every delay path of the M-array delay circuit 1512-4 when a four-tap TF is combined with the M-array delay circuit 1512-4, there is a problem that the total number of delay paths of the fourth stage becomes considerably large. At which stage of the multi-stage interferometer a TF is to be arranged may be determined in consideration of easiness and the like of layout of such a delay path. The same also applies to the other embodiments.

Figure 16A:
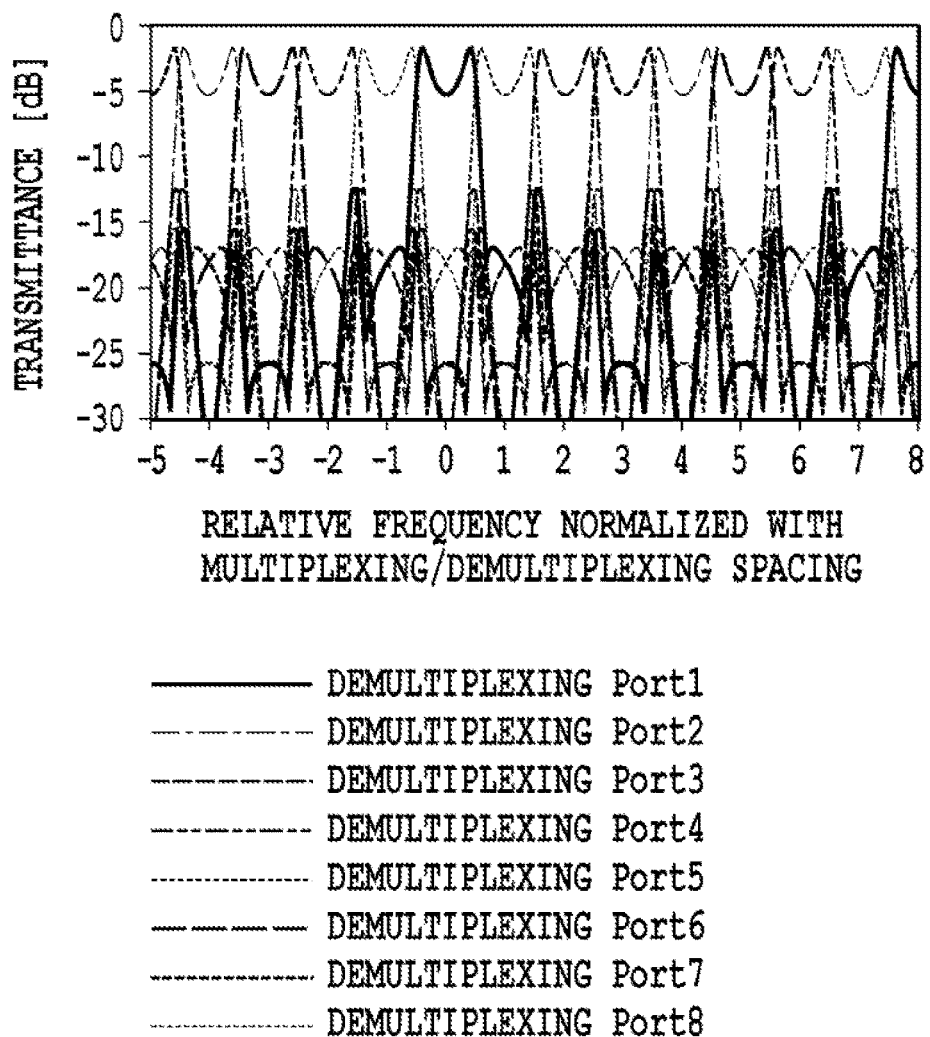
FIG. 16A is a diagram illustrating the power transmittance characteristics of the multi-stage interferometer circuit of the first embodiment or second embodiment.
Figure 16B:
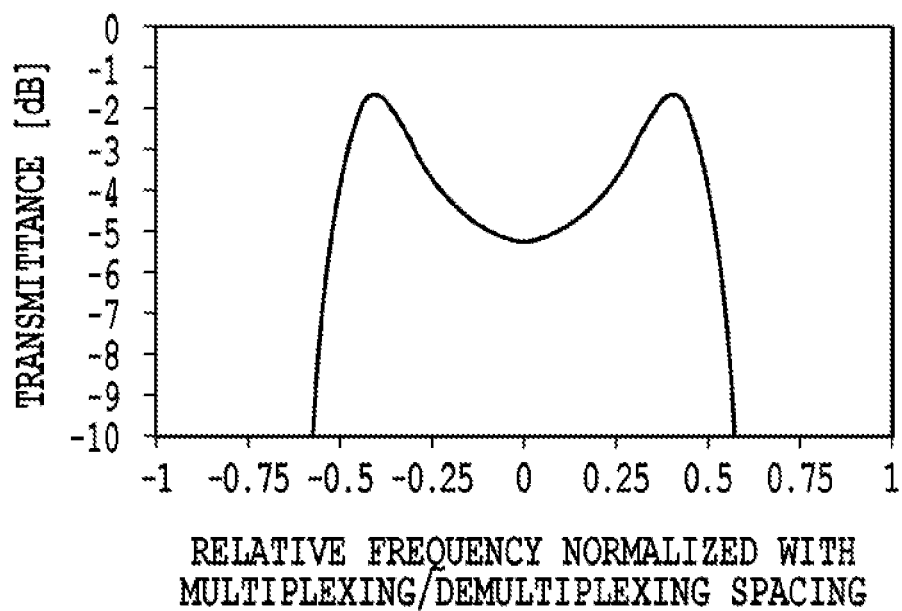
FIG. 16B is a diagram illustrating the power transmittance characteristic in the passband of the multi-stage interferometer circuit of the first embodiment or second embodiment.
Figure 16C:
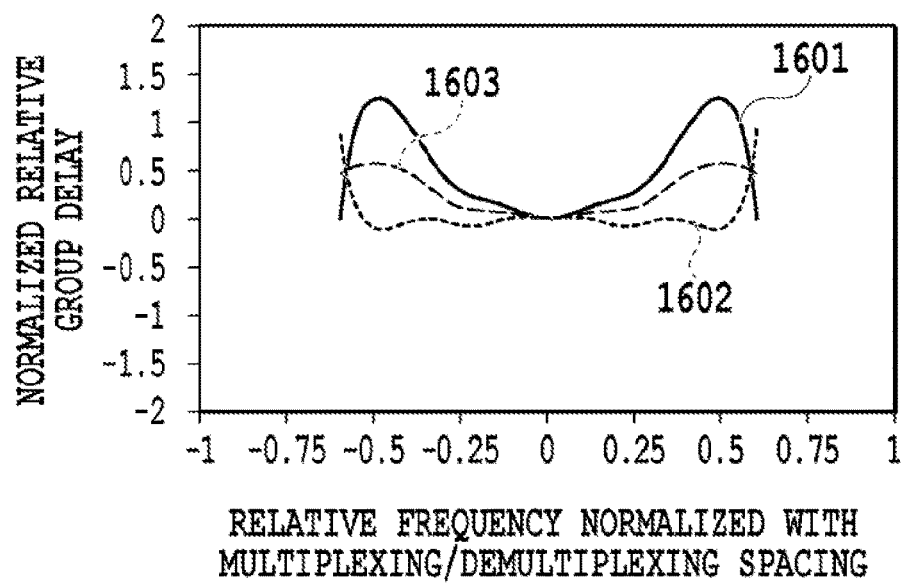
FIG. 16C is a diagram illustrating the group delay characteristics in the passband of the multi-stage interferometer circuit of the first embodiment or second embodiment.

FIG. 16A illustrates the power transmittance characteristics of the multi-stage interferometer circuit 1500 of the first embodiment, FIG. 16B illustrates the power transmittance characteristic in the passband of the multi-stage interferometer circuit 1500, and FIG. 16C illustrates the group delay characteristics in the passband of the multi-stage interferometer circuit 1500. Note that the characteristics in the passband illustrated in FIG. 16B and FIG. 16A become the same in all the demultiplexing ports. The power transmittance characteristics illustrated in FIG. 16A and FIG. 16B are completely the same between the normal GDR design and the reverse GDR design. As can be seen in FIG. 16A, the same dip characteristic can be imparted to the passband in all the ports. This is because, since ΔLTF of the four-tap TF 1514-1 and ΔLTF of the four-tap TF 1512-1 with a basic delay are 8ΔL, and satisfy the relationship of Formula 7, the characteristic repetition cycle of the four-tap TF 1514-1 and four-tap TF 1512-1 with a basic delay completely is the same as the multiplexing/demultiplexing spacing of the multi-stage interferometer circuit. Furthermore, as can be seen from comparison between the power transmittance characteristics illustrated in FIG. 16A and the power transmittance characteristics in the multi-stage interferometer circuit without a TF illustrated in FIG. 4A, the extinction ratio to both the adjacent ports is the same, i.e. approximately 13 dB, on the multiplexing/demultiplexing grid. As described above, with the configuration of providing a TF of the present invention, a dip-shaped characteristic can be imparted to the passband power transmission characteristic without causing excessive crosstalk.

FIG. 16C illustrates the group delay characteristics in a normal GDR design (1601), a reverse GDR design (1602), and a TF itself (1603). The group delay characteristic is vertically asymmetric between the normal GDR design (1601) and the reverse GDR design (1602). This is because the characteristic of the TF itself (1603) is added to the group delay characteristic of the normal GDR design (0401) or reverse GDR design (0402), in the multi-stage interferometer circuit without a TF illustrated in FIG. 4C. Here, as described above, there is assumed a case where a multiplexer with a TF is used in the transmitter for Sinc correction and a demultiplexer without a TF is used in the receiver, and there is considered what the residual group delay ripple as the whole transceiver system will be. When a multiplexer with a four-tap TF and of the normal GDR design of the present embodiment is used for the transmitter and a demultiplexer without a TF and of the reverse GDR design of the present embodiment is used for the receiver, the group delay ripple (0401) due to the multi-stage interferometer circuit configuration without a TF in the multiplexer is cancelled out by the group delay ripple (0402) of the multiplexer without a TF, and as a result, the group delay ripple (1603) in the TF itself in the multiplexer remains. When the multiplexing/demultiplexing spacing is 37.5 GHz, the group delay ripple amount of the TF itself in the present embodiment, namely, the residual group delay ripple amount as the whole transceiver system, become about 15 ps.

Figure 17A:
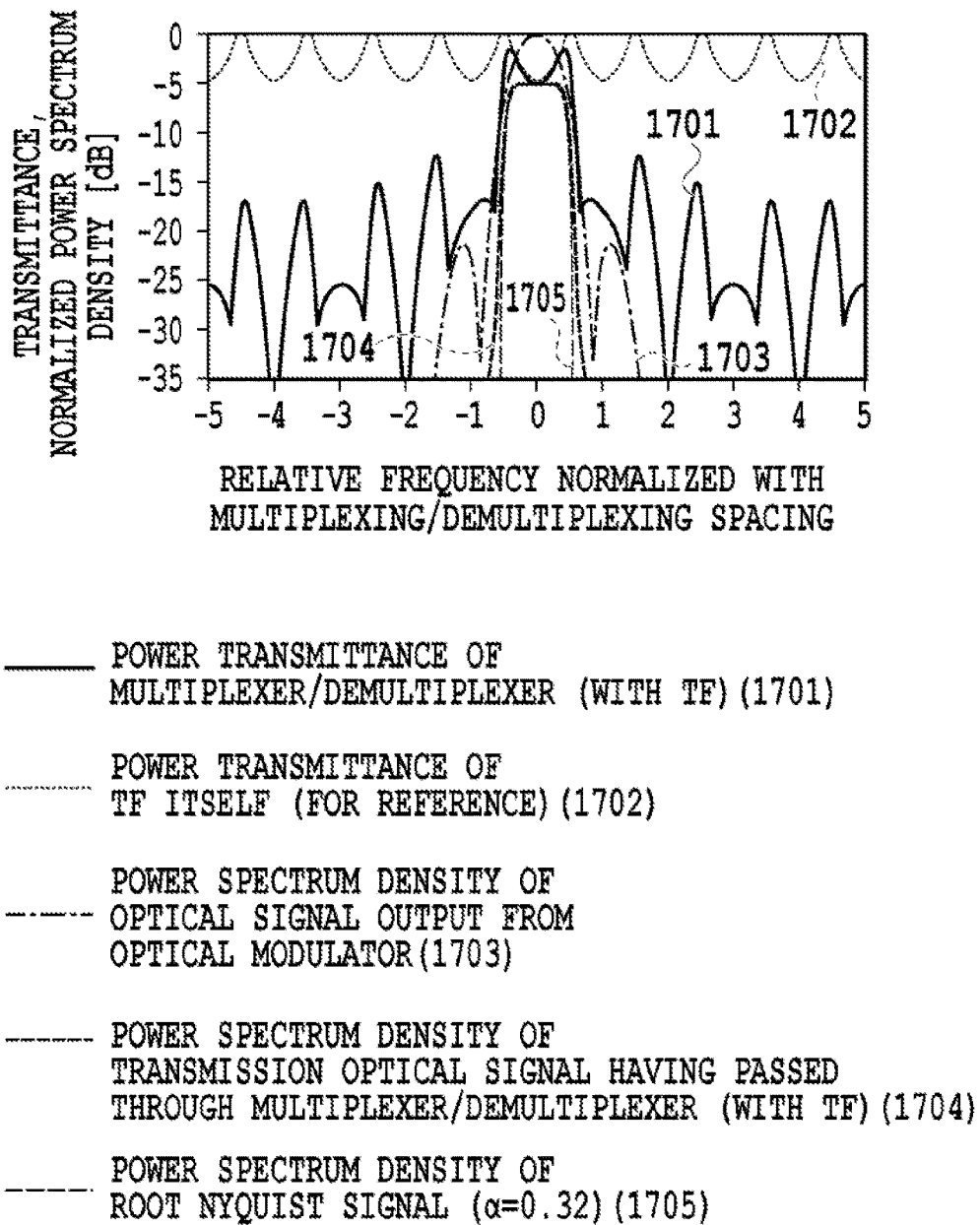
FIG. 17A is a diagram illustrating the characteristics in all regions of a transmission signal light spectrum or the like when the multi-stage interferometer circuit of the first embodiment or second embodiment is used for a multiplexer of a transmitter.
Figure 17B:
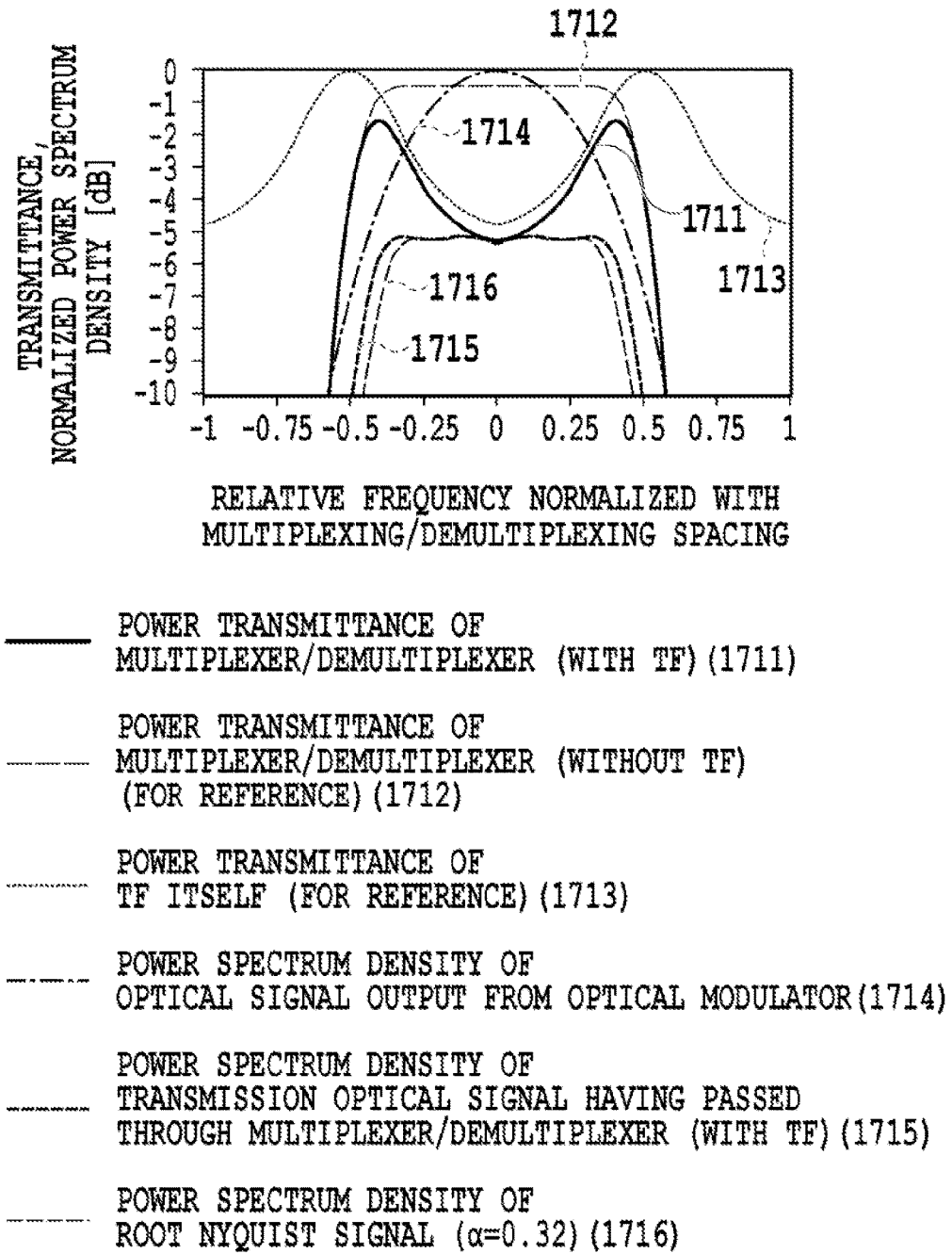
FIG. 17B is a diagram illustrating the characteristics in the vicinity of the main lobe/passband of a transmission signal light spectrum or the like when the multi-stage interferometer circuit of the first embodiment or second embodiment is used for the multiplexer of the transmitter.

FIG. 17A illustrates the characteristics in all regions of the transmission signal light spectrum and the like of a transmission signal light when the multi-stage interferometer circuit 1500 of the first embodiment is used for the multiplexer of the transmitter, and FIG. 17B illustrates the characteristics in the vicinity of the main lobe/passband of the transmission signal light spectrum and the like of the multi-stage interferometer circuit 1500. In calculating the spectrum, it is assumed that the ratio between the subcarrier spacing of the multi-stage interferometer circuit and the symbol rate of the subcarrier signal light is approximately 1.17 (corresponding to subcarrier spacing=37.5 GHz and symbol rate=32 G baud), the modulation format of the subcarrier signal is polarization-multiplex QPSK modulation, the driving condition of the modulator is driving with an amplitude of $2V\pi$ by a raised-cosine wave electric signal, and the bandwidth of the modulator is unlimited.

FIG. 17A illustrates the power transmittance (1701) of the multi-stage interferometer circuit 1500, the power transmittance (1702: reference) of the TF itself, the power spectral density (1703) of signal light output from the optical modulator used in the transmitter, namely, the signal light input to the multi-stage interferometer circuit 1500, the power spectral density (1704) of the transmission signal light having passed through the multi-stage interferometer circuit 1500, namely, the transmission signal light as the transmitter, and the power spectral density (1705) of a root Nyquist signal ($\alpha$=0.32). Furthermore, FIG. 17B illustrates the power transmittance (1711) of the multi-stage interferometer circuit 1500, the power transmittance (1712: reference) of the multi-stage interferometer circuit without a TF, the transmittance (1713: reference) of the TF itself, the power spectral density (1714) of signal light output from an optical modulator used in the transmitter, the power spectral density (1715) of a transmission signal light having passed through the multi-stage interferometer circuit 1500 (with a TF), and the power spectral density (1716) of the root Nyquist signal ($\alpha$=0.32). As illustrated in FIG. 17A and FIG. 17B, the power transmittance characteristic (1701, 1711) of the multi-stage interferometer 1500 of the present embodiment is a flat power transmittance characteristic (1712) in the passband of the multi-stage interferometer circuit without a TF multiplied by the power transmittance characteristic (1702, 1713) of the TF itself. The power transmittance characteristic (1711) in the passband is a dip-shaped characteristic for correcting the Sinc spectrum. As previously described, the power spectral density (1703, 1714) of the signal light from the modulator has a Sinc and lobbed-shaped spectrum. Accordingly, once the signal light from the modulator is caused to pass through the multi-stage interferometer circuit 1500, the power spectral density (1703, 1714) of the signal light is shaped due to the power transmittance characteristic (1701, 1711) of the multi-stage interferometer 1500, and the power spectral density (1704, 1715) of the transmission signal light having passed through the multi-stage interferometer circuit 1500 results in a highly rectangular spectrum extremely close to the power spectral density (1705, 1716) of the root Nyquist signal. As described above, the passband transmission characteristic (1701, 1711) of the multi-stage interferometer circuit 1500 allows the Sinc shape of the power spectral density (1703, 1714) of the signal light output from the modulator to be corrected into a highly rectangular spectrum (1704, 1715) extremely close to the power spectral density (1705, 1716) of the root Nyquist signal.

For the present embodiment, the flatness of the top of the spectrum of the transmission signal light becomes equal to or less than 0.2 dB in terms of ripple, and the steepness of the spectrum of the transmission signal light becomes approximately 0.32 in terms of the roll-off rate $\alpha$ when the steepness is roughly quantified from the viewpoint of rolling off of the spectrum, although the bandwidth thereof slightly shifts.

Second Embodiment

Figure 18:
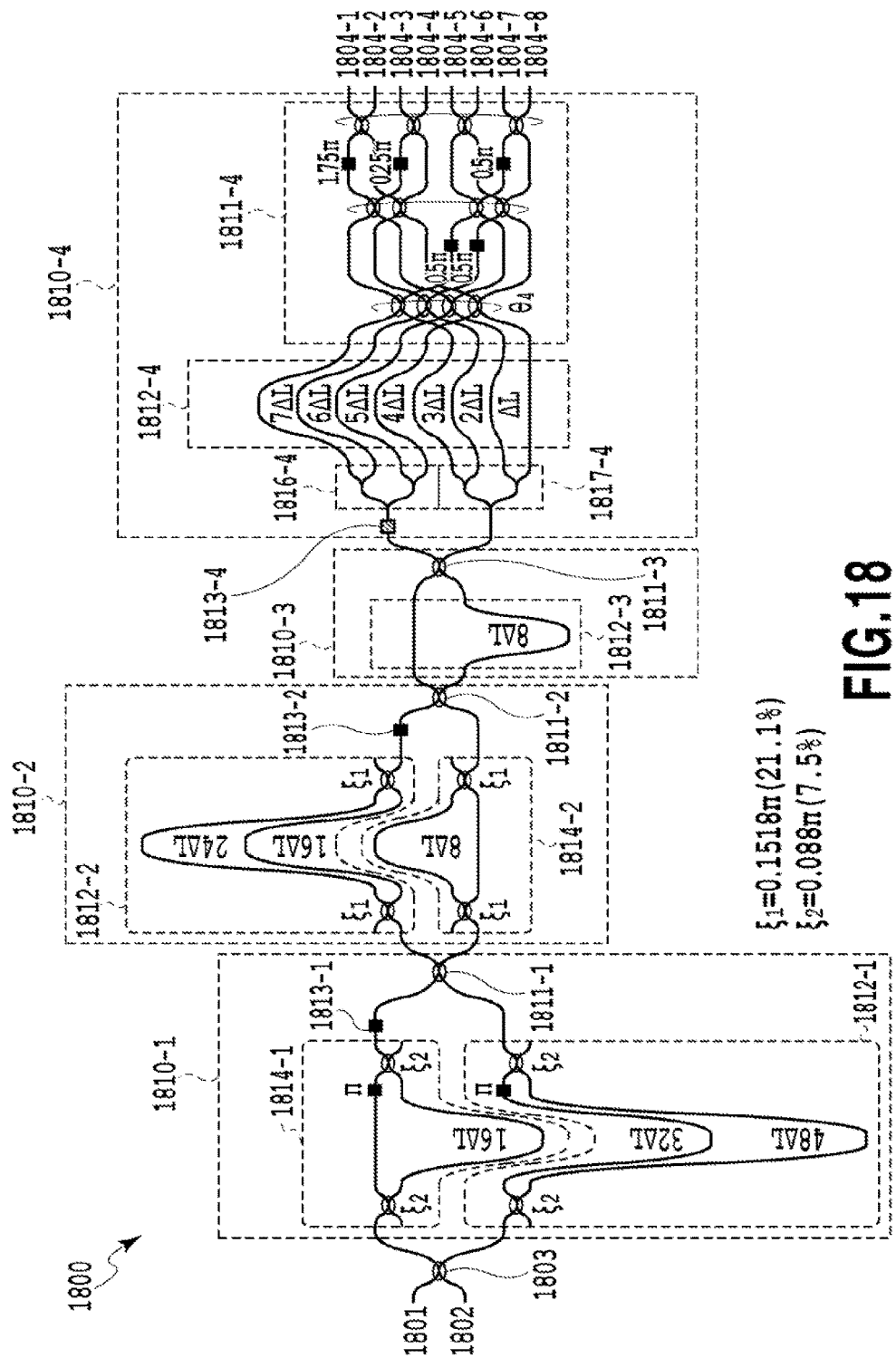
FIG. 18 is a configuration diagram illustrating a multi-stage interferometer circuit according to a second embodiment of the present invention.

FIG. 18 is a configuration diagram illustrating a multi-stage interferometer circuit 1800 according to a second embodiment of the present invention. The multi-stage interferometer circuit 1800 of FIG. 18 is also an example when the number of the wavelength-multiplexed/demultiplexed channel, namely, the number of demultiplexing ports is eight (M=8). The number of stages of interferometers is also set to four (N=4), and the design parameters other than the TF are the same as the parameters given in FIG. 3, as in the first embodiment.

In the multi-stage interferometer circuit 1800, interferometers 1810-1 to 1810-4 are arranged in series between a 2×2 coupler 1803 that couples the input light coming from input ports 1801 (corresponding to the multiplexing port 101 of FIGS. 1) and 1802 (corresponding to the multiplexing port 102 of FIG. 1) and output ports 1804-1 to 1804-8 (corresponding to the demultiplexing ports 132-1 to 132-M of FIG. 1). Here, the interferometer 1810-1 of the first stage has a configuration (1812-1 and 1814-1) in which an MZI 962 of the second stage of the TF 960 having a two-stage connection configuration illustrated in FIG. 9G is incorporated, as a TF1 (TF 114-1, TF 115-1), into the interferometer 110-1 of the first stage of the multi-stage interferometer circuit 100 illustrated in FIG. 1. Furthermore, an interferometer 1810-2 of the second stage has a configuration (1812-2 and 1814-2) in which the MZI 961 of the first stage of the TF 960 having a two-stage connection configuration illustrated in FIG. 9G is incorporated, as a TF2 (TF 114-2, TF 115-2), into the interferometer 110-2 of the second stage of the multi-stage interferometer circuit 100 illustrated in FIG. 1. Specifically, the MZI 962 of the second stage of the TF 960 having a two-stage connection configuration is incorporated into the shorter arm waveguide (1814-1) of the delay circuit of the interferometer 1810-1 of the present embodiment. On the other hand, the MZI 962 of the second stage of the TF 960 having a two-stage connection configuration is also incorporated into the longer arm waveguide (1812-1) of the delay circuit of the interferometer 1810-1 to impart the delay difference of the interferometer 1810-1 to these two TFs. Namely, the delay length of the longer arm waveguide of the delay circuit 112-1 of the interferometer 110-1 of the first stage of FIG. 1 is incorporated, as a basic delay length, into each arm waveguide of the TF 114-1 (TF 1) and thus the longer arm waveguide of the interferometer 1810-1 of the first stage is set to the two-tap TF 1812-1 with a basic delay. Therefore, the delay length of each path of the two-tap TF 1812-1 with a basic delay is 32$\Delta$L, and 48$\Delta$L, respectively, with reference to the path length of the shortest path of the two-tap TF 1814-1 arranged on the shorter length arm path side of the interferometer 1810-1. Moreover, the MZI 961 of the first stage of the TF 960 having a two-stage connection configuration is incorporated into the shorter arm waveguide (1814-2) of the delay circuit of the interferometer 1810-2. On the other hand, the MZI 961 of the first stage of the TF 960 having a two-stage connection configuration is also incorporated into the longer arm waveguide (1812-2) of the delay circuit of the interferometer 1810-1 to thereby impart the delay difference of the interferometer 1810-2 to these two TFs. Namely, the delay length of the longer arm waveguide of the delay circuits 112-2 of the interferometer 110-2 of the second stage of FIG. 1 is incorporated, as a basic delay length, into each arm waveguide of the TF 114-2 (TF2) and thus the longer arm waveguide of the interferometer 1810-2 of the second stage is set to the two-tap TF 1812-2 with a basic delay. Therefore, the delay length of each path of the two-tap TF 1812-2 with a basic delay is 16ΔL and 24ΔL, respectively, with reference to the path length of the shortest path of the two-tap TF 1814-2 arranged on the shorter length arm path side of the interferometer 1810-2. As described above, an unnecessary increase in the number of stages of interferometers as the whole multi-stage interferometer circuit can be avoided and the circuit size can be suppressed although the TF has a two-stage connection configuration, by separately arranging the MZI 961 of the first stage and the MZI 962 of the second stage of the TF 960 having a two-stage connection configuration into the separate stages inside the multi-stage interferometer. ΔLTF of the TF 960 connected in two stages is 8ΔL and satisfies the relationship (ΔLTF=M·ΔL) of Formula 7. Furthermore, the coupling phase angle (coupling ratio) of each of the 2×2 couplers 963 to 966 of the TF 960 having a two-stage connection configuration is the same as the first embodiment, i.e., ξ1=0.1518π (21.1%) and ξ2=0.0088π (7.50), respectively.

Note that the light from the two-tap TF 1814-1 and the light from the two-tap TF 1812-1 with a basic delay are coupled with each other by the 2×2 coupler 1811-1, and a phase shifter 1813-1 of a phase shift amount π is inserted between the two-tap TF 1814-1 and the 2×2 coupler 1811-1. The light from the two-tap TF 1814-2 and the light from the two-tap TF 1812-2 with a basic delay are coupled with each other by the 2×2 coupler 1811-2, and a phase shifter 1813-2 of a phase shift amount π is inserted between the two-tap TF 1812-2 with a basic delay and the 2×2 coupler 1811-2.

An interferometer 1810-3 of the third stage includes a delay circuit 1812-3 and a 2×2 coupler 1811-3 that couples the light from the delay circuit 1812-3. An interferometer 1810-4 of the fourth stage includes: 1×4 couplers 1816-4 and 1817-4 which further branch the light from the 2×2 coupler 1811-3 into eight outputs; an eight-array delay circuits 1812-4 that inputs the light from the 1×4 couplers 1816-4 and 1817-4; and an 8×8 coupler 1811-4 that inputs the light from the eight-array delay circuit 1812-4. Each of the output/multiplexing ports 1804-1 to 1804-8 is connected to each output of the 8×8 coupler 1811-4. A phase shifter 1813-4 is inserted between the 2×2 coupler 1811-3 and the 1×4 coupler 1816-4. For the normal GDR design, the phase shift amount of the phase shifter 1813-4 is set to zero and the input port 1501 is used. For the reverse GDR design, the phase shift amount of the phase shifter 1813-4 is set to π and the input port 1502 is used.

Note that the multi-stage interferometer circuit 1800 of FIG. 18 illustrates an example of the demultiplexer in which the input port 1801 or 1802 inputs light and the output ports 1804-1 to 1804-8 output demultiplexed light. However, the multi-stage interferometer circuit 1800 of FIG. 18 may serve as a multiplexer in which the output ports 1804-1 to 1804-8 receive light and the input port 1801 or 1802 outputs multiplexed light. Furthermore, the multi-stage interferometer circuit 1800 also has the function as an optical filter.

Note that, also in the present embodiment as in the first embodiment, each MZI of the TF having a two-stage connection configuration may be arranged at any stage (1810-1 to 1810-4) of the multi-stage interferometer.

The calculated transmission characteristics of the multi-stage interferometer circuit 1800 of the second embodiment become completely the same as the characteristics of the first embodiment, namely, the calculated transmission characteristics is the transmission characteristics illustrated in FIG. 16A to FIG. 16C. This is because as previously described, the four-tap TF illustrated in FIG. 9F applied in the first embodiment and the TF 960 having a two-stage connection configuration illustrated in FIG. 9G applied in the present embodiment have a basically equivalent circuit and has the same transmission characteristic.

The second embodiment can be said to be advantageous in that the layout design becomes easier, since the maximum delay length of the delay circuit becomes shorter and a total number of delay paths becomes smaller although the same transmission characteristic can be obtained, than the first embodiment.

As described in the second embodiment, when a multi-tap TF can be replaced with a multi-stage connection TF, a plurality of arrangement methods can be adopted with the same characteristic, such as a method of arranging the multi-tap TF at one of the stages of a multi-stage interferometer (the arrangement method described in the first embodiment) and a method of separately arranging the multi-stage connection TF at separate stages in the multi-stage interferometer (the arrangement method described in the second embodiment). For example, by the use of an idea similar to the one explained in the above-described configuration of TFs, an eight-tap TF as an eight-beam interferometer can obtain the same transmission characteristic even by a two-stage connection configuration of a four-tap TF and a two-tap TF, other than a three-stage connection configuration of two-tap TFs, and the same transmission characteristic can be obtained. Therefore, as described in the first embodiment, a method of separately arranging a four-tap TF and a two-tap TF at two separate stages in a multi-stage interferometer can be adopted in addition to the method of arranging an eight-tap TF at one of the stages of a multi-stage interferometer as described in the first embodiment and the method of separately arranging three stages of two-tap TFs at three separate stages in a multi-stage interferometer as described in the second embodiment. Note that, as described above, for using a multi-tap TF, there is a plurality of methods of realizing a multiplexing/demultiplexing circuit for obtaining the same transmission characteristic, i.e., a plurality of methods of arranging TFs.

Third Embodiment

Figure 19:
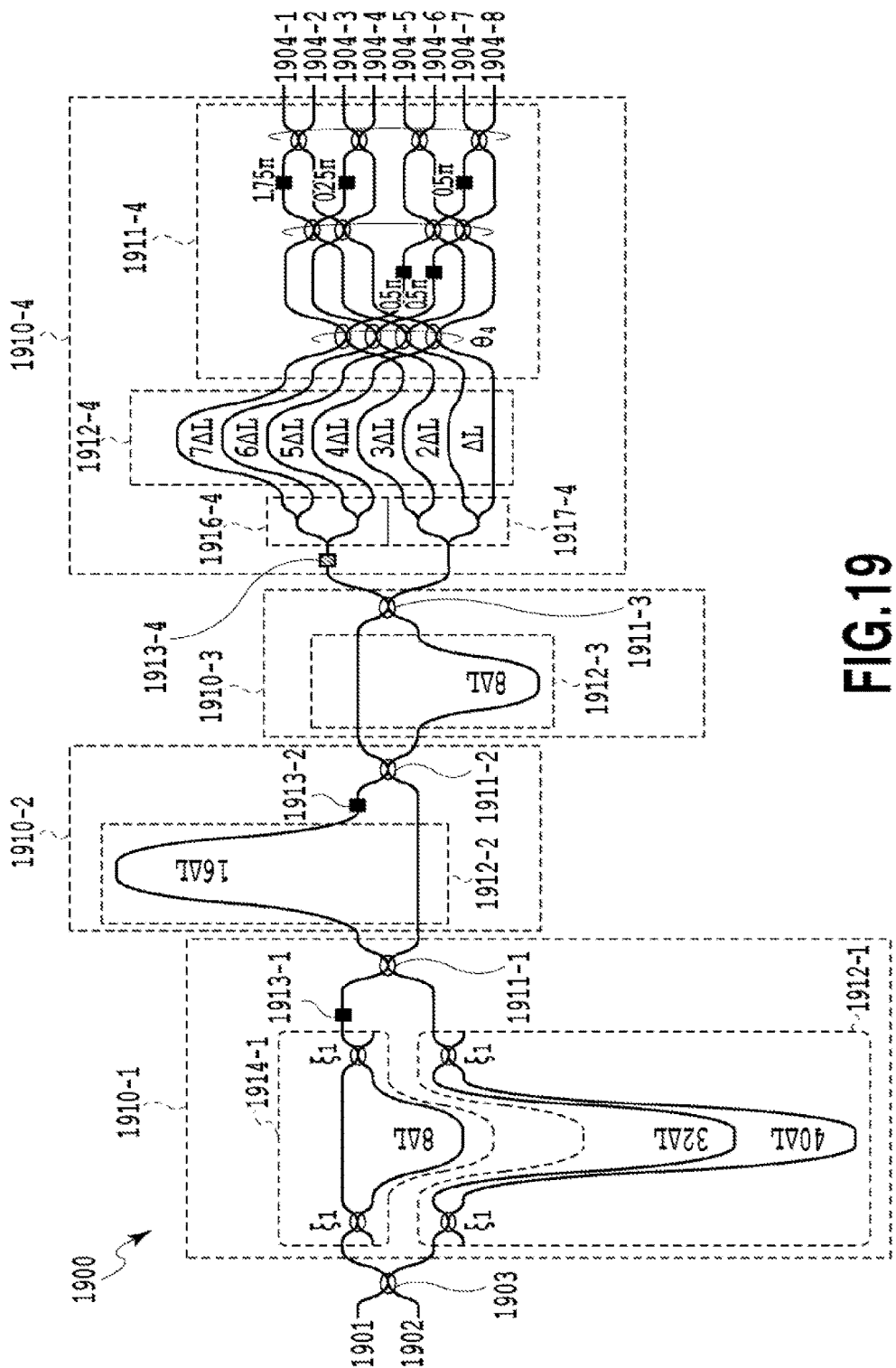
FIG. 19 is a configuration diagram illustrating a multi-stage interferometer circuit according to a third embodiment of the present invention.

FIG. 19 illustrates the configuration of a multi-stage interferometer circuit 1900 according to a third embodiment of the present invention. The multi-stage interferometer circuit 1900 of FIG. 19 is also an example when the number of the wavelength-multiplexed/demultiplexed channel, namely, the number of demultiplexing ports, is eight (M=8). The number of stages of interferometers is also set to four (N=4), and the design parameters other than the TF are the same as the parameters given in FIG. 3, as in the first embodiment.

In the multi-stage interferometer circuit 1900, interferometers 1910-1 to 1910-4 are arranged in series between a 2×2 coupler 1903 that couples the input light coming from input ports 1901 (corresponding to the multiplexing port 101 of FIG. 1), 1902 (corresponding to the multiplexing port 102 of FIG. 1) and output ports 1904-1 to 1904-8 (corresponding to the demultiplexing ports 132-1 to 132-M of FIG. 1). Here, the interferometer 1910-1 of the first stage has a configuration (1912-1 and 1914-1) in which the two-tap TF 910 illustrated in FIG. 9B is incorporated, as a TF1 (TF 114-1, TF 119-1), into the interferometer 110-1 of the first stage of the multi-stage interferometer circuit 100 illustrated in FIG. 1. Specifically, the two-tap TF 910 is incorporated into the shorter arm waveguide (1914-1) of the delay circuit of the interferometer 1910-1 of the present embodiment. On the other hand, the two-tap TF 910 is also incorporated into the longer arm waveguide (1912-1) of the interferometer 1910-1 so as to impart a delay difference of the interferometer 1910-1 to these two TFs. That is, the delay length of the longer arm waveguide of the delay circuit 112-1 of the interferometer 110-1 of the first stage of FIG. 1 is incorporated, as a basic delay length, into each arm waveguide of the TF 114-1 (TF1) and thus the longer arm waveguide of the interferometer 1910-1 of the first stage is set to the two-tap TF 1912-1 with a basic delay. Therefore, the delay length of each path of the two-tap TF 1912-1 with a basic delay is 32ΔL and 40ΔL, respectively, with reference to the path length of the shortest path of the two-tap TF 1914-1 arranged on the shorter length arm path side of the interferometer 1910-1. As described above, as in the first and second embodiments also in the third embodiment, by combination of the delay circuit and TF, an increase in a total number of stages of the interferometers can be avoided and an increase in circuit size can be suppressed. ΔLTF of the two-tap TF 1914-1 and four-tap TF 1912-1 with a basic delay is 8ΔL, and satisfies the relationship (ΔLTF=M·ΔL) of Formula 7. Furthermore, ξ1=0.1292π (15.6%) described above is used for the coupling phase angle (coupling ratio) of each of the 2×2 couplers 911 and 913 of the two-tap TF 910.

Note that the light from the two-tap TF 1914-1 and the light from the two-tap TF 1912-1 with a basic delay are coupled with each other by a 2×2 coupler 1911-1, and a phase shifter 1913-1 of a phase shift amount π is inserted between the two-tap TF 1914-1 and the 2×2 coupler 1911-1.

The interferometer 1910-2 of the second stage includes a delay circuit 1912-2 and a 2×2 coupler 1911-2 that couples the light from the delay circuit 1912-2, and a phase shifter 1913-2 is inserted into the longer arm of the interferometer 1910-2. The interferometer 1910-3 of the third stage includes a delay circuit 1912-3 and a 2×2 coupler 1911-3 that couples the light from the delay circuit 1912-3. The interferometer 1910-4 of the fourth stage includes: 1×4 couplers 1916-4 and 1917-4 which further branch the light from the 2×2 coupler 1911-3 into eight outputs; an eight-array delay circuit 1912-4 that inputs the light from the 1×4 couplers 1916-4, 1917-4; and an 8×8 coupler 1911-4 that inputs the light from the eight-array delay circuit 1912-4. Each of the output ports 1904-1 to 1904-8 is connected to each output of the 8×8 coupler 1911-4. A phase shifter 1913-4 is inserted between the 2×2 coupler 1911-3 and the 1×4 coupler 1916-4. For the normal GDR design, the phase shift amount of the phase shifter 1913-4 is set to zero and the input port 1501 is used. For the reverse GDR design, the phase shift amount of the phase shifter 1913-4 is set to π and the input port 1502 is used.

Note that the multi-stage interferometer circuit 1900 of FIG. 19 illustrates an example of the demultiplexer in which the input port 1901 or 1902 inputs light and the output ports 1904-1 to 1904-8 output demultiplexed light. However, the multi-stage interferometer circuit 1900 of FIG. 19 may serve as a multiplexer in which the output ports 1904-1 to 1904-8 receive light and the input port 1901 or 1902 outputs multiplexed light. Furthermore, the multi-stage interferometer circuit 1900 also has the function as an optical filter.

Note that, also in the present embodiment as in the first embodiment, the two-tap TF may be arranged at any stage (1910-1 to 1910-4) of the multi-stage interferometer.

Figure 20A:
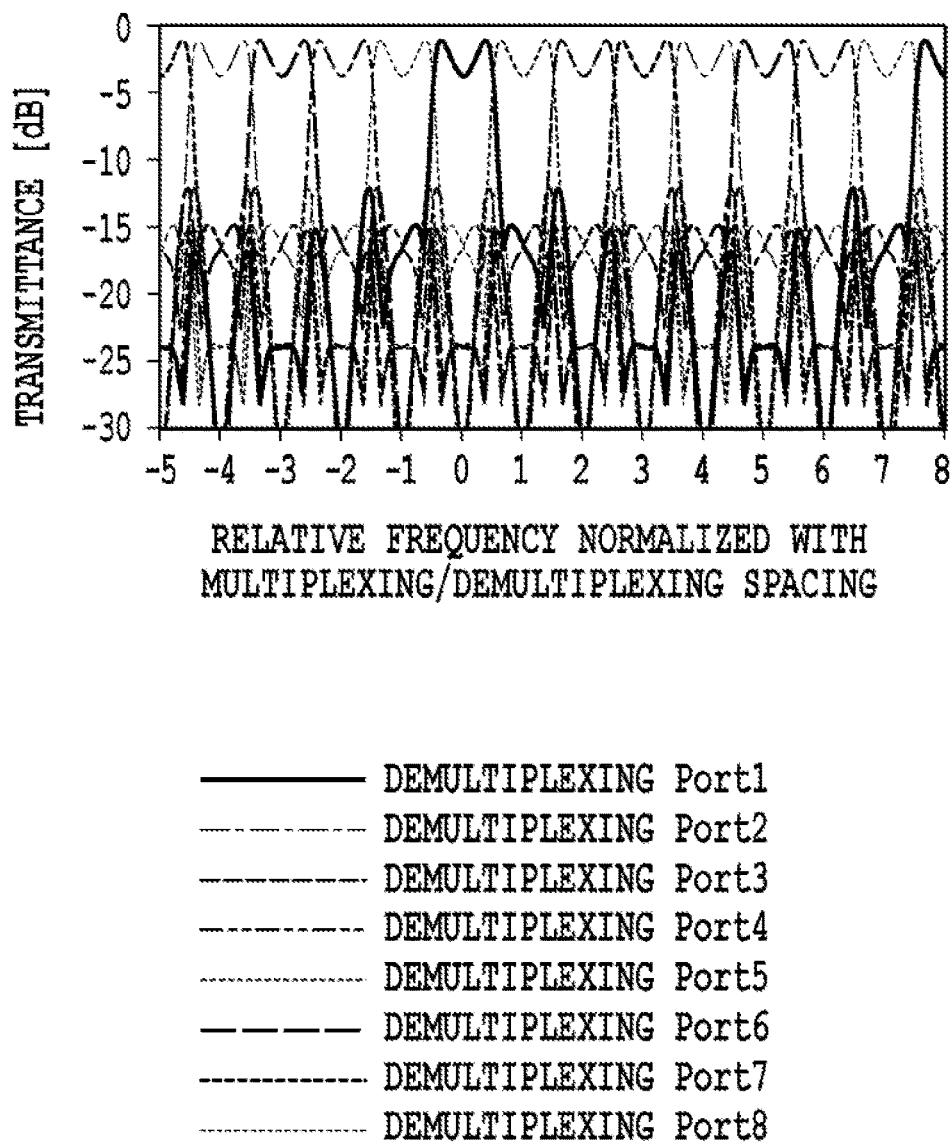
FIG. 20A is a diagram illustrating the power transmittance characteristics of the multi-stage interferometer circuit of the third embodiment.
Figure 20B:
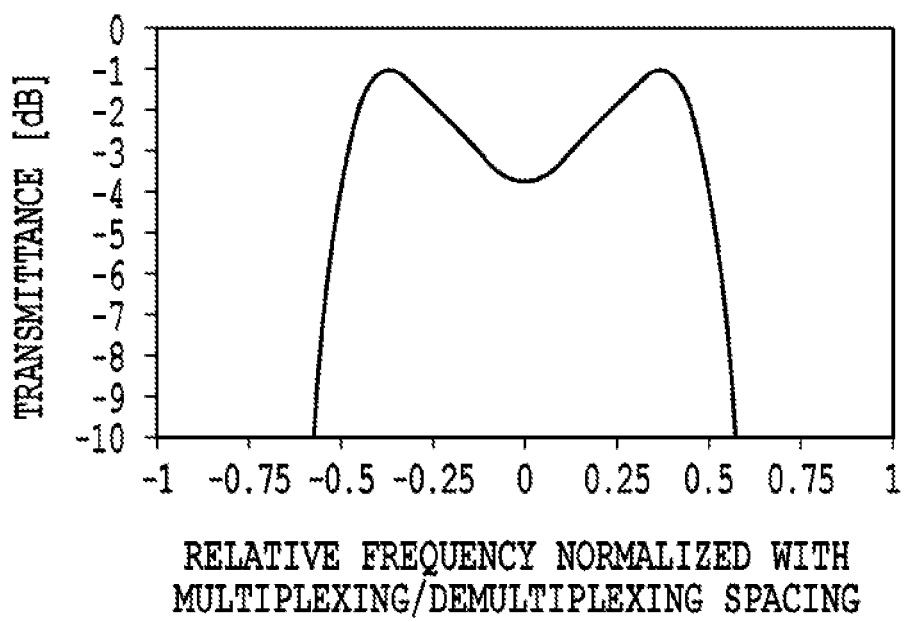
FIG. 20B is a diagram illustrating the power transmittance characteristic in the passband of the multi-stage interferometer circuit of the third embodiment.
Figure 20C:
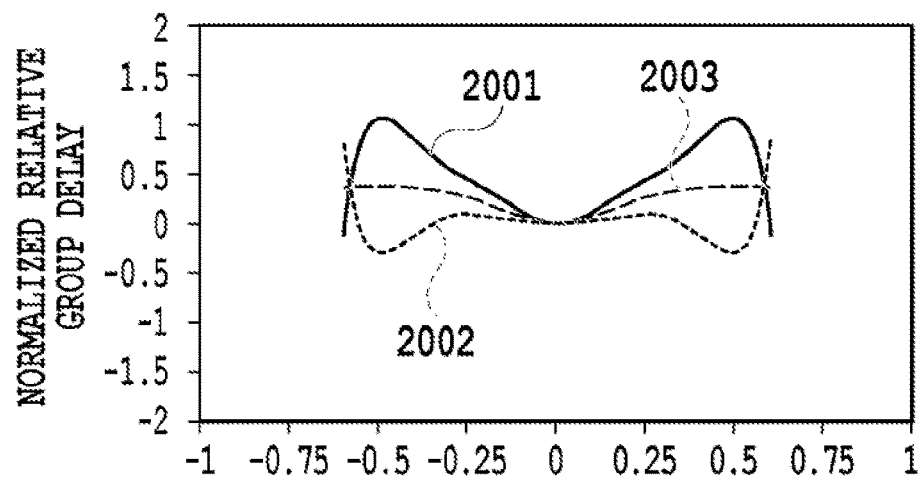
FIG. 20C is a diagram illustrating the group delay characteristics in the passband of the multi-stage interferometer circuit of the third embodiment.

FIG. 20A illustrates the power transmittance characteristics of all the demultiplexing ports of the multi-stage interferometer circuit 1900 of the third embodiment, FIG. 20B illustrates the power transmittance characteristic in the passband of the multi-stage interferometer circuit 1900, and FIG. 20C illustrates the group delay characteristics in the passband of the multi-stage interferometer circuit 1900. Note that the characteristics in the passband illustrated in FIG. 20A and FIG. 16B become the same in all the demultiplexing ports. The power transmittance characteristics illustrated in FIG. 20A and FIG. 20B are completely the same between the normal GDR design and the reverse GDR design, as in the first embodiment. Also in the third embodiment, because ΔLTF of the TF satisfies the relationship of Formula 7, the characteristic repetition cycle of the two-tap TF completely is the same as the multiplexing/demultiplexing spacing of the multi-stage interferometer circuit, and the same dip characteristic can be imparted to the passband in all the ports. Furthermore, the extinction ratio to both the adjacent ports is the same, i.e. approximately 13 dB, on the multiplexing/demultiplexing grid, and with the configuration of providing a TF of the present invention a dip-shaped characteristic can be imparted to the passband power transmission characteristic without causing excessive crosstalk. The group delay characteristic is, as illustrated in FIG. 20C, the group delay characteristic in the multi-stage interferometer circuit without a TF added by the characteristic of the TF itself, as in the first embodiment. The group delay ripple amount in the TF itself, which is the residual group delay ripple when a multiplexer with a TF of the reverse GDR design is used in the transmitter and a multiplexer without a TF of the reverse GDR design is used in the receiver, is approximately 10 ps when the multiplexing/demultiplexing spacing is 37.5 GHz.

Figure 21A:
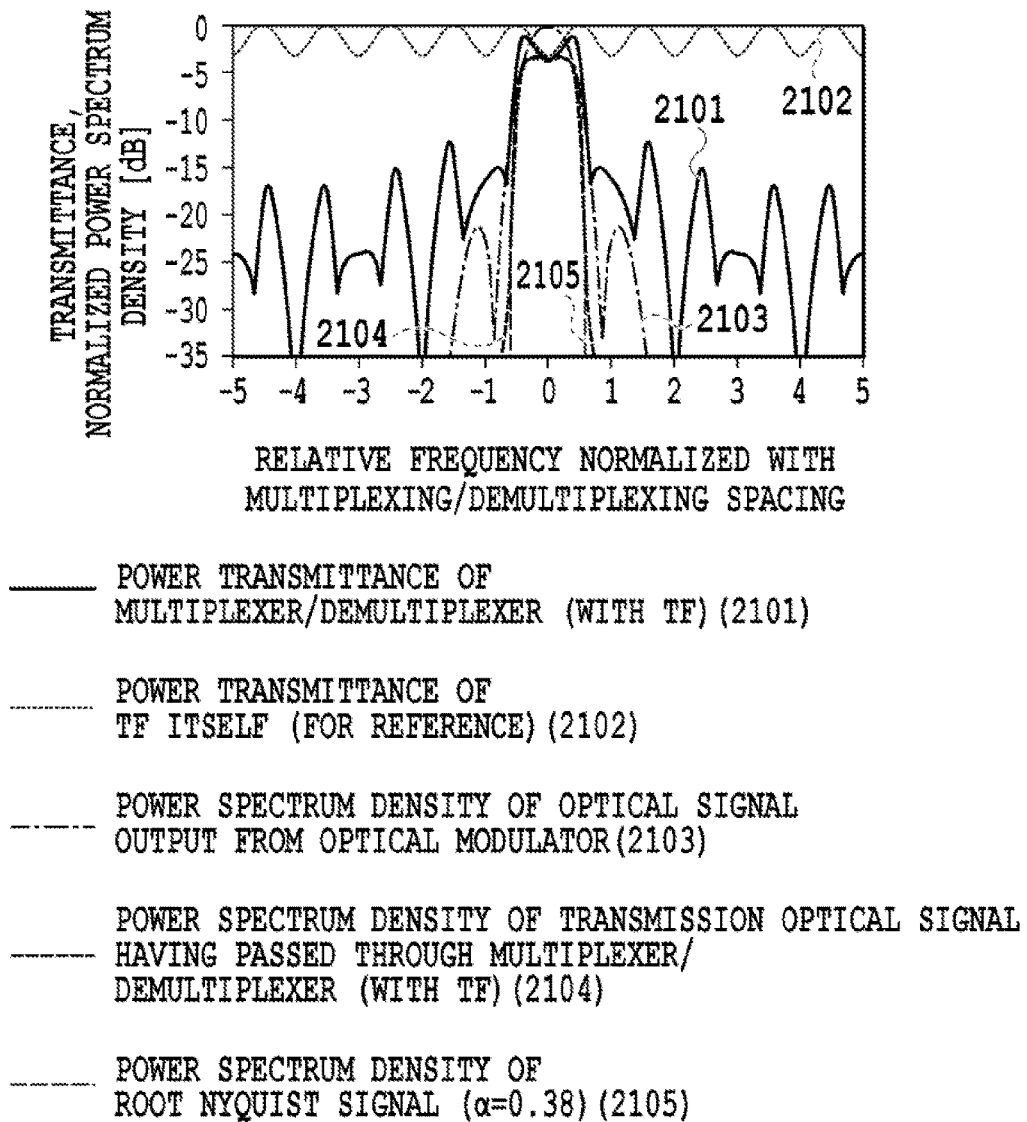
FIG. 21A is a diagram illustrating the characteristics in all regions of a transmission signal light spectrum or the like when the multi-stage interferometer circuit of the third embodiment is used for the multiplexer of the transmitter.
Figure 21B:
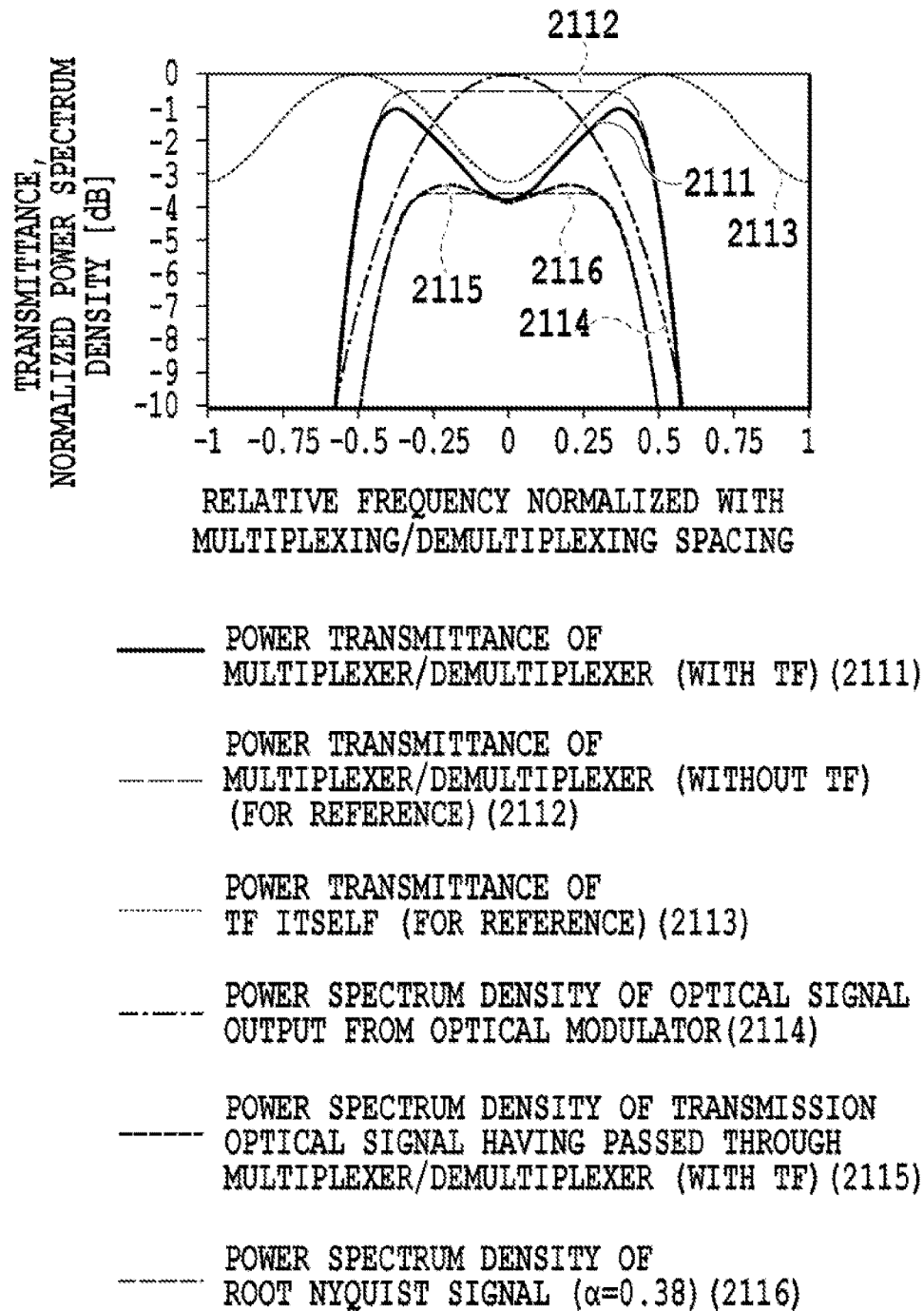
FIG. 21B is a diagram illustrating the characteristics in the vicinity of the main lobe/passband of a transmission signal light spectrum or the like when the multi-stage interferometer circuit of the third embodiment is used for the multiplexer of the transmitter.

FIG. 21A illustrates the characteristics in all regions of the transmission signal light spectrum and the like when the multi-stage interferometer circuit 1900 of the third embodiment is used for the multiplexer of the transmitter, and FIG. 21B illustrates the characteristics in the vicinity of the main lobe/passband of the transmission signal light spectrum and the like of the multi-stage interferometer circuit 1900. The conditions in calculating the spectrum are the same as the conditions described in the first embodiment. Also in the third embodiment, the power spectral density (2103, 2114) of signal light output from an optical modulator is shaped by the transmittance characteristic (2101, 2111) of the multi-stage interferometer circuit 1900. As the result, the power spectral density (2104, 2115) of the output signal light from the multi-stage interferometer circuit, namely, the transmission signal light as the transmitter, is generally shaped into a highly rectangular spectrum that is the characteristic of the power spectral density (2105, 2116) of the root Nyquist signal. However, the flatness of the top of the spectrum of the output signal light becomes equal to or less than 0.5 dB in terms of ripple, and slightly decreases as compared with the case where the multi-stage interferometer circuit of the first embodiment is used. Note that, the steepness of the spectrum of the output signal light is approximately 0.38 in terms of the roll-off rate α, and is generally comparable with the case of the first embodiment.

The third embodiment can be said to be advantageous, in terms of the layout design, since the maximum delay length of the delay circuit becomes shorter and a total number of delay paths also becomes smaller although the characteristic is slightly poorer, than the first and second embodiments.

Fourth Embodiment

Figure 22:
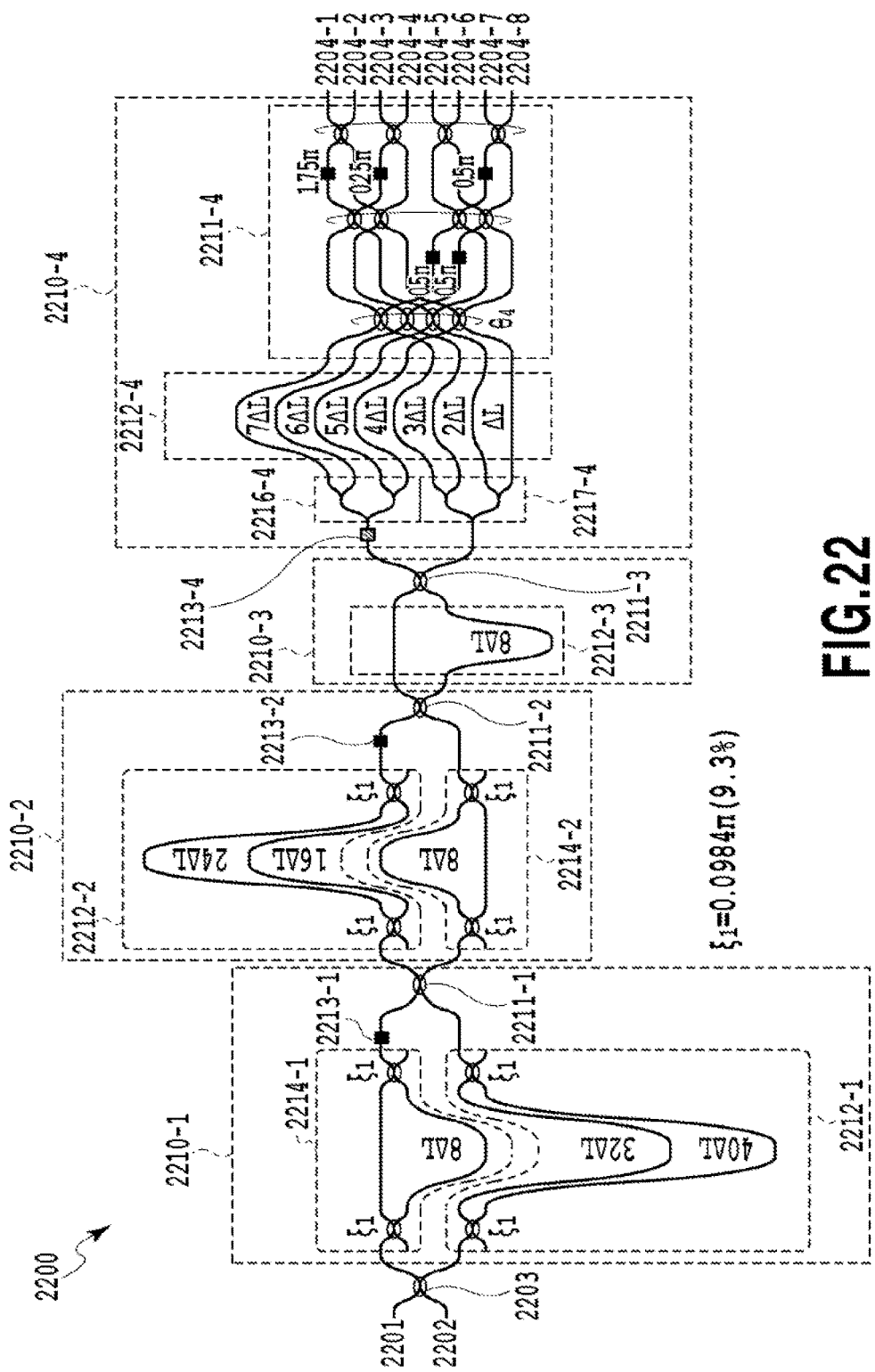
FIG. 22 is a configuration diagram illustrating a multi-stage interferometer circuit according to a fourth embodiment of the present invention.

FIG. 22 is the configuration diagram illustrating a multi-stage interferometer circuit 2200 according to a fourth embodiment of the present invention. The multi-stage interferometer circuit 2200 of FIG. 22 is also illustrated when the number of the wavelength-multiplexed/demultiplexed channel, namely, the number of demultiplexing ports, is eight (M=8). The number of stages of interferometers is set to four (N=4), and the design parameters other than the TF are the same as the parameters given in FIG. 3, as in the first embodiment.

In the multi-stage interferometer circuit 2200, interferometers 2210-1 to 2210-4 are arranged in series between a 2×2 coupler 2203 which couples the input light coming from input ports 2201 (corresponding to the multiplexing port 101 of FIG. 1), 2202 (corresponding to the multiplexing port 102 of FIG. 1) and output ports 2204-1 to 2204-8 (corresponding to the demultiplexing ports 132-1 to 132-M of FIGS. 1).

Figure 9J:
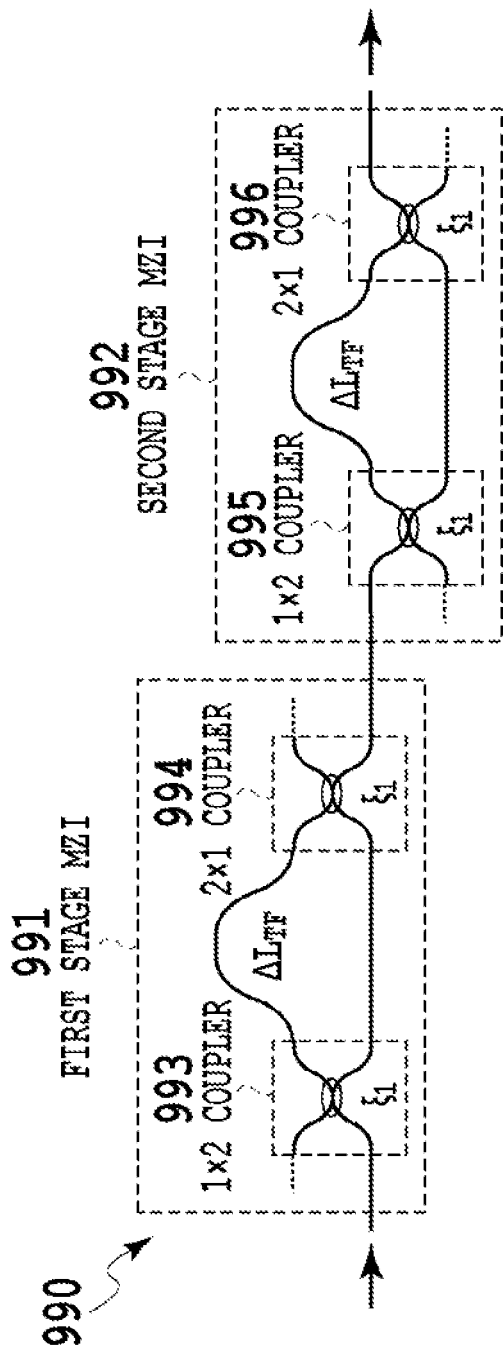
FIG. 9J is a diagram illustrating a specific configuration example of the TF used in the present invention.

Here, the interferometer 2210-1 of the first stage has a configuration (2212-1, 2214-1) in which an MZI 991 of the first stage of the TF 990 having a two-stage connection configuration illustrated in FIG. 9J is incorporated, as a TF1 (TF 114-1, TF 115-1), into the interferometer 110-1 of the first stage of the multi-stage interferometer circuit 100 illustrated in FIG. 1. Furthermore, the interferometer 2210-2 of the second stage has a configuration (2212-2, 2214-2) in which the MZI 962 of the second stage of the TF 990 having a two-stage connection configuration illustrated in FIG. 9J is incorporated, as a TF2 (TF 114-2, TF 115-2), into the interferometer 110-2 of the second stage of the multi-stage interferometer circuit 100 illustrated in FIG. 1. Specifically, the MZI 991 of the first stage (the path length difference $\Delta$LTF: the input port 1/output port 1, which are the lower-side ports are used) of the TF 990 having a two-stage connection configuration is incorporated into the shorter arm waveguide (2214-1) of the delay circuit of the interferometer 2210-1 of the present embodiment. On the other hand, the MZI 991 of the first stage of the TF 990 having a two-stage connection configuration is also incorporated into the longer arm waveguide (2212-1) of the delay circuit of the interferometer 2210-1 to thereby impart the delay difference of the interferometer 2210-1 to these two TFs. Namely, the delay length of the longer arm waveguide of the delay circuit 112-1 of the interferometer 110-1 of the first stage of FIG. 1 is incorporated, as a basic delay length, into each arm waveguide of the TF 114-1 (TF1) and thus the longer arm waveguide of the interferometer 2210-1 of the first stage is set to the two-tap TF 2212-1 with a basic delay. Therefore, the delay length of each path of the two-tap TF 2212-1 with a basic delay is 32$\Delta$L and 40$\Delta$L, respectively, with reference to the path length of the shortest path of the two-tap TF 2214-1 arranged on the shorter length arm path side of the interferometer 2210-1. Furthermore, the MZI 992 of the second stage (the path length difference $\Delta$LTF: the input port 0/output port 0, which are the upper-side ports are used) of the TF 990 having a two-stage connection configuration is incorporated into the shorter arm waveguide (2214-2) of the delay circuit of the interferometer 2210-2. On the other hand, the MZI 992 of the second stage of the TF 990 having a two-stage connection configuration is incorporated also into the longer arm waveguide (2212-2) of the delay circuit of the interferometer 2210-1 to impart the delay difference of the interferometer 2210-2. That is, the delay length of the longer arm waveguide of the delay circuits 112-2 of the interferometer 110-2 of the second stage of FIG. 1 is incorporated, as a basic delay length, into each arm waveguide of the TF 114-2 (TF2) to set the longer arm waveguide of the interferometer 2210-2 of the second stage to the two-tap TF 2212-2 with a basic delay. Accordingly, the delay length of each path of the two-tap TF 2212-2 with a basic delay is 16$\Delta$L and 24$\Delta$L, respectively, with reference to the path length of the shortest path of the two-tap TF 2214-2 arranged on the shorter length arm path side of the interferometer 2210-2. As described above, an unnecessary increase in the number of stages of interferometers of the whole multi-stage interferometer circuit can be avoided and the circuit size can be minimized although the TF has a two-stage connection configuration, by separately arranging the MZI 991 of the first stage and the MZI 992 of the second stage of the TF 990 having a two-stage connection configuration into the separate stages inside the multi-stage interferometer. $\Delta$LTF of the TF 990 having a two-stage connection configuration is 8$\Delta$L and satisfies the relationship ($\Delta$LTF=M·$\Delta$L) of Formula 7. Furthermore, $\xi$1=0.0984$\pi$ (9.3%) described above is used for the coupling phase angle (coupling ratio) of each of the 2×2 couplers 993 to 996 of the TF 990 having a two-stage connection configuration.

The light from the two-tap TF 2214-1 and the light from the two-tap TF 2212-1 with a basic delay are coupled with each other by a 2×2 coupler 2211-1, and a phase shifter 2213-1 is inserted between the two-tap TF 2214-1 and the 2×2 coupler 2211-1. The light from the two-tap TF 2214-2 and the light from the two-tap TF 2212-2 with a basic delay are coupled with each other by the 2×2 coupler 2211-2, and a phase shifter 2213-2 is inserted between the two-tap TF 2212-2 with a basic delay and the 2×2 coupler 2211-2.

The interferometer 2210-3 of the third stage includes a delay circuit 2212-3 and a 2×2 coupler 2211-3 which couples the light from the delay circuit 2212-3. The interferometer 2210-4 of the fourth stage includes: 1×4 couplers 2216-4 and 2217-4 which further branch the light from the 2×2 coupler 2211-3 into eight outputs; an eight-array delay circuit 2212-4 that inputs the light from the 1×4 couplers 2216-4 and 2217-4; and an 8×8 coupler 2211-4 that inputs the light from the eight-array delay circuit 2212-4. Each of the output/multiplexing ports 2204-1 to 2204-8 is connected to each output of the 8×8 coupler 2211-4. A phase shifter 2213-4 is inserted between the 2×2 coupler 2211-3 and the 1×4 coupler 2216-4. For the normal GDR design, the phase shift amount of the phase shifter 2213-4 is set to zero and the input port 1501 is used. For the reverse GDR design, the phase shift amount of the phase shifter 2213-4 is set to $\pi$ and the input port 1502 is used.

Note that the multi-stage interferometer circuit 2200 of FIG. 22 illustrates an example of the demultiplexer in which the input port 2201 or 2202 inputs light and the output ports 2204-1 to 2204-8 output demultiplexed light. However, the multi-stage interferometer circuit 2200 of FIG. 22 may serve as a multiplexer in which the output ports 2204-1 to 2204-8 receive light and the input port 2201 or 2202 outputs multiplexed light. Furthermore, the multi-stage interferometer circuit 2200 also has the function as an optical filter.

Furthermore, also in the present embodiment, as in the above-described embodiments, each two-tap TF may be arranged at any stage (2210-1 to 2210-4) of the multi-stage interferometer.

Figure 23A:
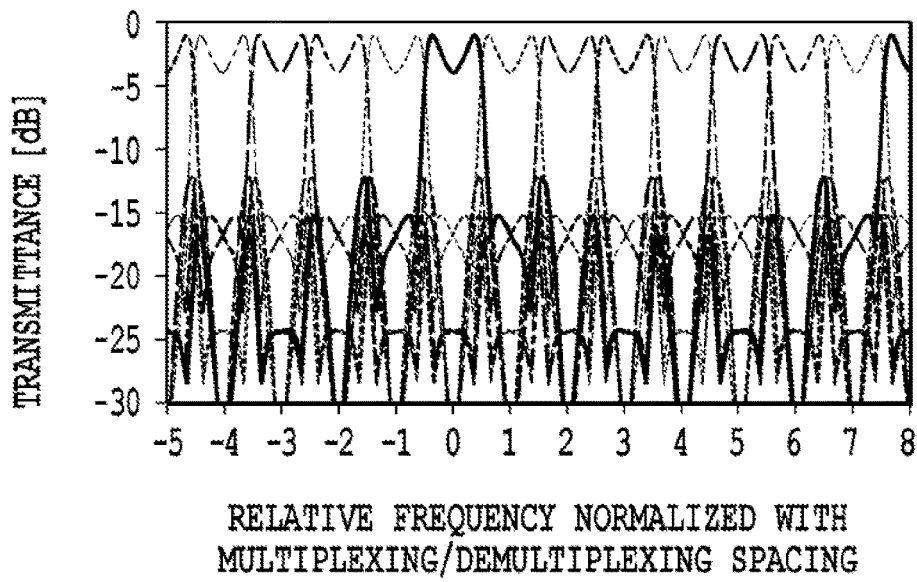
FIG. 23A is a diagram illustrating the power transmittance characteristics of the multi-stage interferometer circuit of the fourth embodiment.
Figure 23B:
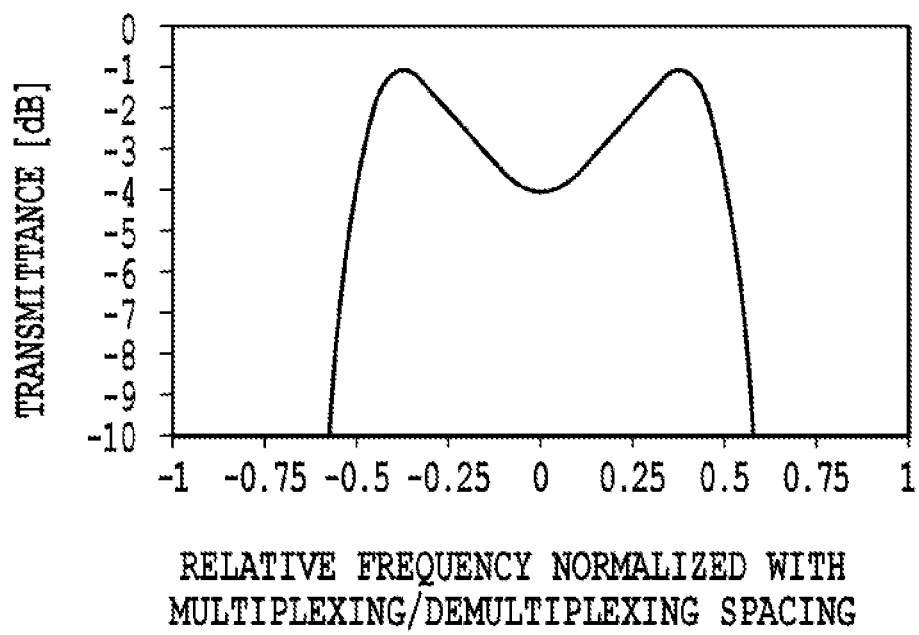
FIG. 23B is a diagram illustrating the power transmittance characteristic in the passband of the multi-stage interferometer circuit of the fourth embodiment.
Figure 23C:
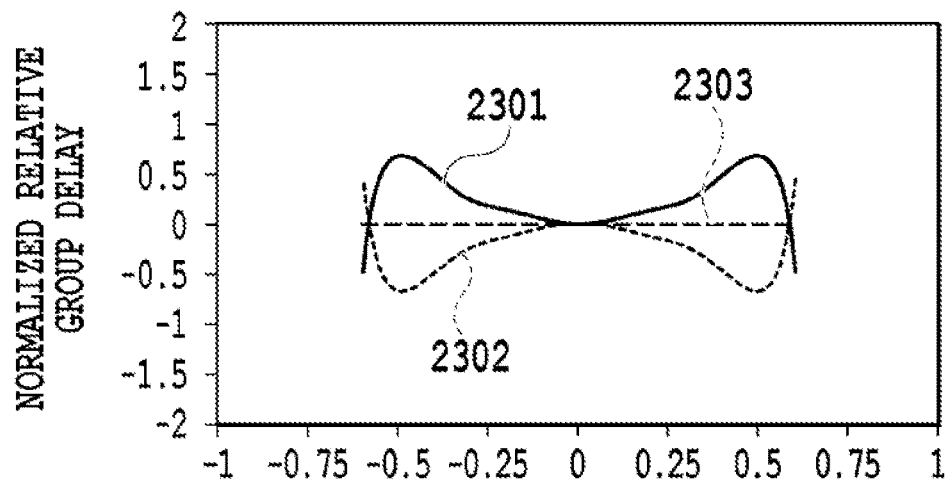
FIG. 23C is a diagram illustrating the group delay characteristics in the passband of the multi-stage interferometer circuit of the fourth embodiment.

FIG. 23A illustrates the power transmittance characteristics of all the multiplexing ports of the multi-stage interferometer circuit 2200 of the fourth embodiment, FIG. 23B illustrates the power transmittance characteristic in the passband of the multi-stage interferometer circuit 2200, and FIG. 23C illustrates the group delay characteristics in the passband of the multi-stage interferometer circuit 2200. Note that the characteristics in the passband illustrated in FIG. 23B and FIG. 23C are the same in all the demultiplexing ports. The power transmittance characteristics illustrated in FIG. 23A and FIG. 23B become completely the same between the normal GDR design and the reverse GDR design, as in the first embodiment. Also in the fourth embodiment, since ΔLTF of the TF satisfies the relationship of Formula 7, the characteristic repetition cycle of each two-tap TF completely is the same as the multiplexing/demultiplexing spacing of the multi-stage interferometer circuit, and the same dip characteristic can be imparted to the passband in all the ports. Furthermore, the extinction ratio to both the adjacent ports is the same, i.e. approximately 13 dB, on the multiplexing/demultiplexing grid, and with the configuration of providing a TF of the present invention a dip-shaped characteristic can be imparted to the passband power transmission characteristic without causing excessive crosstalk.

The group delay characteristic is, as illustrated in FIG. 23C, reversed upside down between the normal GDR design and the reverse GDR design, and becomes the same as the group delay characteristic of the multi-stage interferometer circuit without a TF illustrated in FIG. 4C. This is because the group delay characteristic of the TF 990 connected in two stages illustrated in FIG. 9J applied in the present embodiment is flat and does not have a ripple, i.e., the group delay characteristic (a sum of the group delay characteristics of the two-tap TF 2214-1 or two-tap TF 2212-1 with a basic delay and the two-tap TF 2214-2 or two-tap TF 2212-2 with a basic delay) in the TF itself is flat and does not have a ripple, in the present embodiment. In other words, the group delay characteristic of the TF used in the fourth embodiment is reversed upside down between the two-tap TF 2214-1 or two-tap TF 2212-1 with a basic delay and the two-tap TF 2214-2 or two-tap TF 2212-2 with a basic delay. Accordingly, the group delay ripples are cancelled out each other and the group delay characteristic as the TF itself is flat and does not have a ripple. As described above, the group delay characteristic of the fourth embodiment becomes the same as the group delay characteristic of the multi-stage interferometer circuit without a TF, and thus when the multiplexer with a TF of the normal GDR design of the fourth embodiment is used in the transmitter and the demultiplexer without a TF of the reverse GDR design is used in the receiver, the residual group delay ripple as the whole transceiver system can be set to zero.

Figure 24A:
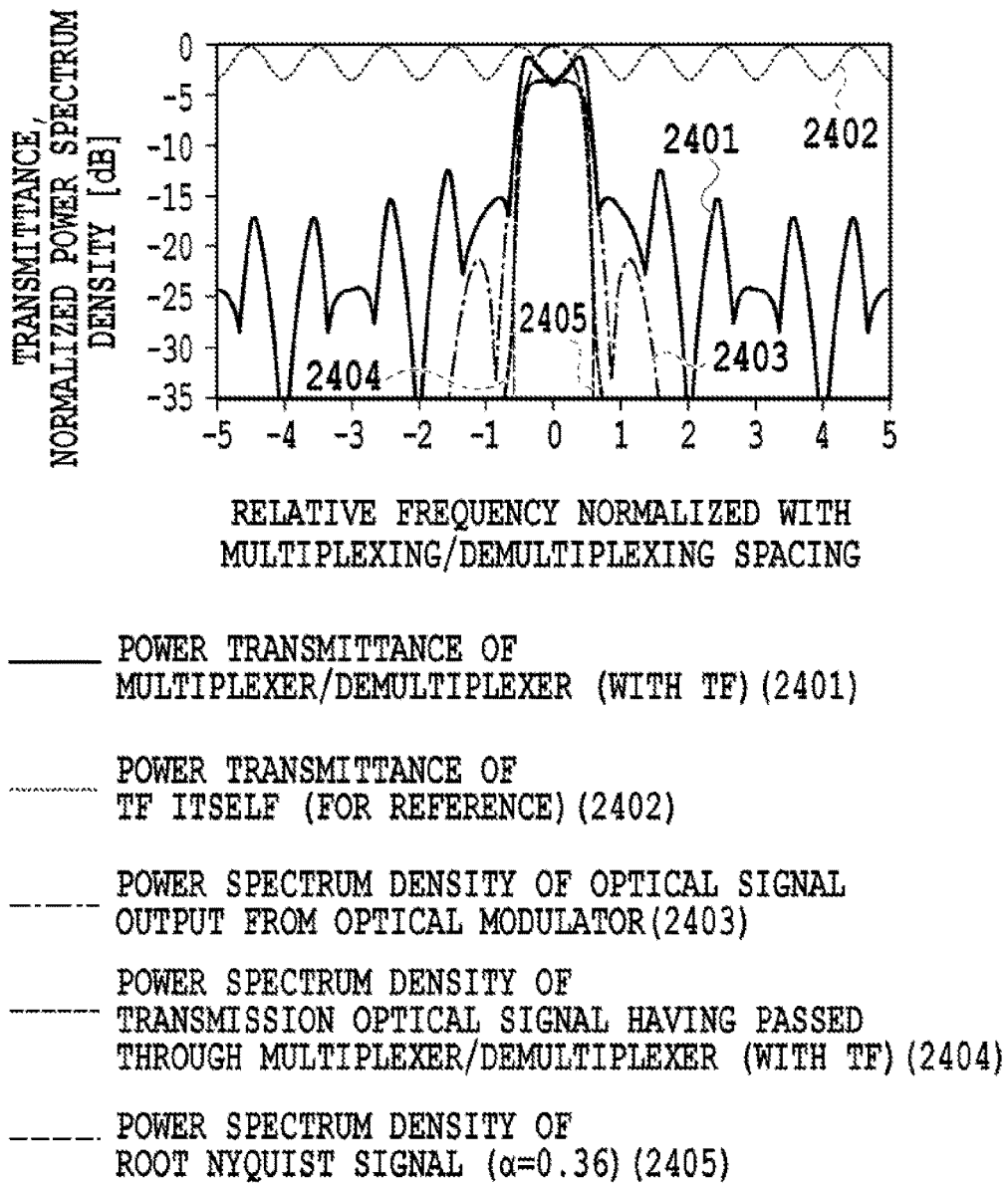
FIG. 24A is a diagram illustrating the characteristics in all regions of a transmission signal light spectrum or the like when the multi-stage interferometer circuit of the fourth embodiment is used for the multiplexer of the transmitter.

FIG. 24A illustrates the characteristics in all regions of the transmission signal light spectrum and the like when the multi-stage interferometer circuit 2200 of the fourth embodiment is used for the multiplexer of the transmitter, and FIG. 24B illustrates the characteristics in the vicinity of the main lobe/passband of the transmission signal light spectrum and the like of the multi-stage interferometer circuit 2200. The conditions in calculating the spectrum are the same as the conditions described in the first embodiment. Also in the fourth embodiment, the power spectral density (2403, 2414) of signal light output from an optical modulator is shaped by the transmittance characteristic (2401, 2411) of the multi-stage interferometer circuit 2200. As the result, the power spectral density (2404, 2415) of the output signal light from the multi-stage interferometer circuit, namely, the transmission signal light as the transmitter, is generally shaped into a highly rectangular spectrum that is the characteristic of the power spectral density (2405, 2416) of the root Nyquist signal. However, the flatness of the top of the spectrum of the output signal light becomes equal to or less than 0.5 dB in terms of ripple, and slightly decreases as compared with the case where the multi-stage interferometer circuit of the first embodiment is used. Note that the steepness of the spectrum of the output signal light is about 0.36 in terms of the roll-off rate α, and is generally comparable with the case of the first embodiment.

Although the fourth embodiment is slightly poor in characteristics as compared with the first and second embodiments, it has a large merit of being able to set the residual group delay ripple as the whole transceiver system to zero as described above. The circuit scale in terms of a total number of delay paths can be said to be comparable with the second embodiment.

Note that, in the fourth embodiment, a two-tap TF is used as the TF incorporated into a multi-stage interferometer circuit, but the present invention is not necessarily limited thereto, and even when a TF with a different number of taps is incorporated, there can be realized, with the similar idea, an embodiment in which the group delay characteristic of the portion of a TF itself is flat and does not have a ripple. For example, for the four-tap TF illustrated in FIG. 9C to FIG. 9F, a four-tap TF using In0/Out0 and a four-tap TF using In3/Out3 may be incorporated into the first stage and second stage of the multi-stage interferometer, respectively, by sharing of the dip amount.

As described above, the present embodiments of the multi-stage interferometer circuit of the present invention have been specifically explained in several types of TFs, but the configuration of the present invention is not limited thereto. For example, the three-tap TF 970 illustrated in FIG. 9H, the three-tap/four-path TF 980 illustrated in FIG. 9I, or the like may be naturally used instead of the 2-tap TF in the third embodiment and it is to be noted that there are various combinations of: the types of a TF to be used and/or the quantity of TFs to be used; the position of the stage at which a TF is incorporated into a multi-stage interferometer; and the like.

Furthermore, the present embodiments have been explained as a multi-stage interferometer circuit having a plurality of multiplexing ports, but there may be naturally employed a configuration in which some of M demultiplexing ports are omitted, the optical circuits only related to the omitted ports are also omitted, and only a limited number of demultiplexing ports are used. Taking an extreme case as an example, naturally, the multi-stage interferometer circuit may have only one demultiplexing port kept, and may be used as a Nyquist-shaping filter of one input/one output without having the multiplexing/demultiplexing function.

EXAMPLES

Figure 25A:
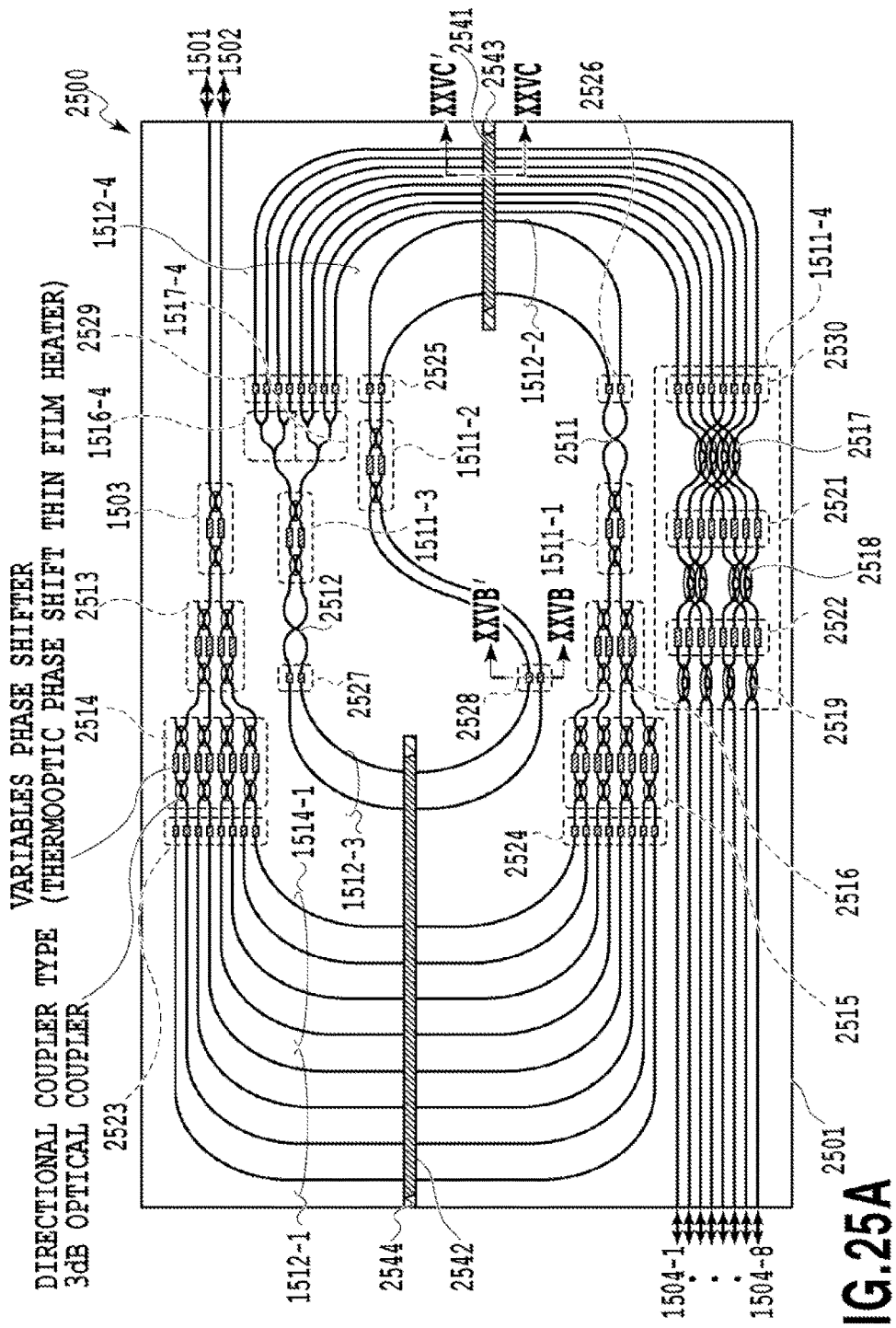
FIG. 25A is a diagram illustrating a top perspective view of the circuit layout of a multi-stage interferometer circuit according to one example of the present invention.
Figure 25B:
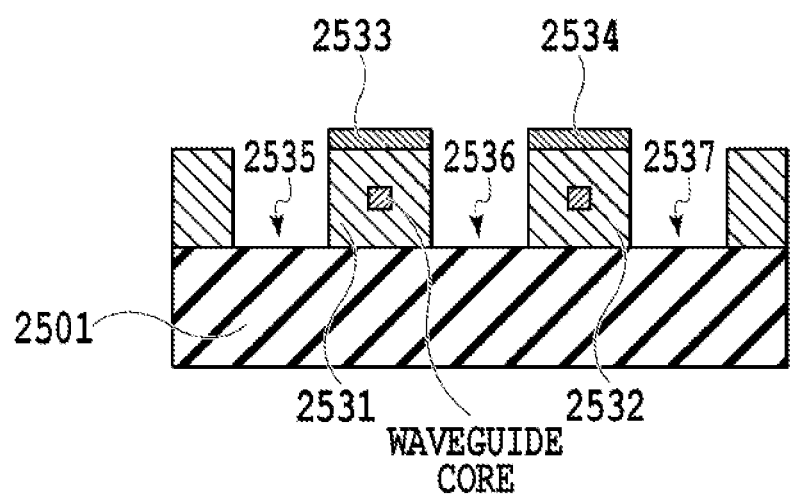
FIG. 25B is a diagram illustrating a cross-sectional view along XXVB-XXVB' of FIG. 25A.
Figure 25C:
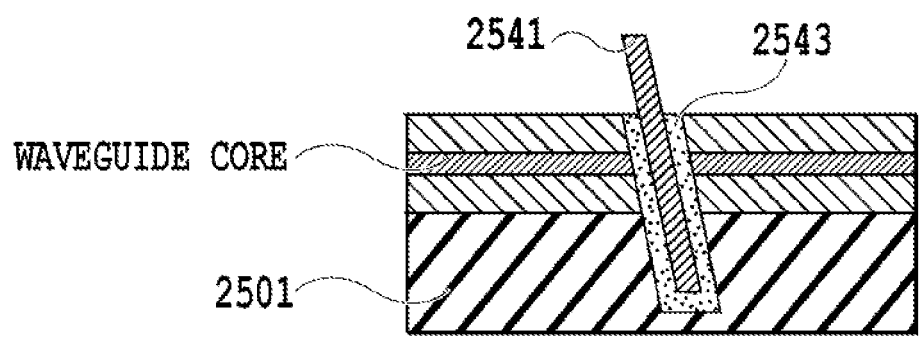
FIG. 25C is a diagram illustrating a cross-sectional view along XXVC-XXVC' of FIG. 25A.

An actually-prepared multi-stage interferometer circuit of the present invention will be explained as an example. FIG. 25A illustrates the top perspective view of a circuit layout 2500 of a multi-stage interferometer circuit according to the present example, FIG. 25B illustrates the cross-sectional view along XXVB-XXVB' of FIG. 25A, and FIG. 25C illustrates the cross-sectional view along XXVC-XXVC' of FIG. 25A. In the present example, a silica-based planar lightwave circuit (silica-based PLC) is used as a device configured to realize the multi-stage interferometer circuit of the present invention. This is because the silica-based PLC is excellent in low insertion loss, design freedom, reliability, and mass productivity, and has been established as the practical core-technology of a passive circuit such as the multi-stage interferometer circuit. However, it is apparent that the present invention basically does not depend on the implementation technology since the present invention is directed to the circuit configuration. Therefore, the multi-stage interferometer circuit of the present invention may be realized with another material-based waveguide, for example, a waveguide circuit using materials or the like such as semiconducting materials such as silicon and/or indium phosphide (InP), and/or the materials such as polymers and multi-element oxides, and the effects indicated in the present example and the like can be similarly obtained in these other material-based circuits.

In the present example, there was produced a configuration of the multi-stage interferometer circuit 1500 according to the first embodiment of FIG. 15. The number of demultiplexing ports is eight (M=8), and the number of stages of interferometers is four (N=4). A circuit layout 2500 of the present example has the multi-stage interferometer circuit 1500 of the first embodiment arranged on a circuit chip 2501 of a silicon substrate. In the present example, the whole circuit is laid out so as to be folded up several times, thereby reducing the chip size as much as possible. During this fold-up layout, a shorter path is arranged on the further center side of the chip than a longer path in the delay circuits 1512-1 to 1512-4, and 1514-1 at each stage. Accordingly, (1) a cross waveguide 2511 is inserted in front of the delay circuit 1512-2 and (2) a cross waveguide 2512 is inserted after the delay circuit 1512-3 so as to (3) switch the upper and lower paths of the interferometer from the delay circuit 1512-2 to the delay circuit 1512-3 and (4) partially reverse the direction of the interferometer. Since the multiplexing/demultiplexing spacing is set to 37.5 GHz and the effective refractive index of the silica PLC is about 1.45, the value of $\Delta L$ is set to be about 675 μm.

An optical coupler with a variable coupling ratio is used for the 2×2 couplers 1503 (θ0), 1511-1 (θ1), 1511-2 (θ2), and 1511-3 (θ3) of the multi-stage interferometer and the 2×2 couplers 2513, 2516 (ξ1), 2514, and 2515 (ξ2) of the TF so as to be able to adjust the transmission characteristic to some extent. This optical coupler with a variable coupling ratio includes an MZI having two 3 dB 2×2 couplers connected in series by two paths in which a variable phase shifter is inserted. Here, the optical coupler function with a variable coupling ratio is realized by changing the interference conditions of the MZI with the variable phase shifter. A wavelength-independent coupler (WINC) with a 3 dB coupling is used for the 2×2 coupler 2517 (θ4) and 3 dB couplers 2518 and 2519 constituting the 8×8 coupler 1511-4 of the multi-stage interferometer. A known configuration including one type of MZI is used for the WINC. Each phase shifter inside the multi-stage interferometer circuit, also serving as a phase adjuster for modifying an optical path length error, i.e., the phase error, in each path, is provided, as relative phase adjustors 2521 to 2530, at each stage and inside the 8×8 coupler. The phase shifter 1513-1 of the interferometer 1510-1 of the first stage illustrated in FIG. 15 and each phase shifter inside the TF are combined into relative phase adjustors 2523 and 2524. The phase shifter 1513-2 of the interferometer 1510-2 of the second stage is combined into relative phase adjustors 2525 and 2526. The phase shifter 1513-3 of the interferometer 1510-3 of the third stage is combined into relative phase adjustors 2527 and 2528. The phase shifter 1513-4 of the interferometer 1510-4 of the fourth stage is combined into relative phase adjustors 2529 and 2530. For example, when the value of the phase shifter 1513-4 of the interferometer 1510-4 of the fourth stage is varied by π, the phase shift amount of the variable phase shifter provided in four paths with delay amounts 4ΔL to 7ΔL of the eight-array delay circuit among the relative phase adjustors 2529 and 2530 may be simultaneously changed by π.

A thermooptic phase shifter is used for the variable phase shifter of each relative phase adjuster and variable coupler. The thermooptic phase shifter is for locally controlling the temperature of a waveguide with a thin film heater provided on a waveguide clad and controlling, with a thermooptic effect, the refractive index of the waveguide directly under the thin film heater, namely, the phase of guided light. As an example, the detail structure thereof will be explained using the variable phase shifter 2528. As illustrated in the XXVB-XXVB' cross-sectional view of FIG. 25B, thin film heaters 2533 and 2534 of the thermooptic phase shifter are formed on waveguide clads 2531 and 2532 of the variable phase shifter 2528. Although not illustrated in the top perspective view of FIG. 25A, on both sides of the waveguide clads 2531 and 2532, heat insulation grooves 2535 to 2537 for reducing the power consumption of the thermooptic phase shifter are formed. Furthermore, an electric wiring pattern for feeding a driving current to each thin film heater is formed on the circuit chip 2501.

The waveguide of a silica-based PLC is birefringent. Therefore, in the delay circuit, the optical path length differs between the guided light in a longitudinal polarization mode and the guided light in a horizontal polarization mode. This is not preferable since this causes a multi/demultiplexing frequency shift between each polarization mode. In the present example, in order to solve this polarization dependency, a polarization rotator 2542 is provided at the midpoint of the delay circuits 1512-1 and 1514-1, respectively, and at the midpoint of the delay circuit 1512-3, and a polarization rotator 2541 is provided at the midpoint of the eight-array delay circuit 1512-4 and at the midpoint of the delay circuit 1512-2, respectively. As an example, for the polarization rotator 2541, as illustrated in the XXVC-XXVC' cross-sectional view of FIG. 25C the polarization rotator 2541 is realized by inserting a half-wave plate, whose principal axis is tilted by 45°, into a groove 2543 formed on the circuit chip 2501. Because the polarization mode of guided light is switched by these polarization rotators 2541 and 2542, an optical path length difference shift due to birefringence can be canceled. Furthermore, the relative phase adjustors 2523 to 2530 are also divided and arranged in front of or after the polarization rotators 2541 and 2542 in order to cancel a tiny fluctuation of birefringence caused during phase adjustment.

There was fabricated the circuit chip 2501 by the use of a combination of a glass film deposition technique such as flame hydrolysis deposition (FHD) method, and a microfabrication technique such as reactive ion etching (RIE). Specifically, a glass film serving as a lower clad layer was deposited onto a silicon substrate and made transparent, and subsequently a core layer whose refractive index is slightly higher than the cladding layer was deposited. Next, a core pattern serving as an optical waveguide circuit was patterned with a microfabrication technique, and a glass film serving as an upper clad layer was deposited and made transparent, thereby fabricating an embedding-type optical waveguide. Then, a metal serving as a thin film heater was deposited on the upper clad surface by a vacuum deposition method or the like, and was patterned with a microfabrication technique, thereby implementing the thin film heater of the thermooptic phase shifter. Furthermore, a heat insulating groove of the thermooptic phase shifter was formed with a microfabrication technique. A wavelength-plate inserting groove was formed with a dicing saw, and a half-wave plate was inserted in the groove and fixed thereto with an adhesive. Finally, an optical fiber was connected to each of the input/output ports, and the chip was housed inside a case provided with a temperature controller to prepare a multiplexing/demultiplexing module. A relative index difference between the core and clad of the waveguide is 1.5%. The minimum bending radius of the waveguide was designed as 2 mm, and thus a multi-stage interferometer circuit was able to be compactly realized with the chip size of about 66×15 mm. Note that a multi-stage interferometer circuit without a TF was also fabricated as a reference.

Figure 26A:
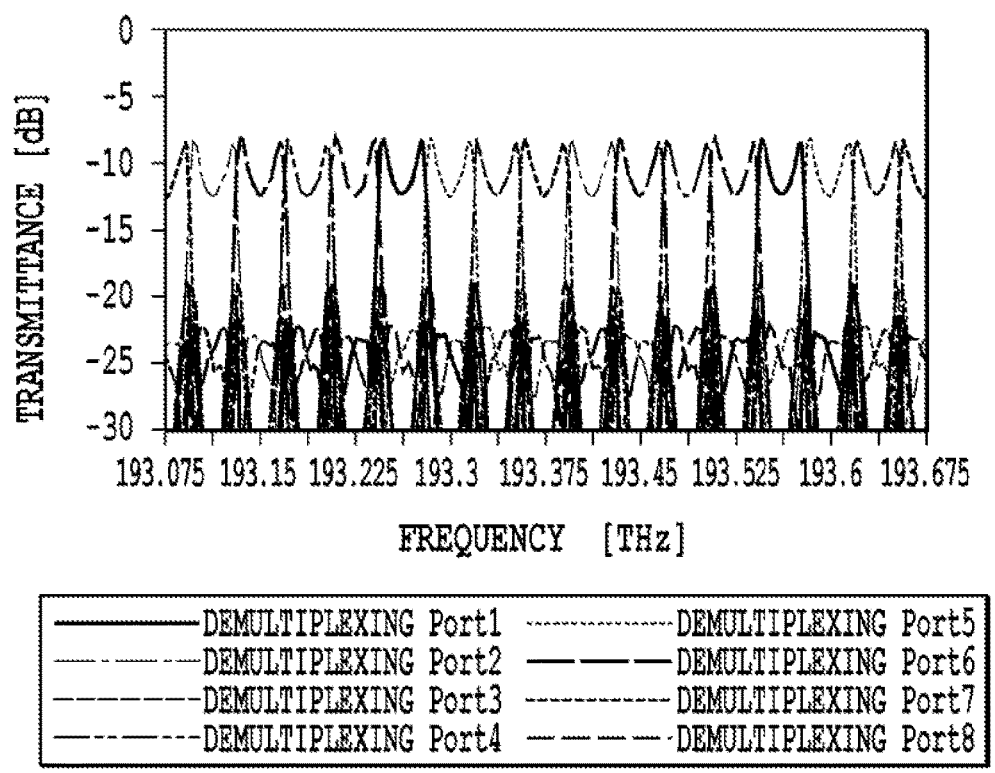
FIG. 26A is a diagram illustrating the power transmission characteristics of all ports of a multi-stage interferometer circuit with a TF (multiplexer with a TF for transmitter) prepared as this example.
Figure 26B:
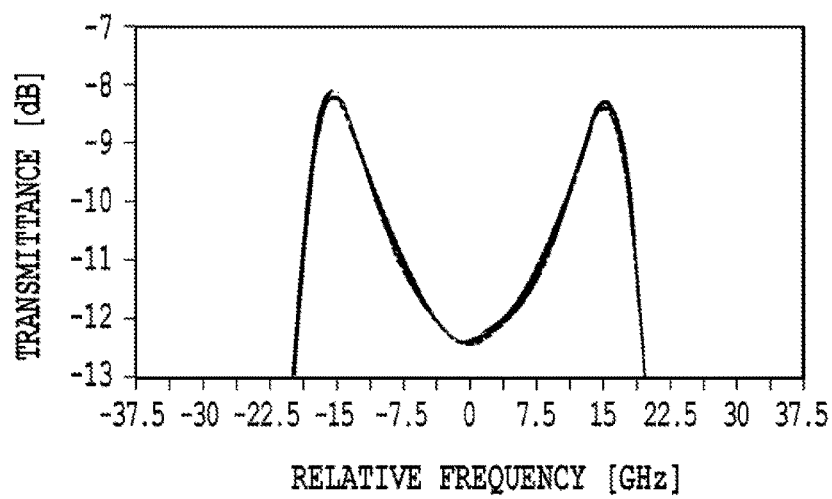
FIG. 26B is a diagram illustrating the power transmission characteristics in the passband of the multi-stage interferometer circuit with the TF (multiplexer with the TF for transmitter) prepared as this example.
Figure 26C:
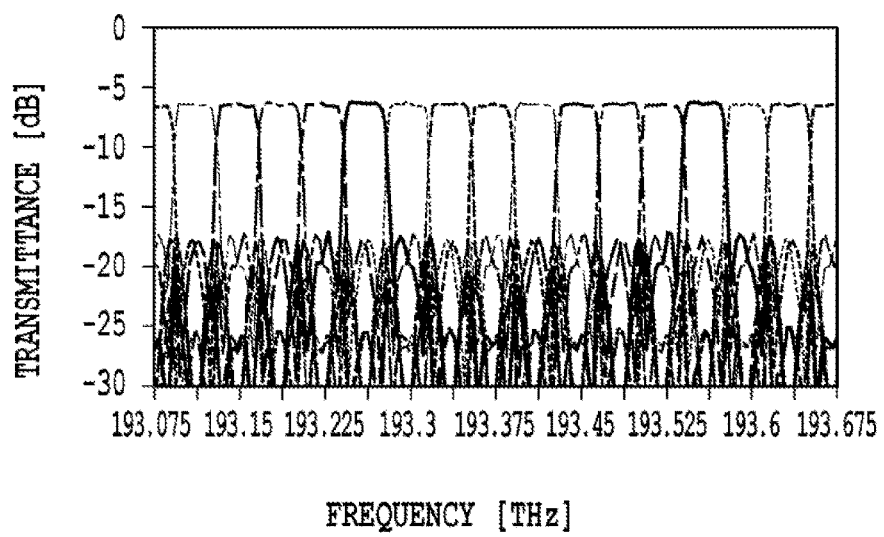
FIG. 26C is a diagram illustrating the power transmission characteristics of all the ports of a multi-stage interferometer circuit without a TF (demultiplexer without a TF for receiver) prepared as a reference.
Figure 26D:
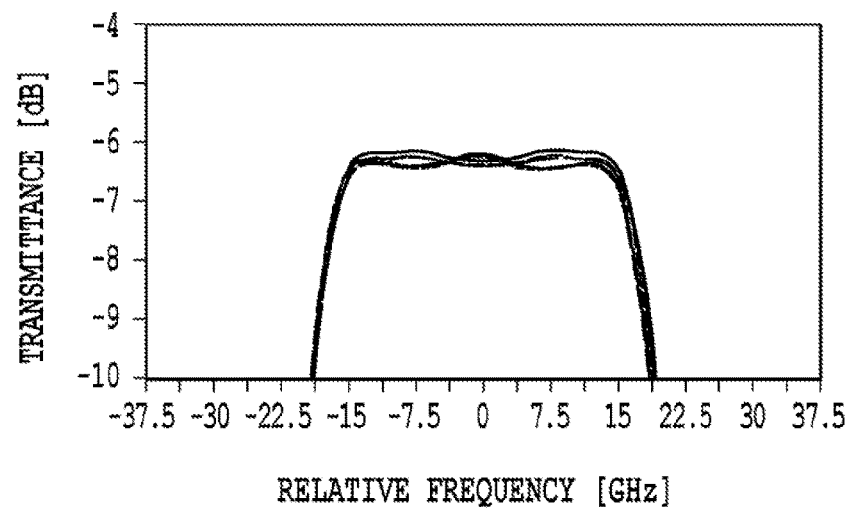
FIG. 26D is a diagram illustrating the power transmission characteristic in the passband of the multi-stage interferometer circuit without the TF (demultiplexer without the TF for receiver) prepared as the reference.

FIG. 26A illustrates the transmission characteristics of all the ports of a multi-stage interferometer circuit with a TF (multiplexer with a TF for transmitter) fabricated as the present example, FIG. 26B illustrates the transmission characteristics in the passband of the multi-stage interferometer circuit with a TF (multiplexer with a TF for transmitter) fabricated as the present example, FIG. 26C illustrates the transmission characteristics of all the ports of the multi-stage interferometer circuit without a TF (demultiplexer without a TF for receiver) fabricated as the reference, and FIG. 26D illustrates the transmission characteristics in the passband of the multi-stage interferometer circuit without a TF (demultiplexer without a TF for receiver) fabricated as the reference. Although the coupling ratio of each variable optical coupler and each relative phase adjuster are finely adjusted so as to become the coupling ratio and phase shift amount in the normal GDR design explained in the first embodiment, the dip amount of a TF was set so as to become slightly deeper than the design value in consideration of also the correction of the frequency characteristic of an EO bandwidth for optical modulation described later. Note that, as a reference, the multiplexing/demultiplexing characteristics (passband characteristic is flat) of the multi-stage interferometer circuit without a TF simultaneously fabricated are also illustrated in FIG. 26C and FIG. 26D, but the multi-stage interferometer circuit without a TF was adjusting so as to be of the reverse GDR design.

In all the eight ports, excellent characteristics substantially as designed were obtained. It can be seen that the dip shape in the passband is also the same for all the eight ports and the correction characteristics were collectively obtained. Furthermore, the extinction ratio to the adjacent port is approximately 12 dB on the multiplexing/demultiplexing grid, and is almost the same as the extinction ratio in the multi-stage interferometer circuit without a TF. Therefore, it can be seen that with the configuration of providing a TF of the present invention a dip-shaped characteristic can be imparted to the passband transmission characteristic without causing excessive crosstalk.

The transmitter/receiver illustrated in FIG. 5 were constituted using the fabricated multi-stage interferometer circuit of the present example, and then the transmission/reception tests of a Nyquist-shaped multicarrier signal were performed. A multi-stage interferometer circuit with a TF of the above-described normal GDR design was used as a multiplexer, in the transmitter 510, whereas a multi-stage interferometer circuit without a TF of the reverse GDR design was used as a demultiplexer, in the receiver 520. Since the multi-stage interferometer circuit fabricated this time has eight demultiplexing ports, the multiplexing/demultiplexing of eight subcarriers are possible, but for convenience of experiment equipment, multiplexing/demultiplexing experiments were performed by the use of only three subcarriers. The modulation format of each subcarrier signal is polarization-multiplex QPSK modulation, and the driving condition of the modulator is driving with an amplitude of 2Vπ. A pseudo-random code having the shape of a generally-raised cosine waveform is used for a driving electric signal. The modulation symbol rate is 32 G baud. 193.3750 THz, 193.4125 THz, 193.4500 THz fit to the ports #7, #2, and #6 adjacent each other on the frequency axis were used, respectively, for the carrier frequency of each subcarrier.

Figure 27A:
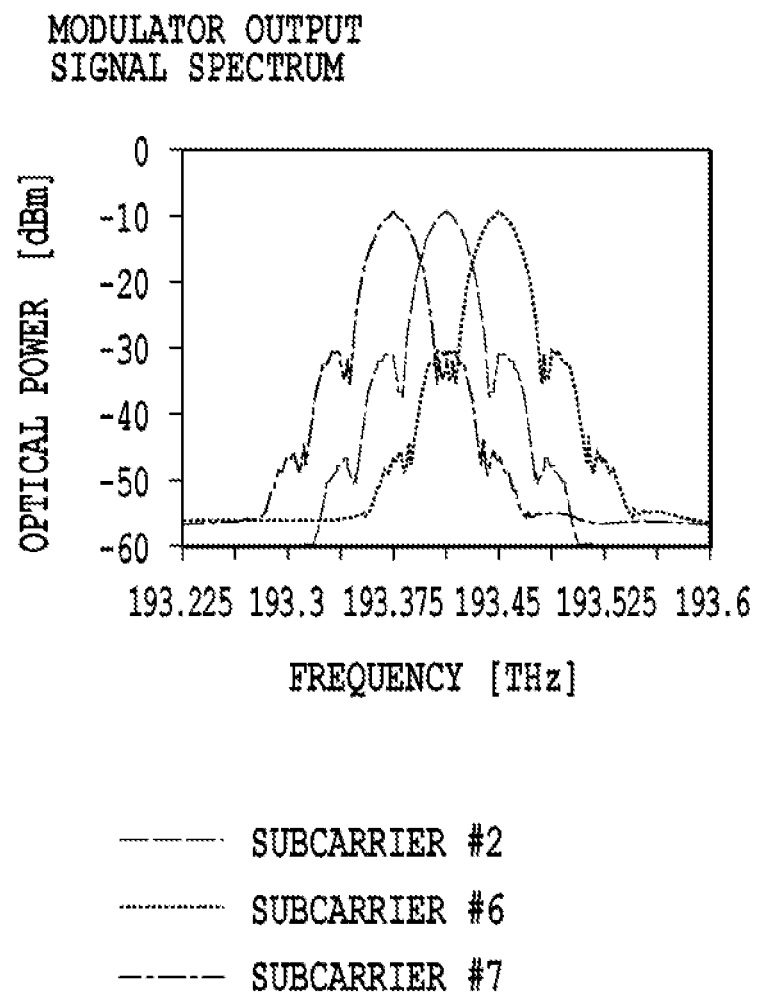
FIG. 27A is a diagram illustrating the optical spectrum of each subcarrier signal output from each polarization-multiplex QPSK modulator in a multicarrier transmitter.
Figure 27B:
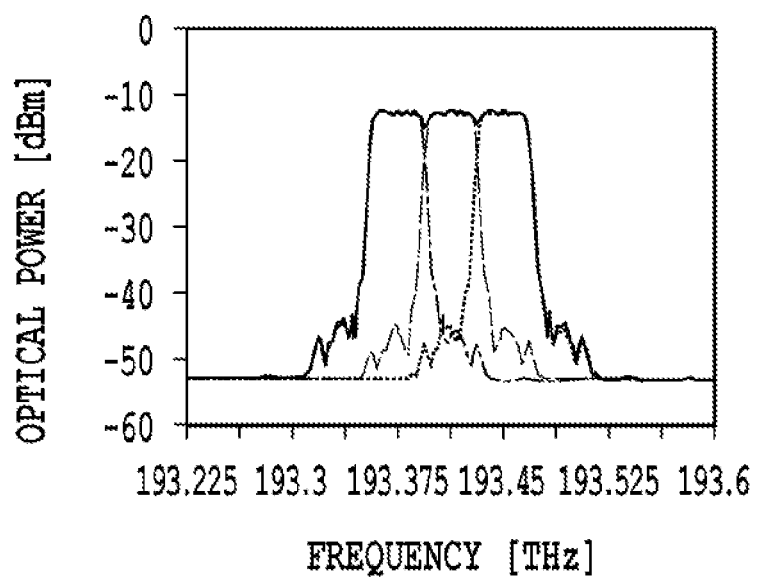
FIG. 27B is a diagram illustrating the spectrum of a multicarrier signal (i.e., the transmission signal light of a transmitter) obtained by multiplexing each subcarrier signal in the multicarrier transmitter, with a multiplexer which is the fabricated multi-stage interferometer circuit of FIG. 25A.
Figure 27C:
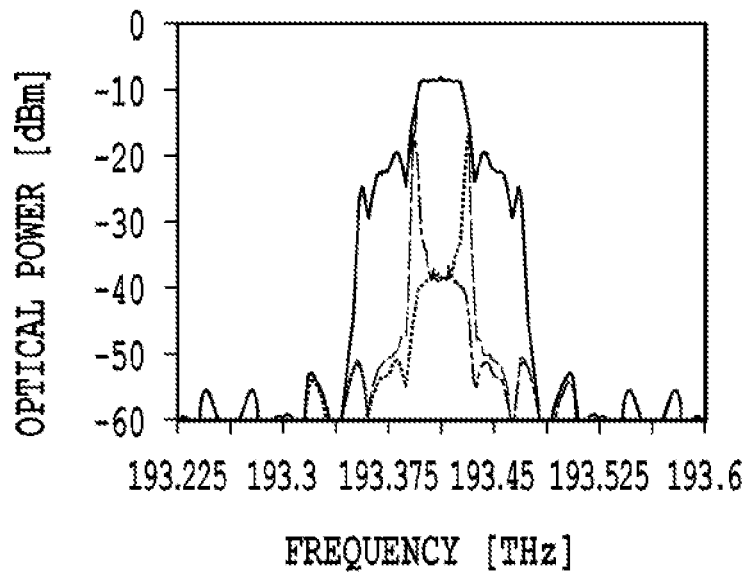
FIG. 27C is a diagram illustrating the signal of a subcarrier #2 obtained by demultiplexing the multicarrier signal from the transmitter, with a demultiplexer which is the fabricated multi-stage interferometer circuit without a TF in the multicarrier receiver.

FIG. 27A illustrates the optical spectrum (at an observation point 1 of FIG. 5) of each subcarrier signal output from each polarization-multiplex QPSK modulator in the above-described transmitter, FIG. 27B illustrates the optical spectrum (at an observation point 2 of FIG. 5) of a multicarrier signal obtained by multiplexing each subcarrier signal with the above-described multiplexer, i.e., a transmission signal light as the transmitter, and FIG. 27C illustrates the signal of a subcarrier #2 obtained by demultiplexing the multicarrier signal from the transmitter with the above-described demultiplexer in the receiver, namely, illustrates the signal light spectrum from the port 2 (at an observation point 3 of FIG. 5). Note that, FIG. 27B and FIG. 27C also illustrate the optical spectrum when the modulator output of an irrelevant subcarrier signal was turned off and only a relevant subcarrier signal was caused to pass through the multi-stage interferometer circuit.

It can be seen from FIG. 27A and FIG. 27B, the output signal light from the modulator, namely, the optical spectrum of each subcarrier signal input to the multiplexer, is lobbed-shaped, but each subcarrier signal is shaped, by passing through the above-described multiplexer, into a flat and highly rectangular spectrum that is the features of a Nyquist signal, so that a Nyquist-shaped multicarrier signal can be excellently gendered. Furthermore, it can be seen from FIG. 27B, in the multicarrier signal output from the transmitter, a ratio between the signal level of each subcarrier and the level of a signal leaked from an adjacent subcarrier, i.e., the crosstalk amount, is sufficiently suppressed to approximately −30 dB at the center frequency of each carrier.

As described above, with the configuration of the present invention, an optical filter multi-stage interferometer circuit capable of multiplexing/demultiplexing a plurality of optical subcarriers and also collectively shaping the waveforms thereof can be realized with a waveguide-type device which is inexpensive and has a small device size. In addition, even with an optical subcarrier signal generated using a simple electric signal source, a multicarrier signal including a Nyquist-shaped optical subcarrier can be generated just by multiplexing these optical subcarrier signals using the multi-stage interferometer circuit of the present invention. Therefore, the transmitter needs neither a waveform-shaping DSP nor a spatial optical filter, and thus a multicarrier transmitter having a low power consumption and a small device size can be realized.

Furthermore, since the multi-stage interferometer circuit of the configuration of the present invention is capable of changing the characteristic thereof in the passband, an thus the passband has an appropriate characteristic and the frequency components of a reception signal can be relatively adjusted, by the use of the multi-stage interferometer circuit for the demultiplexer of a receiver. Accordingly, the imperfection of the frequency characteristics of the elements inside the receivers such as an optical detector and an analog to digital converter (ADC), can be compensated for. For example, when there is a bandwidth shortage of the optical detector and/or ADC, the shape of a passband may have a compensation characteristic adapted to the frequency characteristic of a device to be compensated for, such as the fact that a dip characteristic is provided so as to relatively increase the high-frequency component of a reception signal. Furthermore, the imperfection of the frequency characteristic is not only due to the characteristics of the device itself, but is theoretically caused by the 0-th order hold associated with the sampling of analog to digital conversion. In particular, when the sampling rate is not high enough relative to a signal band to be received, there is generated a non-negligible influence on the flatness in passband. Also with respect to this, compensation can be performed similarly by imparting an appropriate dip characteristic to the passband of the demultiplexer.

For example, it is assumed that the characteristic having the frequency characteristic of the optical detector and the frequency characteristic of the ADC can be approximated by the characteristic of a fifth-order Bessel Thompson filter, and that the 3 dB bandwidth is 22.6 GHz which is approximately 70 percent of the modulation symbol rate 32 G baud. Furthermore, it is assumed that the sampling rate in the ADC is 64 G sps. Here, at the frequency of 16 GHz that is the electric bandwidth in the Nyquist signal of the modulation symbol rate 32 G baud, an overall gain of the optical detector characteristic/ADC characteristic/sampling characteristic decreases by about 2.4 dB as compared with the gain at 0 Hz which is the DC component.

In order to compensate for this, for example, the multi-stage interferometer circuit 1500 of the first embodiment whose parameters are redesigned so as to have an appropriate dip may be used as the demultiplexer of the receiver. As specific design parameters matching the above-described conditions, the coupling phase angle (coupling ratio) of the 2×2 coupler of each of the four-tap TF 1514-1 and four-tap TF 1512-1 with a basic delay of the multi-stage interferometer circuit 1500 of the first embodiment is set to $\xi1=0.11\pi$ (11.5%) and $\xi2=0.05\pi$ (2.4%), respectively. Naturally, when the characteristic and sampling rate of the optical detector/ADC are different, the characteristic to be compensated varies, and thus the coupling phase angle of each 2×2 coupler and the number of taps of a TF are designed so as to be optimal values, as necessary, in accordance with the compensation characteristic.

Figure 28A:
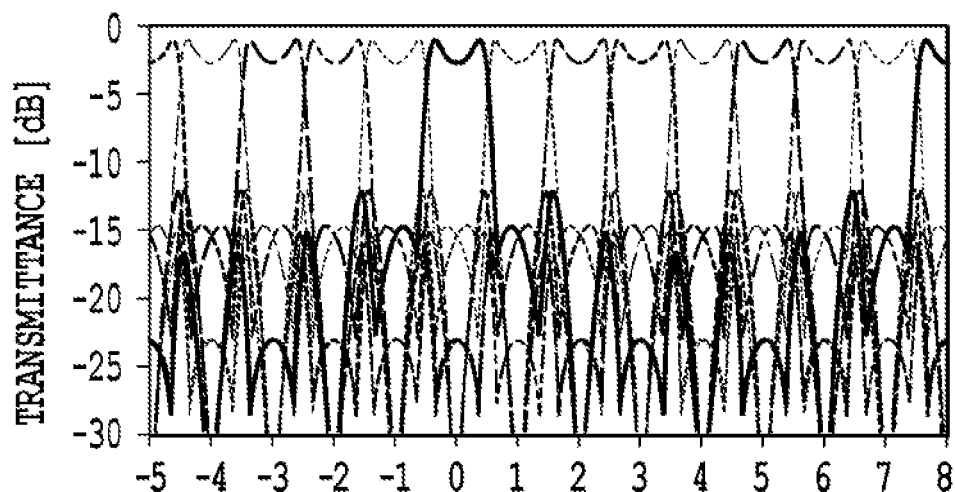
FIG. 28A is a diagram illustrating the power transmittance characteristics in all demultiplexing ports when the multi-stage interferometer circuit of the first embodiment or second embodiment is used as the demultiplexer of the receiver.
Figure 28B:
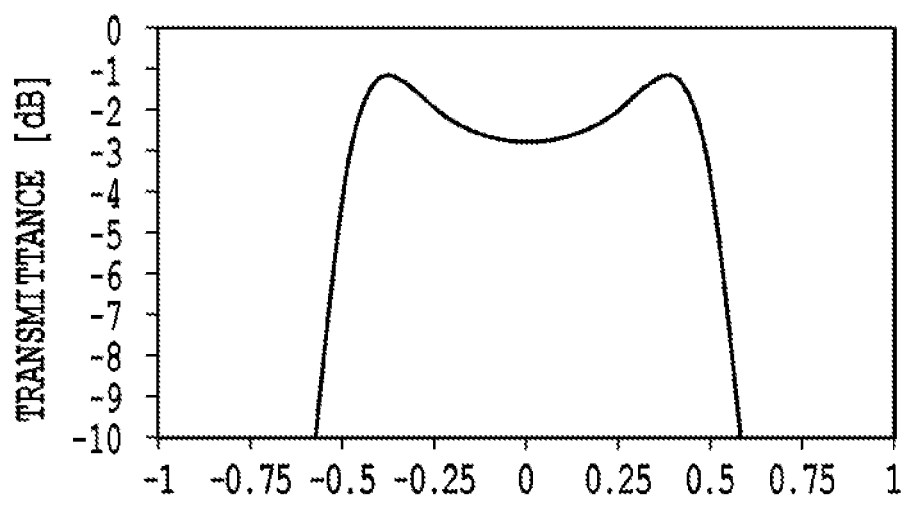
FIG. 28B is a diagram illustrating the power transmittance characteristic in the passband when the multi-stage interferometer circuit of the first embodiment or second embodiment is used as the demultiplexer of the receiver.
Figure 28C:
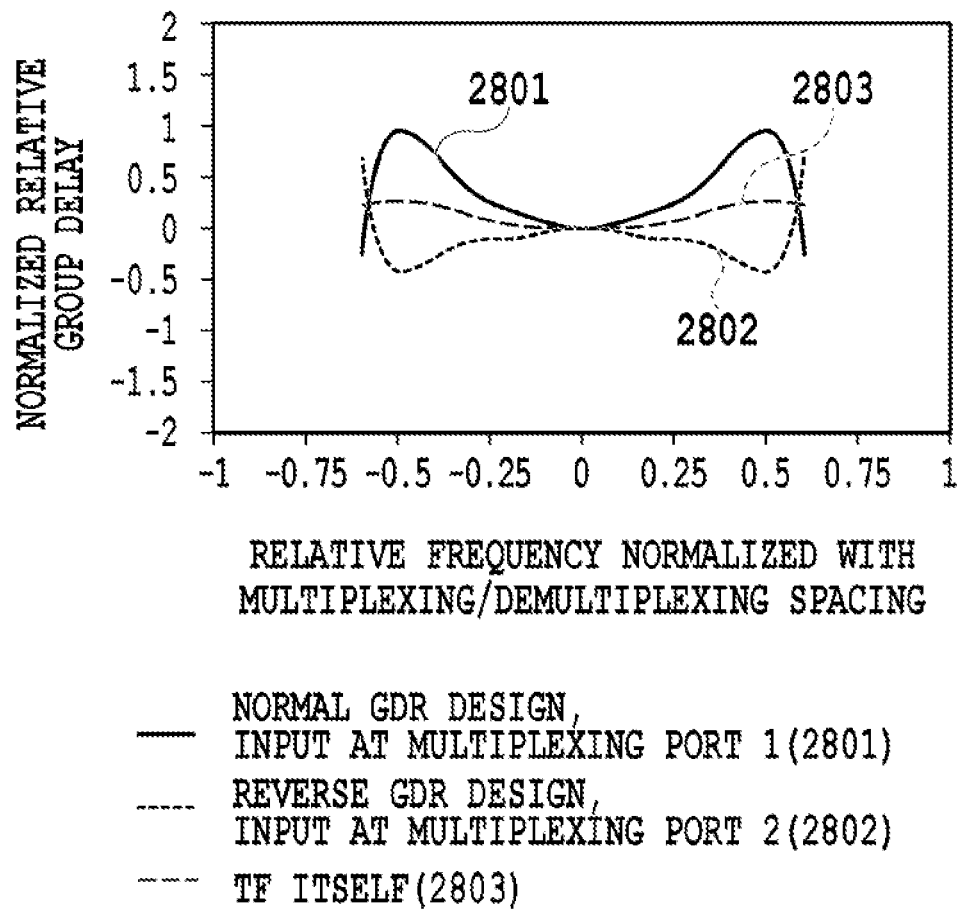
FIG. 28C is a diagram illustrating the group delay characteristics in the passband when the multi-stage interferometer circuit of the first embodiment or second embodiment is used as the demultiplexer of the receiver.

FIG. 28A illustrates the power transmittance characteristics of all the demultiplexing ports of the multi-stage interferometer circuit 1500 of the first embodiment designed with the above-described parameters, FIG. 28B illustrates the power transmittance characteristic in the passband of the multi-stage interferometer circuit 1500, and FIG. 28C illustrates the group delay characteristics in the passband of the multi-stage interferometer circuit 1500. FIG. 28C illustrates the group delay characteristics in the normal GDR design (2801), the reverse GDR design (2802), and the TF itself (2803).

Figure 29A:
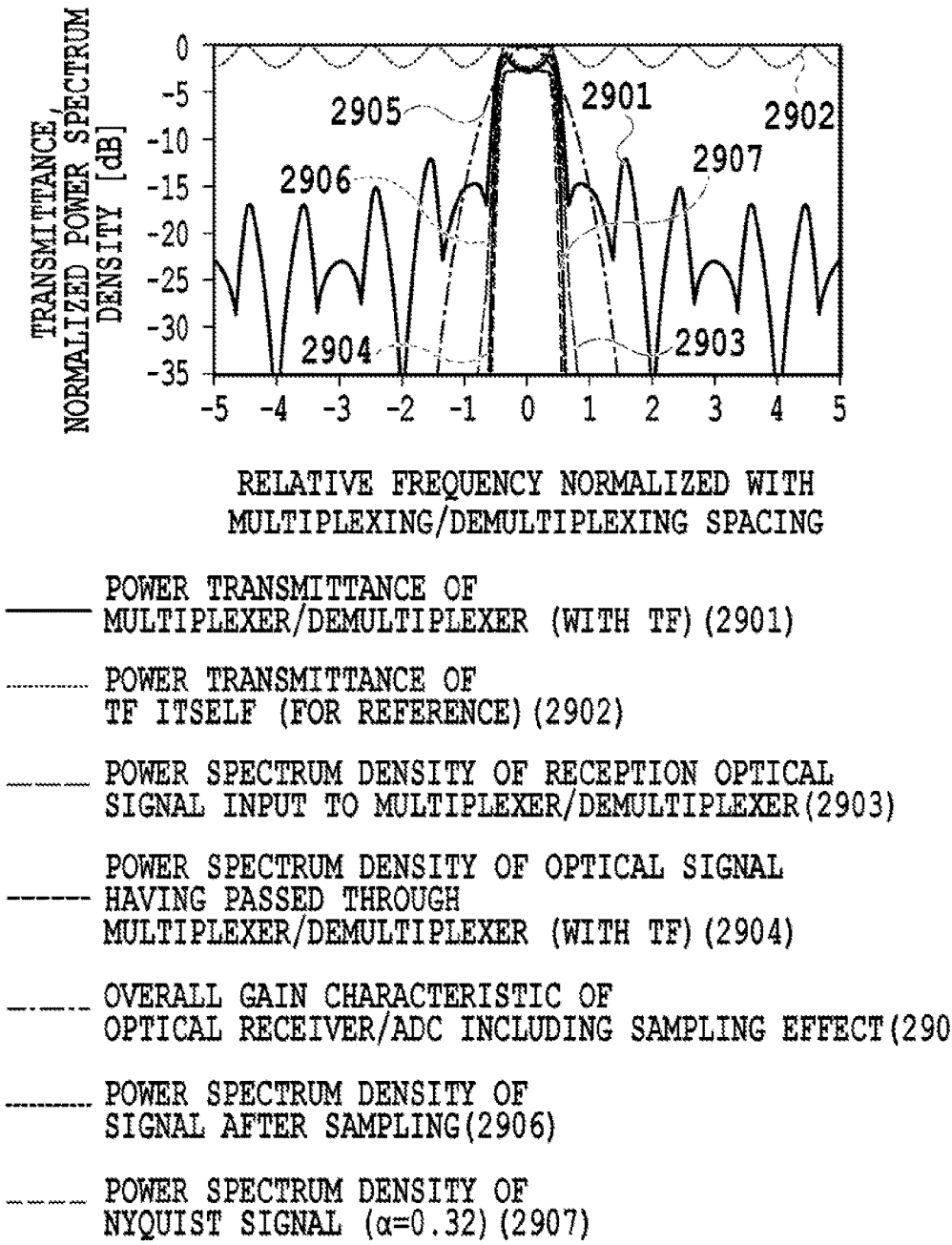
FIG. 29A is a diagram illustrating the characteristics in all regions of the received signal light spectrum or the like after sampling, and the like when the multi-stage interferometer circuit of the first embodiment or second embodiment is used for the demultiplexer of the receiver.
Figure 29B:
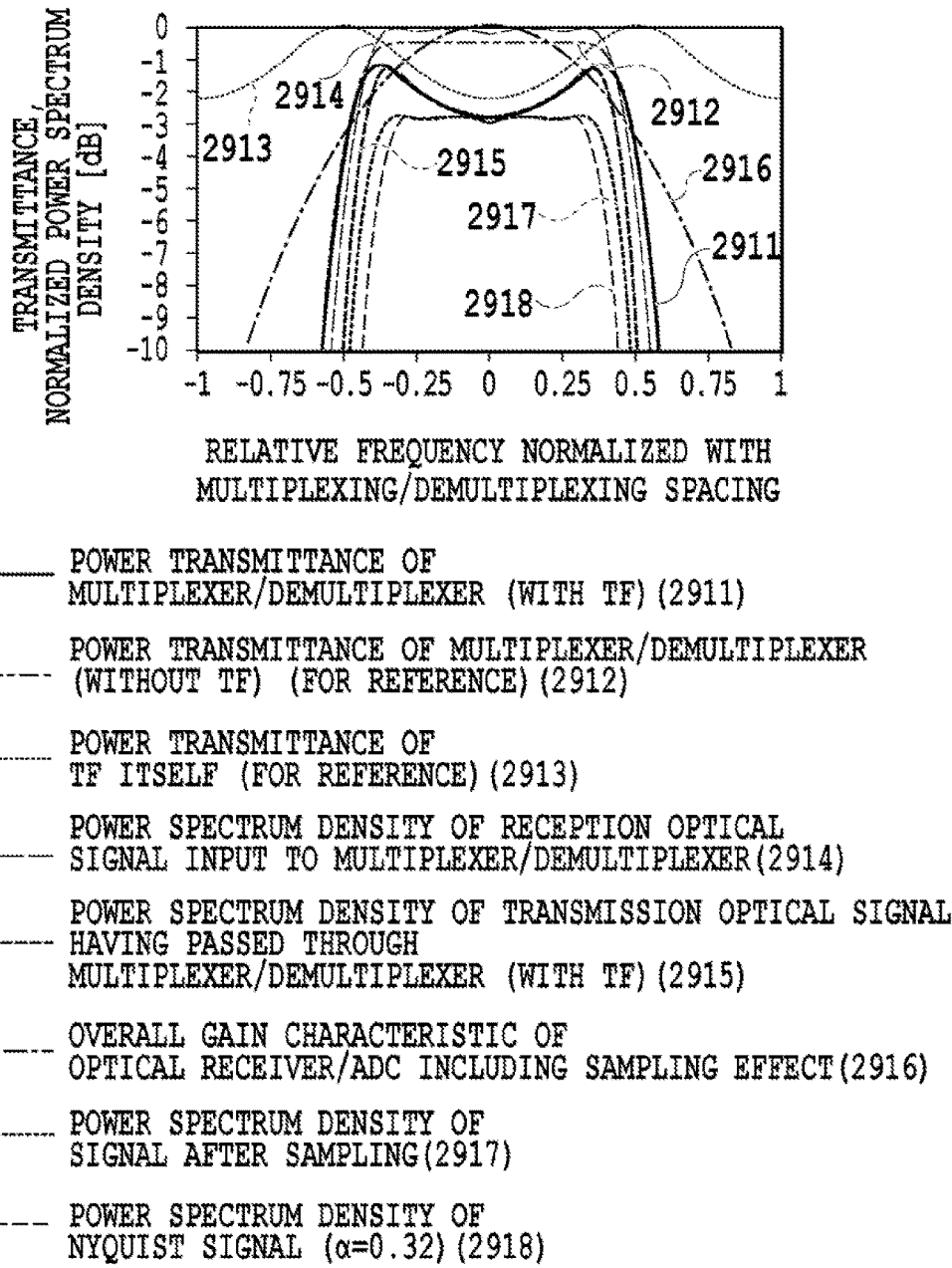
FIG. 29B is a diagram illustrating the characteristics in the vicinity of the main lobe/passband of the received signal light spectrum and the like when the multi-stage interferometer circuit of the first embodiment or second embodiment is used for the demultiplexer of the receiver.

FIG. 29A illustrates the characteristics in all regions of signal light spectrum after passing through the multi-stage interferometer circuit 1500 when signal light output from the multiplexer described in the first embodiment, namely, signal light having a power spectral density (1704, 1715), was transmitted from the transmitter and this signal light was received by a receiver with a multiplexer of the above-described parameters. FIG. 29B illustrates the characteristics in the vicinity of the main lobe/passband of the signal light spectrum. In calculating the spectrum, the ratio between the subcarrier spacing of the multi-stage interferometer circuit and the symbol rate of the subcarrier signal light is about 1.17 (corresponding to subcarrier spacing=37.5 GHz and symbol rate=32 G baud).

FIG. 29A illustrates: a power transmittance (2901) of the multi-stage interferometer circuit 1500 designed with the above-described parameters; a power transmittance (2902) of the TF itself; a power spectral density (2903) of signal light input to the receiver, namely, signal light input to the multi-stage interferometer circuit 1500; a power spectral density (2904) of a reception signal light having passed through the multi-stage interferometer circuit 1500, namely, signal light input to the optical detector; an overall gain characteristic (2905) of the optical detector/ADC including an sampling effect; a power spectral density (2906) of the signal after receiving light and AD conversion, namely, after sampling; and a power spectral density (2907) of the Nyquist signal ($\alpha=0.32$). Furthermore, FIG. 29B illustrates: a power transmittance (2911) of the multi-stage interferometer circuit 1500 designed with the above-described parameters; a power transmittance (2912) of the multi-stage interferometer circuit without a TF; a transmittance (2913) of the TF itself; a power spectral density (2914) of signal light input to the receiver, namely, signal light input to the multi-stage interferometer circuit 1500; a power spectral density (2915) of the reception signal light having passed through the multi-stage interferometer circuit 1500 (with a TF), namely, the signal light input to the optical detector; an overall gain characteristic (2916) of the optical detector/ADC including an sampling effect; a power spectral density (2917) of the signal after receiving light and AD conversion, namely, after sampling; and a power spectral density (2918) of the Nyquist signal ($\alpha=0.32$).

As illustrated in FIG. 29A and FIG. 29B, the power transmittance characteristic (2901, 2911) of the multi-stage interferometer circuit 1500 designed with the above-described parameters is the flat power transmission characteristic (2912) in the passband of the multi-stage interferometer circuit 1500 without a TF multiplied by the power transmittance characteristic (2902, 2913) of the TF itself. The power transmittance characteristic (2911) in the passband has a dip top shape for correcting the overall gain characteristic (2916) of the optical detector/ADC including the sampling effect. Therefore, when signal light input to the receiver is caused to pass through the multi-stage interferometer circuit 1500, the spectral density (2903, 2914) of the signal light is shaped by the power transmittance characteristic (2901, 2911) of the multi-stage interferometer circuit 1500, and the power spectral density (2904, 2915) of the signal light having passed through the multi-stage interferometer circuit 1500 results in a dip top-shaped spectrum, once. However, once converted to an electric signal through the optical detector/ADC and furthermore sampled into a discrete signal, the signal light will have a highly rectangular spectrum extremely close to the power spectrum (2907, 2918) of the Nyquist signal as illustrated in the power spectral density (2906, 2917) of the signal after sampling. As described above, the passband transmission characteristic (2901, 2911) of the multi-stage interferometer circuit 1500 designed with the above-described parameters can correct, even if any, the overall gain characteristic (2905, 2916) of the optical detector/ADC including the sampling effect, and convert the signal light input to the receiver into a discrete signal having a highly rectangular flat top spectral density (2906, 2917) while keeping, as is, the flat top spectral density (2903, 2914) of the signal light input to the receiver. As described above, by performing the photoelectric conversion and/or the conversion into a discrete signal while keeping a flat top spectral density, an influence of the noise generated by the optical detector and the like and an influence of the quantization noise associated with AD conversion can be minimized.

Note that, in the present example, the phase shifter is constituted from a phase adjuster, namely, a variable phase shifter, but the phase shifter may be constituted by a fixed phase shifter realized by changing the effective refractive index by partially changing a predetermined waveguide length difference and/or the waveguide width.

Note that, for using a fixed phase shifter, the optical path length adjustment may be performed by the use of a trimming technique which utilizes a permanent refractive index change and the like induced by ultraviolet light, when the optical path length adjustment is required for manufacturing accuracy.

The invention claimed is:

1. A multi-stage interferometer circuit comprising:
at least one multiplexing port;
(N−1) stages (N is a natural number equal to or greater than 2) of lattice type two-beam interferometers, wherein the lattice type two-beam interferometer at each stage includes
a two-beam delay circuit having a path length difference of an integral multiple of M·ΔL/2 (M is a natural number) and a first optical coupler, and wherein the two-beam delay circuit of the lattice type two-beam interferometer of the first stage is connected to the at least one multiplexing port via a second optical coupler;
an M-beam interferometer including: two sets of 1×(M/2) optical couplers whose inputs are connected to two outputs of the first optical coupler of the lattice type two-beam interferometer of the (N−1)th stage; an M-array delay circuit, each delay circuit of which has a delay length different from each other by ΔL, the M-array delay circuit being connected to the 1×(M/2) optical couplers; and M×M optical couplers connected to the M-array delay circuit; and
M demultiplexing ports connected to the M×M optical couplers, wherein
one or more transversal filters interferometers having one input and one output are arranged inside the multi-stage interferometer circuit so that the light guided between the demultiplexing port and the multiplexing ports passes therethrough at least once.

2. The multi-stage interferometer circuit according to claim 1, wherein transversal filter interferometers having one input and one output are inserted into both of two arm waveguides of at least one lattice type two-beam interferometer among the (N−1) stages of lattice type two-beam interferometers.

3. The multi-stage interferometer circuit according to claim 2, wherein the transversal filter interferometers having one input and one output have a same transmission characteristic, which are inserted into both of two arm waveguides of at least one lattice type two-beam interferometer among the (N−1) stages of lattice type two-beam interferometers.

4. The multi-stage interferometer circuit according to claim 1, wherein transversal filter interferometers having one input and one output are incorporated into both of two arm waveguides of at least one lattice type two-beam interferometer among the (N−1) stages of lattice type two-beam interferometers, and wherein a delay difference is provided between the transversal filter interferometer having one input and one output of one arm waveguide and the transversal filter interferometer having one input and one output of another arm waveguide.

5. The multi-stage interferometer circuit according to claim 4, wherein the transversal filter interferometers having one input and one output have a same transmission characteristic, which are inserted into both of two arm waveguides of at least one lattice type two-beam interferometer among the (N−1) stages of lattice type two-beam interferometers.

6. The multi-stage interferometer circuit according to claim 1, wherein transversal filter interferometers having one input and one output are incorporated into both of two arm waveguides of at least two lattice type two-beam interferometers among the (N−1) stages of lattice type two-beam interferometers, and wherein the transversal filter interferometer having one input and one output of the lattice type two-beam interferometer at one stage has a group delay frequency characteristic whose sign is opposite to the transversal filter interferometer having one input and one output of the lattice type two-beam interferometer at another stage.

7. The multi-stage interferometer circuit according to claim 1, wherein a transversal filter interferometer having one input and one output is inserted into a port that inputs signal light or a port that outputs signal light, among the at least one or more multiplexing ports.

8. The multi-stage interferometer circuit according to claim 1, wherein a transversal filter interferometer having one input and one output is inserted into a port that inputs signal light or a port that outputs signal light, among the M multiplexing ports.

9. The multi-stage interferometer circuit according to claim 1, wherein a transversal filter interferometers having one input and one output are inserted between a first output of the first optical coupler of the lattice type two-beam interferometer of the (N−1)th stage and an input of a first 1×(M/2) optical coupler among the two sets of 1×(M/2) optical couplers of the M-beam interferometer and between a second output of the first optical coupler of the lattice type two-beam interferometer of the (N−1)th stage and an input of a second 1×(M/2) optical coupler among the two sets of 1×(M/2) optical couplers of the M-beam interferometer, respectively.

10. The multi-stage interferometer circuit according to claim 9, wherein the transversal filter interferometers having one input and one output have a same transmission characteristic, which are inserted between a first output of the first optical coupler of the lattice type two-beam interferometer of the (N−1)th stage and an input of a first 1×(M/2) optical coupler among the two sets of 1×(M/2) optical couplers of the M-beam interferometer and between a second output of the first optical coupler of the lattice type two-beam interferometer of the (N−1)th stage and an input of a second 1×(M/2) optical coupler among the two sets of 1×(M/2) optical couplers of the M-beam interferometer, respectively.

11. The multi-stage interferometer circuit according to claim 1, wherein the transversal filter interferometer having one input and one output includes: 1×S couplers (S is a natural number equal to or greater than 2); an S-array delay circuit connected to S outputs of the 1×S coupler; and an S×1 coupler whose S outputs are connected to S arm waveguides of the S-array delay circuit, respectively, wherein a path length difference between adjacent arm waveguides of the S-array delay circuit is an integral multiple of M·ΔL.

12. The multi-stage interferometer circuit according to claim 1, wherein the M×M optical coupler includes a combination of 2×2 optical couplers of a M/2 array connected in m stages, wherein a u-th 2×2 coupler at a t-th stage (t is an integer between 1 to m, u is a natural number between 1 to M/2, and m=$\log_2(M)$) of the M×M optical coupler couples an x-th path and a y-th path, wherein values of the x and y satisfy Math. 1 below, $$x = 2^{m-t+1} \cdot \{(u-1) \text{div } 2^{m-t}\} + \{(u-1) \bmod 2^{m-t}\} + 1$$

$$y = 2^{m-t+1} \cdot \{(u-1) \text{div } 2^{m-t}\} + \{(u-1) \bmod 2^{m-t}\} + 1 + 2^{m-t} \quad \text{[Math. 1]}$$

and wherein (u−1) div $2^{m-t}$ and (u−1) mod $2^{m-t}$ represent a quotient and a remainder, respectively, in a case where (u−1) is divided by $2^{m-t}$.

13. The multi-stage interferometer circuit according to claim 12, wherein u and t (t is an integer between 1 to m, u is a natural number between 1 to M/2, and m=log$_2$(M)) are taken as parameters, $$x=2^{m-t+1}\cdot\{(u-1)\text{div } 2^{m-t}\}+\{(u-1)\text{mod } 2^{m-t}\}+1$$

$$y=2^{m-t+1}\cdot\{(u-1)\text{div } 2^{m-t}\}+\{(u-1)\text{mod } 2^{m-t}\}+1+2^{m-t} \quad \text{[Math. 2]}$$

in an x-th delay path and a y-th delay path of the M-array delay circuit, a path length difference between the both delay paths is $2^{mt}\cdot\Delta L$, wherein x, y are designated by Formula 3.

14. A multicarrier optical transmitter that transmits multicarrier signal light, the multicarrier optical transmitter comprising: a plurality of transmitters that converts an electric signal to signal light; and a multiplexer that multiplexes into the multicarrier signal individual subcarrier signal light output from the transmitter, wherein the multiplexer is a multi-stage interferometer circuit, the multi-stage interferometer circuit comprising:
at least one multiplexing port;
(N−1) stages (N is a natural number equal to or greater than 2) of lattice type two-beam interferometers, wherein the lattice type two-beam interferometer at each stage includes
a two-beam delay circuit having a path length difference of an integral multiple of M·ΔL/2 (M is a natural number) and a first optical coupler, and wherein the two-beam delay circuit of the lattice type two-beam interferometer of the first stage is connected to the at least one multiplexing port via a second optical coupler;
an M-beam interferometer including: two sets of 1×(M/2) optical couplers whose inputs are connected to two outputs of the first optical coupler of the lattice type two-beam interferometer of the (N−1)th stage; an M-array delay circuit, each delay circuit of which has a delay length different from each other by ΔL, the M-array delay circuit being connected to the 1×(M/2) optical couplers; and M×M optical couplers connected to the M-array delay circuit; and
M demultiplexing ports connected to the M×M optical couplers, wherein
one or more transversal filters interferometers having one input and one output are arranged inside the multi-stage interferometer circuit so that the light guided between the demultiplexing port and the multiplexing ports passes therethrough at least once.

15. A multicarrier optical receiver, comprising:
a demultiplexer that demultiplexes the multicarrier signal into individual subcarrier signal light; and
a receiver that converts the individual multicarrier signal light to an electric signal, wherein the demultiplexer is a multi-stage interferometer circuit, the multi-stage interferometer circuit comprising:
at least one multiplexing port;
(N−1) stages (N is a natural number equal to or greater than 2) of lattice type two-beam interferometers, wherein the lattice type two-beam interferometer at each stage includes
a two-beam delay circuit having a path length difference of an integral multiple of M·ΔL/2 (M is a natural number) and a first optical coupler, and wherein the two-beam delay circuit of the lattice type two-beam interferometer of the first stage is connected to the at least one multiplexing port via a second optical coupler;
an M-beam interferometer including: two sets of 1×(M/2) optical couplers whose inputs are connected to two outputs of the first optical coupler of the lattice type two-beam interferometer of the (N−1)th stage; an M-array delay circuit, each delay circuit of which has a delay length different from each other by ΔL, the M-array delay circuit being connected to the 1×(M/2) optical couplers; and M×M optical couplers connected to the M-array delay circuit; and
M demultiplexing ports connected to the M×M optical couplers, wherein
one or more transversal filters interferometers having one input and one output are arranged inside the multi-stage interferometer circuit so that the light guided between the demultiplexing port and the multiplexing ports passes therethrough at least once.

* * * * *